United States Patent
Ko et al.

(10) Patent No.: US 9,698,888 B2
(45) Date of Patent: Jul. 4, 2017

(54) METHOD AND APPARATUS FOR PERFORMING EFFECTIVE FEEDBACK IN WIRELESS COMMUNICATION SYSTEM SUPPORTING MULTIPLE ANTENNAS

(71) Applicant: LG ELECTRONICS INC., Seoul (KR)

(72) Inventors: Hyunsoo Ko, Anyang-si (KR); Jaehoon Chung, Anyang-si (KR); Seunghee Han, Anyang-si (KR); Moonil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/162,605

(22) Filed: May 23, 2016

(65) Prior Publication Data

US 2016/0269088 A1 Sep. 15, 2016

Related U.S. Application Data

(63) Continuation of application No. 14/789,941, filed on Jul. 1, 2015, now Pat. No. 9,357,434, which is a (Continued)

(30) Foreign Application Priority Data

Sep. 29, 2011 (KR) .......................... 10-2011-0098949

(51) Int. Cl.
*H04W 28/04* (2009.01)
*H04B 7/06* (2006.01)
(Continued)

(52) U.S. Cl.
CPC ......... *H04B 7/0632* (2013.01); *H04B 7/0417* (2013.01); *H04B 7/0456* (2013.01);
(Continued)

(58) Field of Classification Search
CPC ... H04W 80/04; H04W 88/06; H04W 280/04; H04W 72/04; H04W 16/28;
(Continued)

(56) References Cited

U.S. PATENT DOCUMENTS

2005/0232156 A1 10/2005 Kim et al.
2009/0010319 A1 1/2009 Sun et al.
(Continued)

FOREIGN PATENT DOCUMENTS

CN 1684457 A 10/2005
CN 1996811 A 7/2007
(Continued)

OTHER PUBLICATIONS

Sharp, "Impact of the PMI/RI Report Drop on the PUCCH CQI Report," 3GPP TSG RAN WG1 Meeting #53bis, R1-082273, Warsaw, Poland, Jun. 30,-Jul. 4, 2008, pp. 1-4.
(Continued)

*Primary Examiner* — Andrew Lee
(74) *Attorney, Agent, or Firm* — Morgan, Lewis & Bockius LLP

(57) ABSTRACT

A method for transmitting channel status information (CSI) of downlink multi-carrier transmission includes generating the CSI including at least one of a rank indicator (RI), a first precoding matrix index (PMI), a second PMI and a channel quality indicator (CQI) for one or more downlink carriers, the CQI being calculated based on precoding information determined by a combination of the first and second PMIs, determining, when two or more CSIs collide with one another in one uplink subframe of one uplink carrier, a CSI to be transmitted on the basis of priority, and transmitting the determined CSI over a uplink channel. If a CSI including an RI or a wideband first PMI collides with a CSI including a wideband CQI or a subband CQI, the CSI including a
(Continued)

wideband CQI or a subband CQI has low priority and is dropped.

14 Claims, 35 Drawing Sheets

Related U.S. Application Data continuation of application No. 14/218,868, filed on Mar. 18, 2014, now Pat. No. 9,094,860, which is a continuation of application No. 13/248,666, filed on Sep. 29, 2011, now Pat. No. 8,687,555.

(60) Provisional application No. 61/387,472, filed on Sep. 29, 2010, provisional application No. 61/388,615, filed on Oct. 1, 2010, provisional application No. 61/409,535, filed on Nov. 2, 2010, provisional application No. 61/410,355, filed on Nov. 5, 2010, provisional application No. 61/440,714, filed on Feb. 8, 2011, provisional application No. 61/441,616, filed on Feb. 10, 2011, provisional application No. 61/443,219, filed on Feb. 15, 2011, provisional application No. 61/446,059, filed on Feb. 24, 2011.

(51) Int. Cl.

| | | |
|---|---|---|
| H04L 1/00 | (2006.01) | |
| H04L 5/00 | (2006.01) | |
| H04L 1/16 | (2006.01) | |
| H04B 7/0417 | (2017.01) | |
| H04W 24/10 | (2009.01) | |
| H04B 7/0456 | (2017.01) | |
| H04L 27/26 | (2006.01) | |
| H04B 7/04 | (2017.01) | |

(52) U.S. Cl.
CPC .......... *H04B 7/063* (2013.01); *H04B 7/0626* (2013.01); *H04B 7/0639* (2013.01); *H04L 1/0026* (2013.01); *H04L 1/0027* (2013.01); *H04L 1/1671* (2013.01); *H04L 5/001* (2013.01); *H04L 5/0023* (2013.01); *H04L 27/2601* (2013.01); *H04W 24/10* (2013.01); *H04W 28/046* (2013.01); *H04B 7/0469* (2013.01); *H04B 7/068* (2013.01)

(58) Field of Classification Search
CPC ... H04W 28/046; H04W 16/18; H04W 28/04; H04W 36/30; H04W 54/40; H04W 84/12; H04L 7/047; H04L 7/063
See application file for complete search history.

(56) References Cited

U.S. PATENT DOCUMENTS

| | | |
|---|---|---|
| 2009/0190528 A1 | 7/2009 | Chung et al. |
| 2009/0245169 A1 | 10/2009 | Zhang et al. |
| 2010/0002664 A1 | 1/2010 | Pan et al. |
| 2010/0098012 A1 | 4/2010 | Bala et al. |
| 2011/0141928 A1 | 6/2011 | Shin et al. |
| 2011/0174123 A1 | 7/2011 | Franklin et al. |
| 2011/0194504 A1 | 8/2011 | Gorokhov et al. |
| 2011/0243017 A1 | 10/2011 | Prasad et al. |
| 2011/0249578 A1 | 10/2011 | Nayeb Nazar et al. |
| 2011/0261713 A1 | 10/2011 | Kishiyama et al. |
| 2011/0268048 A1 | 11/2011 | Toskala et al. |
| 2012/0087254 A1 | 4/2012 | Yin et al. |
| 2012/0088533 A1 | 4/2012 | Khoshnevis et al. |
| 2012/0127869 A1 | 5/2012 | Yin et al. |
| 2012/0140649 A1 | 6/2012 | Choudhury et al. |
| 2012/0140708 A1 | 6/2012 | Choudhury et al. |
| 2012/0207047 A1 | 8/2012 | Liao et al. |
| 2012/0220286 A1 | 8/2012 | Chen et al. |
| 2012/0314613 A1 | 12/2012 | Zhang et al. |
| 2012/0327785 A1 | 12/2012 | Zhang et al. |
| 2013/0039231 A1 | 2/2013 | Wang |
| 2013/0114455 A1 | 5/2013 | Yoo et al. |
| 2013/0121270 A1 | 5/2013 | Chen et al. |
| 2013/0308484 A1 | 11/2013 | Lunttila et al. |

FOREIGN PATENT DOCUMENTS

| | | |
|---|---|---|
| CN | 101615984 A | 12/2009 |
| CN | 102237958 A | 11/2011 |
| JP | 2013-516921 A | 5/2013 |
| JP | 2013-524602 A | 6/2013 |
| WO | 2010/101431 A2 | 9/2010 |

OTHER PUBLICATIONS

Icera Semiconductor, "Dropping of RI/PMI Report on PUCCH," 3GPP TSG RAN WG1 Meeting #54, R1-083201, Jeju, Korea, Aug. 18-22, 2008, pp. 1-3.
International Search Report from counterpart PCT application mailed Apr. 4, 2012.
3GPP TS 36.213 V9.20 (Jun. 2010), 3rd Generation Partnership Project; Technical Specification Group Radio Access Network; Evolved Universal Terrestrial Radio Access (E-UTRA); Physical layer procedures (Release 9), pp. 1-80.
LG Electronics, 3GPP TSG RAN WG1 #63, R1-106130, Periodic CQI transmission on PUCCH, Jacksonville, FL, Nov. 15-19, 2010, pp. 1-4.
Panasonic, "Periodic CQI Reporting for Carrier Aggregation," 3GPP TSG-RAN WG1 Meeting #61bis, R1-103749, Dresden, Germany, Jun. 28,-Jul. 10, 2010, pp. 1-4.
LG Electronics, "UL CC selection for UCI transmission on PUSCH," 3GPP TSG RAN WG1 Meeting #62, R1-104764, Madrid, Spain, Aug. 23-27, 2010, pp. 1-6.
Panasonic, "Periodic CQI/PMI/RI Reporting for Carrier Aggregation," 3GPP TSG-RAN WG1 Meeting #62, R1-104887, Madrid, Espana, Aug. 23-27, 2010, pp. 1-4.
Extended European Search Report issued in corresponding European Patent Application No. 11829594.8 dated Sep. 7, 2016.
LG Electronics, 3GPP TSG RAN WG1 #62, R1-104648, Periodic CQI transmission, Madrid, Spain, Aug. 23-27, 2010, pp. 1-3.
Huawei, 3GPP TSG RAN WG1 #62, R1-104500, Periodic CQI/MI/RI reporting using PUCCH for CA, Madrid, Spain, Aug. 23-27, 2010, pp. 1-6.
LG Electronics, 3GPP TSG RAN WG1 #63, T1-1-6130, Periodic CQI transmission on PUCCH, Jacksonville, FL, Nov. 15-19, 2010, pp. 1-4.
LG Electronics, 3GPP TSG RAN WG1 #63bis, R1-110371, Periodic CQI transmission on PUCCH for carrier aggregation, Dublin, Ireland, Jan. 17-21, 2011, pp. 1-3.
LG Electronics, 3GPP TSG RAN WG1 #62bis, R1-105340, Periodic CSI transmission in carrier aggregation, Xian, China, Oct. 11-15, 2010, pp. 1-4.
Texas Instruments, "Periodic CQI on PUCCH for Carrier Aggregation," 3GPP TSG RAN WG1 meeting #62, R1-104464, Madrid, Spain, Aug. 23-27, 2010.
Qualcomm Incorporated, "PMI/CQI/RI Configuration in Support of CA," 3GPP TSG RAN WG1 meeting #62, R1-104786, Madrid, Spain, Aug. 23-27, 2010.
Panasonic, NEC Group, "Correction of Subscripts in TS 36.213 section 7.2.2," 3GPP Tsg-Ran WG1 meeting #53bis, R1-082418, Warsaw, Poland, Jun. 30,-Jul. 4, 2008.
Philips, "Configuration of CQI Modes," 3GPP TSG RAN WG1 meeting #53bis, R1-082529, Warsaw, Poland, Jun. 30,-Jul. 4, 2008.
Nokia Siemens Networks, Nokia, "Periodic CSI Reporting for Carrier Aggregation," 3GPP TSG RAN WG1 meeting #62, R1-104435, Madrid, Spain, Aug. 23-27, 2010.

FIG. 5
PRIOR ART
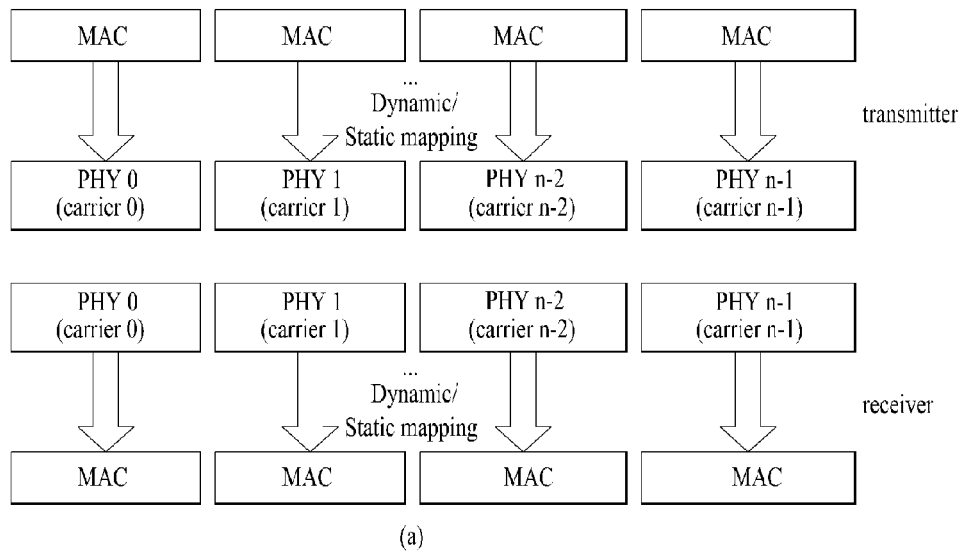
(a)
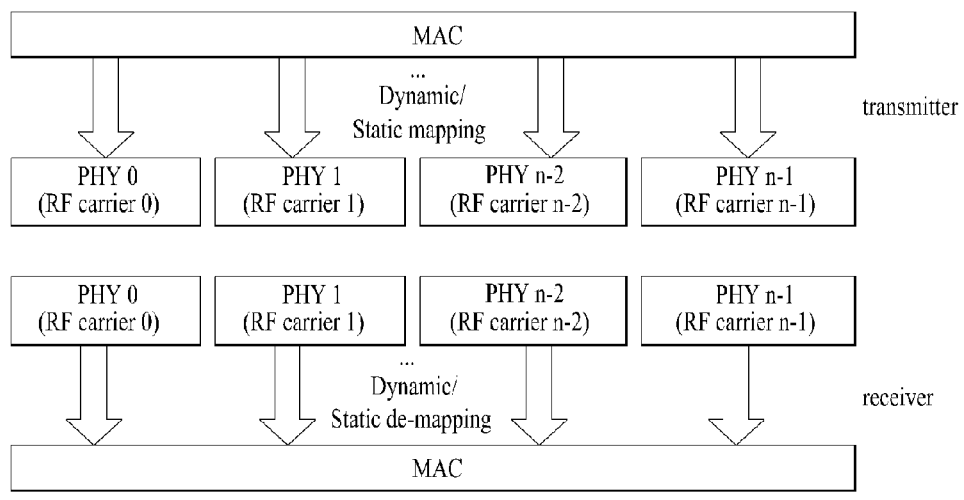
(b)

FIG. 9
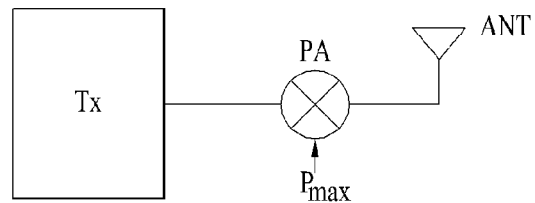
(a)
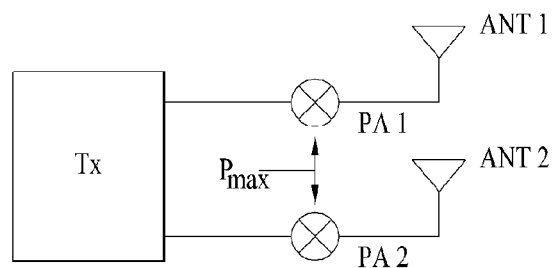
(b)
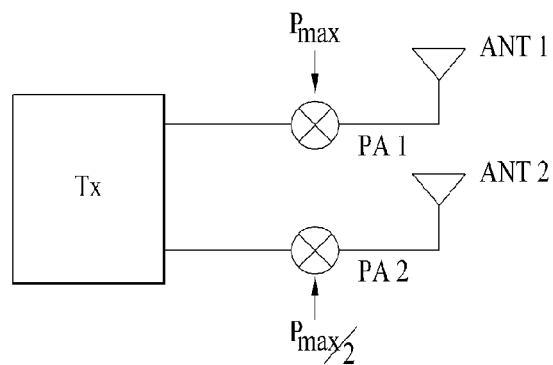
(c)

FIG. 10
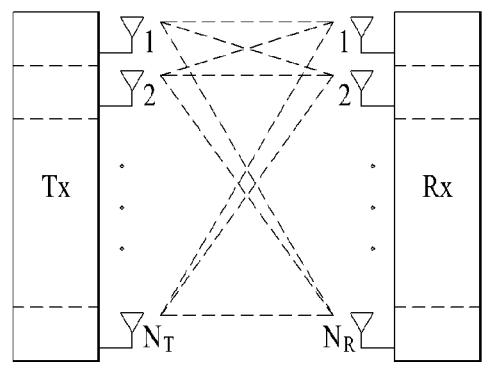
(a)
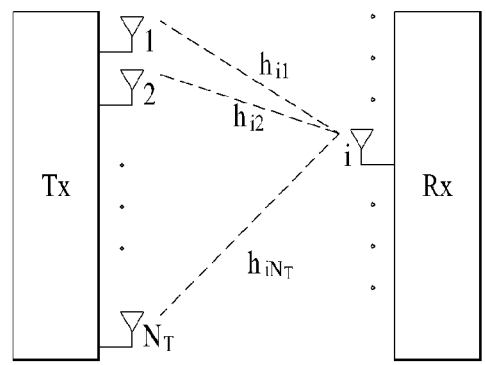
(b)

FIG. 11
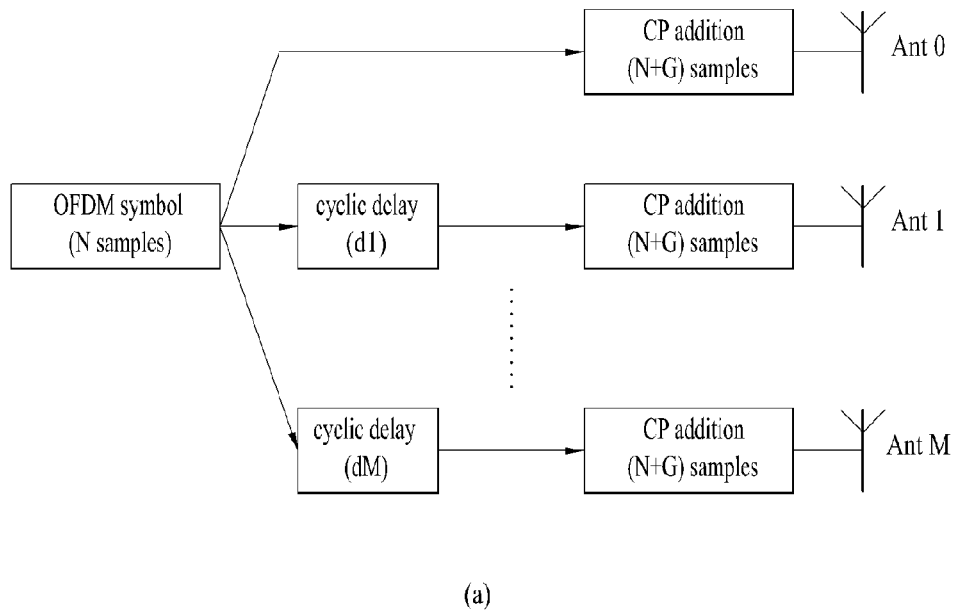
(a)
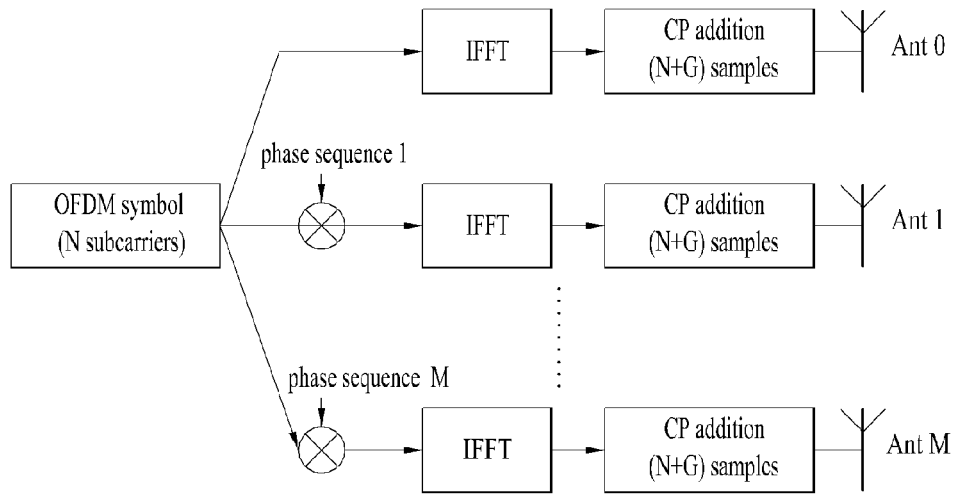
(b)

$n_{PRB} = N_{RB}^{UL} - 1$

| CQI | CQI |
|---|---|
| CQI+A/N | A/N |
|  | A/N |
|  |  |
| DATA ||
|  |  |

•
•
•

$n_{PRB} = 0$

|  |  |
|---|---|
| DATA ||
|  |  |
| A/N |  |
| A/N | CQI+A/N |
| CQI | CQI |

One subframe

METHOD AND APPARATUS FOR PERFORMING EFFECTIVE FEEDBACK IN WIRELESS COMMUNICATION SYSTEM SUPPORTING MULTIPLE ANTENNAS

This application is a continuation of U.S. patent application Ser. No. 14/789,941, filed on Jul. 1, 2015, which is a continuation of U.S. patent application Ser. No. 14/218,868, filed on Mar. 18, 2014, which is a continuation of U.S. patent application Ser. No. 13/248,666, filed on Sep. 29, 2011, the entirety of each of which is hereby incorporated by reference for all purposes as if fully set forth herein. This application also claims the benefit of Korean Patent Application No. 10-2011-0098949, filed on Sep. 29, 2011, and U.S. Provisional Patent Application Nos. 61/387,472, filed on Sep. 29, 2010; 61/388,615, filed on Oct. 1, 2010; 61/409,535, filed on Nov. 2, 2010; 61/410,355, filed on Nov. 5, 2010; 61/440,714, filed on Feb. 8, 2011; 61/441,616, filed on Feb. 10, 2011; 61/443,219 filed on Feb. 15, 2011; and 61/446,059, filed on Feb. 24, 2011, the entirety of each of which is hereby incorporated by reference for all purposes as if fully set forth herein.

BACKGROUND OF THE INVENTION

Field of the Invention

The present invention relates to a wireless communication system, and more particularly to a method and apparatus for performing effective feedback in a wireless communication system supporting multiple antennas.

Discussion of the Related Art

Generally, Multiple-Input Multiple-Output (MIMO) technology will hereinafter be described in detail. In brief, MIMO is an abbreviation for Multi-Input Multi-Output. MIMO technology uses multiple transmission (Tx) antennas and multiple reception (Rx) antennas to improve the efficiency of transmission/reception (Tx/Rx), whereas the conventional art generally uses a single transmission (Tx) antenna and a single reception (Rx) antenna. In other words, MIMO technology allows a transmitting end and a receiving end to use multiple antennas so as to increase capacity or improve performance. If necessary, MIMO technology may also be called multi-antenna technology. In order to correctly perform multi-antenna transmission, the MIMO system has to receive feedback information regarding channels from a receiving end designed to receive multi-antenna channels.

Various feedback information fed back from the receiving end to the transmitting end in the legacy MIMO wireless communication system may be defined, for example, a rank indicator (RI), a precoding matrix index (PMI), channel quality information (CQI), etc. Such feedback information may be configured as information appropriate for legacy MIMO transmission.

There is a need for a new system including the extended antenna configuration as compared to the legacy MIMO wireless communication system to be developed and introduced to the market. For example, although the legacy system can support a maximum of 4 transmission antennas, new systems have an extended antenna configuration that supports MIMO transmission based on 8 transmission antennas, resulting in increased system capacity.

SUMMARY OF THE INVENTION

Accordingly, the present invention is directed to a method and apparatus for performing efficient feedback in a wireless communication system supporting multiple antennas that substantially obviates one or more problems due to limitations and disadvantages of the related art. The new system supporting the extended antenna configuration is designed to perform more complicated MIMO transmission than the legacy MIMO transmission operation, such that it is impossible to correctly support the MIMO operation for the new system only using feedback information defined for the legacy MIMO transmission operation.

An object of the present invention is to provide a method and apparatus for configuring and transmitting feedback information used for correctly and efficiently supporting MIMO operation based on an extended antenna configuration.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting channel status information (CSI) of downlink (DL) multi-carrier transmission includes: generating the CSI including at least one of a rank indicator (RI), a first precoding matrix index (PMI), a second PMI and a channel quality indicator (CQI) for one or more DL carriers, wherein the CQI is calculated based on precoding information determined by a combination of the first and second PMIs; determining, when two or more CSIs collide with one another in one uplink (UL) subframe of one UL carrier, a CSI to be transmitted on the basis of priority; and transmitting the determined CSI over a UL channel, wherein the CSI is classified into a first group including an RI, a second group including a wideband (WB) first PMI, a third group including a WB CQI, and a fourth group including an SB CQI, and in association with the priority, if a CSI of the first group or a CSI of the second group collides with a CSI of the third group or a CSI of the fourth group, the CSI of the third or fourth group has low priority and is dropped.

In another aspect of the present invention, a user equipment (UE) for transmitting channel status information (CSI) of downlink multi-carrier transmission includes a reception module for receiving a downlink signal from an eNode B; a transmission module for transmitting an uplink signal to the eNode B; and a processor for controlling the user equipment (UE) including the reception module and the transmission module. The processor includes generating the CSI including at least one of a rank indicator (RI), a first precoding matrix index (PMI), a second PMI and a channel quality indicator (CQI) for one or more DL carriers, wherein the CQI is calculated based on precoding information determined by a combination of the first and second PMIs, determining, when two or more CSIs collide with one another in one uplink (UL) subframe of one UL carrier, a CSI to be transmitted on the basis of priority, transmitting, through the transmission module, the determined CSI over a UL channel, wherein the CSI is classified into a first group including an RI, a second group including a wideband (WB) first PMI, a third group including a WB CQI, and a fourth group including an SB CQI, and in association with the priority, if a CSI of the first group or a CSI of the second group collides with a CSI of the third group or a CSI of the fourth group, the CSI of the third or fourth group has low priority and is dropped.

The CSI of the first group and the CSI of the second group may have the same priority.

Provided that the priorities are identical to one another, if a CSI of a DL transmission mode for 8 transmission (Tx) antennas collides with a CSI of a different DL transmission mode, the CSI of the different DL transmission mode may have low priority and be dropped.

Provided that the priorities are identical to one another, a CSI of a high-priority DL carrier configured by a higher layer in each of the one or more DL carriers may be transmitted over the UL channel.

If the CSI of the third group collides with the CSI of the fourth group, the CSI of the fourth group may have low priority and be dropped.

If the first PMI is dropped, channel status information (CSI) subsequent to the dropped first PMI may be generated on the basis of a predefined first PMI.

The UL channel may be a physical uplink control channel (PUCCH).

The UL channel may be a physical uplink shared channel (PUSCH), and the priority may be applied to collision of CSIs of different carriers.

It is to be understood that both the foregoing general description and the following detailed description of the present invention are exemplary and explanatory and are intended to provide further explanation of the invention as claimed.

As apparent from the above description, exemplary embodiments of the present invention have the following effects. The embodiments of the present invention provide a method and apparatus for configuring and transmitting feedback information used for correctly and efficiently supporting MIMO operation based on an extended antenna configuration.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 5 shows a physical layer (L1) and a MAC layer (L2) of a multi-carrier supported system;

FIG. 6 is a conceptual diagram illustrating downlink (DL) and uplink (UL) component carriers (CCs);

FIG. 9 is a conceptual diagram illustrating maximum transmission power for single antenna transmission and MIMO transmission;

FIG. 10 is a conceptual diagram illustrating a MIMO communication system;

FIG. 11 is a conceptual diagram illustrating a general CDD structure for use in a MIMO system;

DETAILED DESCRIPTION OF THE INVENTION

Figure 1:
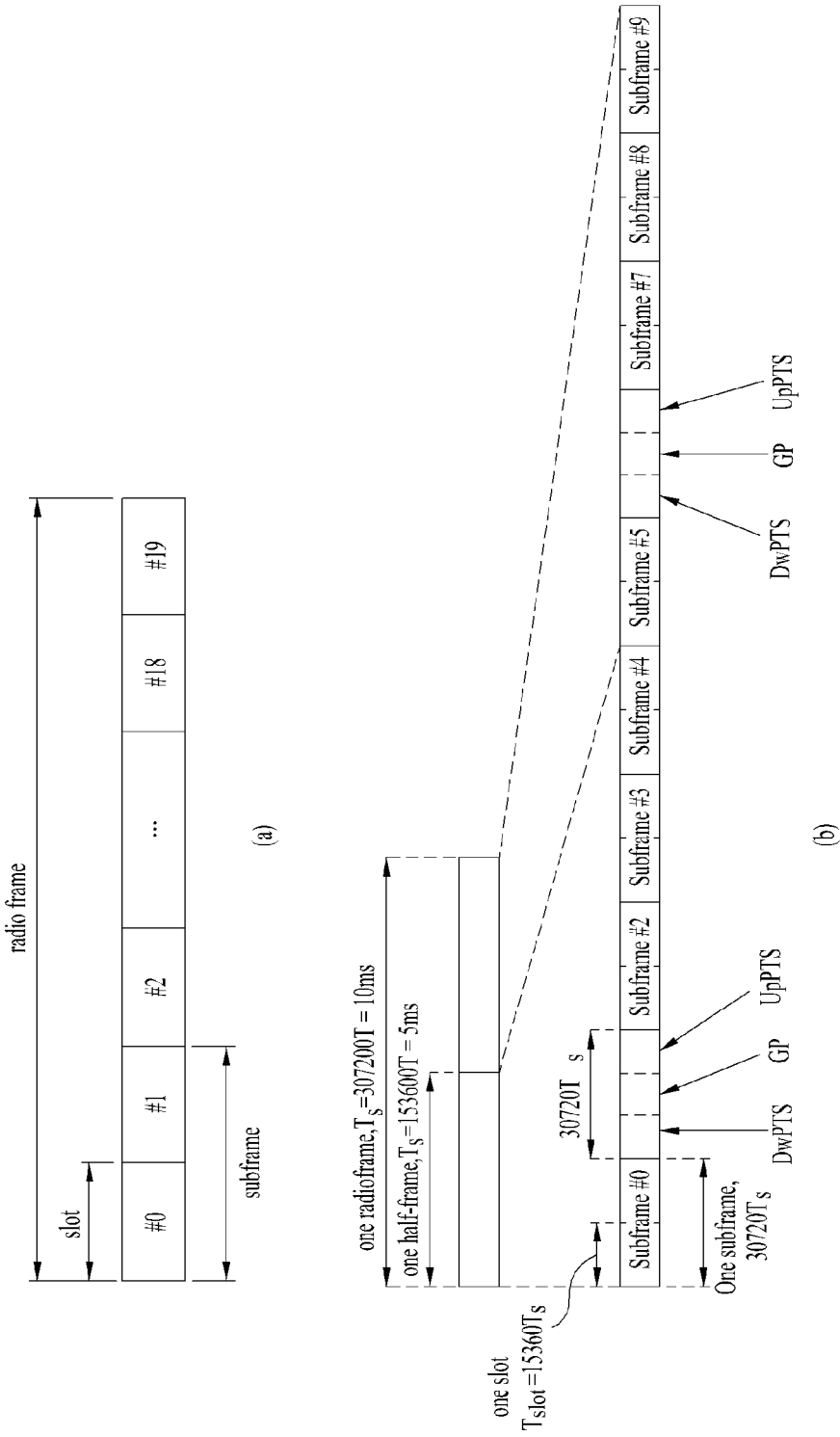
FIG. 1 exemplarily shows a radio frame structure for use in a 3rd Generation Partnership Project Long Term Evolution (3GPP LTE) system.

The following embodiments are proposed by combining constituent components and characteristics of the present invention according to a predetermined format. The individual constituent components or characteristics should be considered to optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communications)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on 3GPP LTE and 3GPP LTE-A systems. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplexing (FDD) and a type 2 radio frame structure applicable to Time Division Duplexing (TDD).

FIG. 1(a) is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency domain. Since the 3GPP LTE system uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
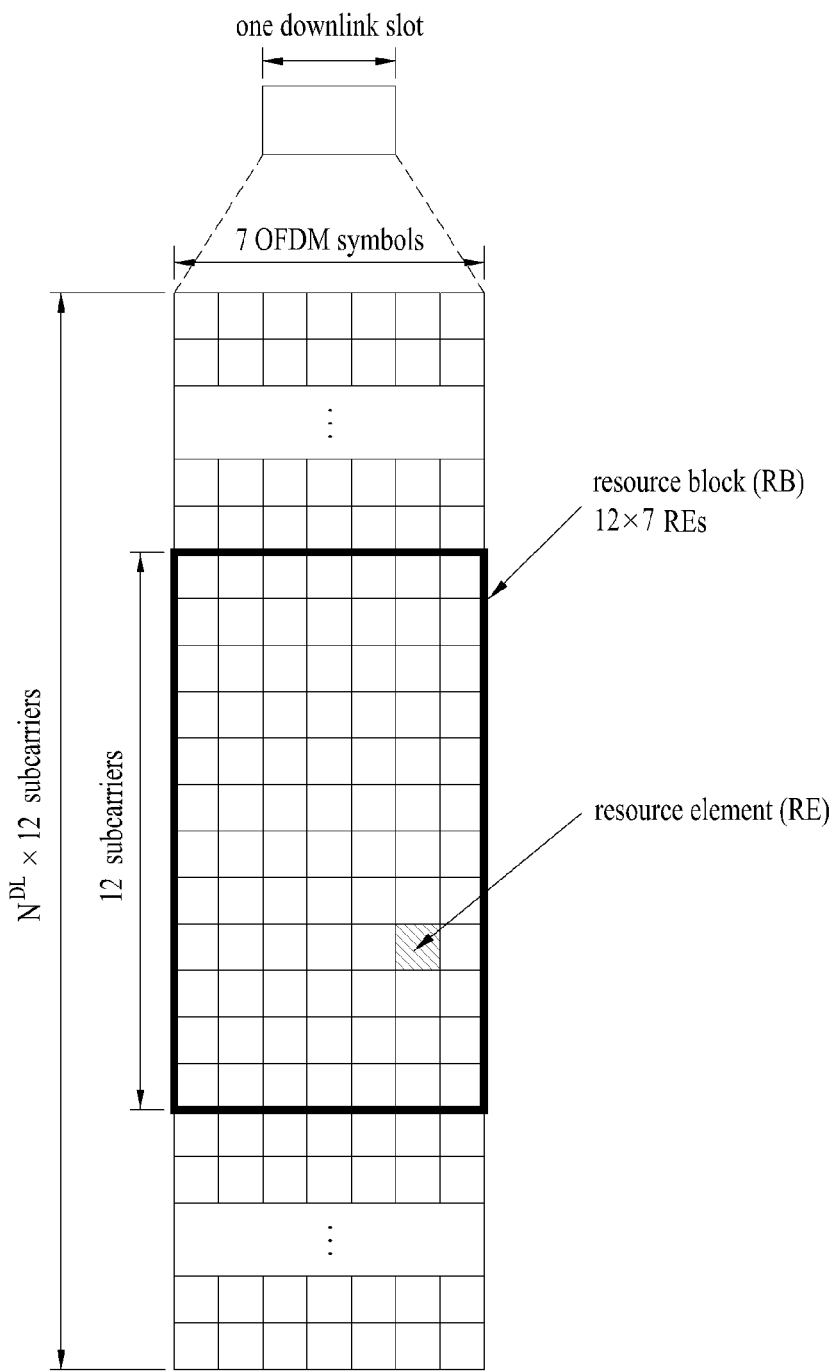
FIG. 2 exemplarily shows a resource grid of a downlink (DL) slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
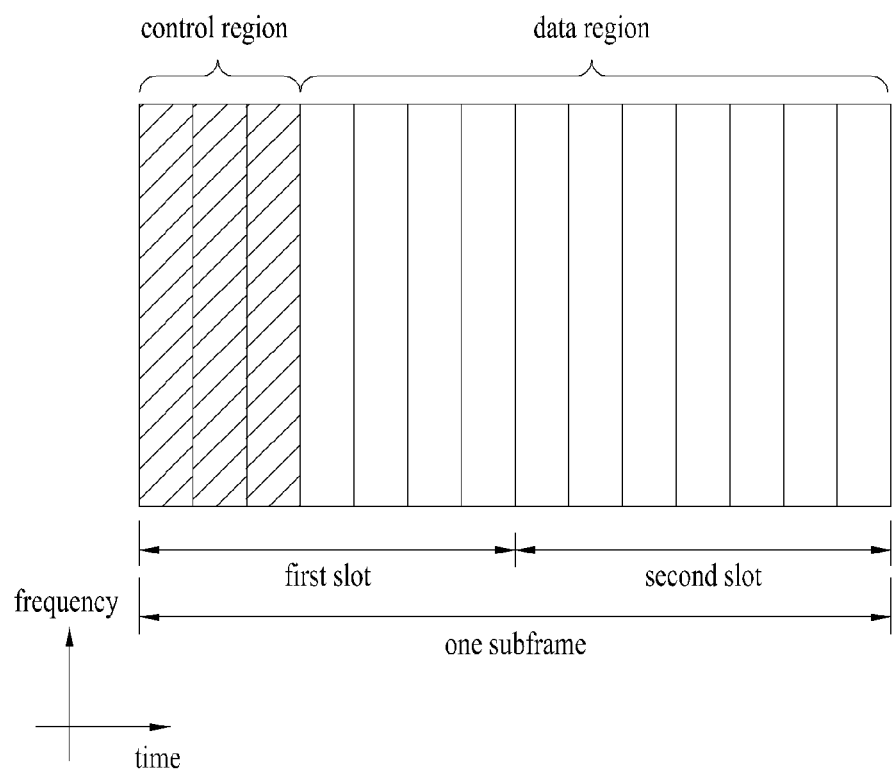
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
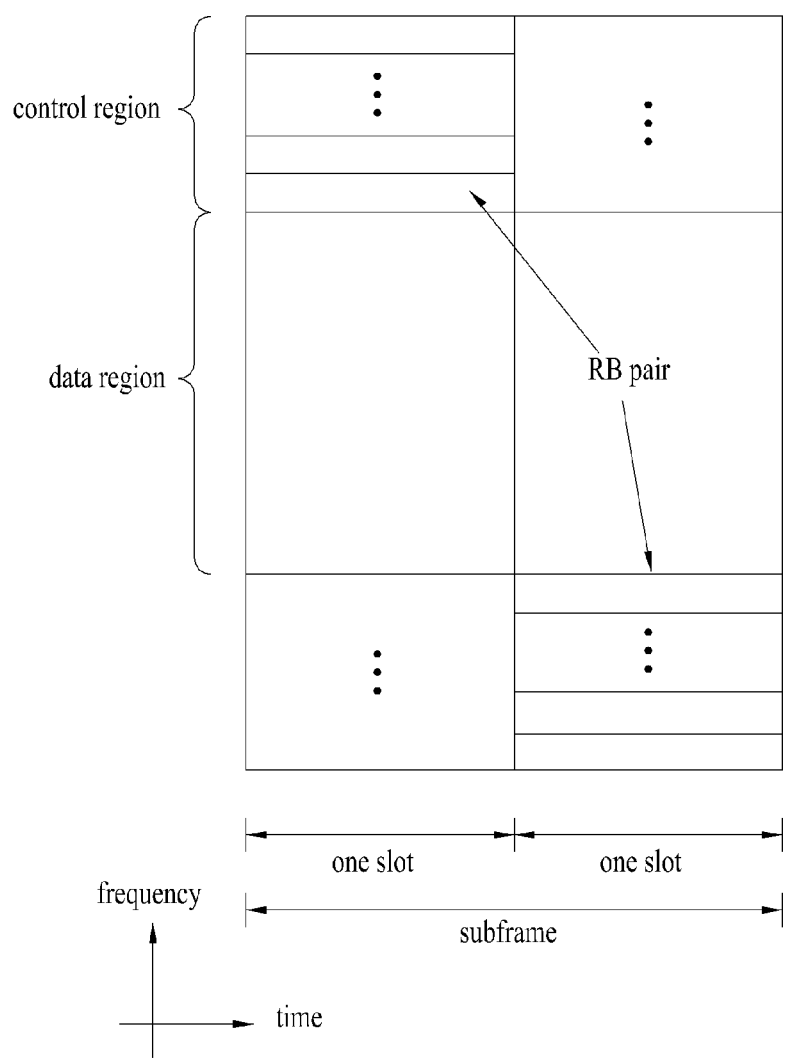
FIG. 4 is an uplink (UL) subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Carrier Aggregation

Although downlink and uplink bandwidths are different from each other, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is difficult throughout most of the world. Accordingly, a technology for efficiently using small segmented bands, known as carrier aggregation (bandwidth aggregation) or spectrum aggregation, has been developed in order to aggregate a plurality of physical bands to a wider logical band.

Carrier aggregation was introduced to support increased throughput, prevent cost increase caused by introduction of wideband RF devices, and ensure compatibility with legacy systems. Carrier aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs). Carrier aggregation using one or more CCs may be applied to each of downlink and uplink. Carrier aggregation may support a system bandwidth of up to 100 MHz by aggregating up to five CCs each having a bandwidth of 5, 10 or 20 MHz.

A downlink CC and an uplink CC may be represented as a DL CC and a UL CC, respectively. A carrier or CC may be represented as a cell in terms of function in the 3GPP LTE system. Thus, a DL CC and a UL CC may be referred to as a DL cell and a UL cell, respectively. Hereinbelow, the terms 'carriers', 'component carriers', 'CCs' or 'cells' will be used to signify a plurality of carriers to which carrier aggregation is applied.

While the following description exemplarily uses an eNB (BS) or cell as a downlink transmission entity and exemplarily uses a UE as an uplink transmission entity, the scope or spirit of the present invention is not limited thereto. That is, even when a relay node (RN) may be used as a downlink transmission entity from an eNB to a UE and or be used as an uplink reception entity from a UE to an eNB, or even when the RN may be used an uplink transmission entity for a UE or be used as a downlink reception entity from an eNB, it should be noted that the embodiments of the present invention can be applied without difficulty.

Downlink carrier aggregation may be described as an eNB supporting downlink transmission to a UE in frequency resources (subcarriers or physical resource blocks [PRBs]) of one or more carrier bands in time resources (allocated in units of a subframe). Uplink carrier aggregation may be described as a UE supporting uplink transmission to an eNB in frequency resources (subcarriers or PRBs) of one or more carrier bands in time resources (allocated in units of a subframe).

FIG. 5 shows a physical layer (first layer, L1) and a MAC layer (second layer, L2) of a multi-carrier supported system. Referring to FIG. 5, an eNB or BS of the legacy wireless communication system supporting a single carrier includes one physical layer (PHY) entity capable of supporting one carrier, and one medium access control (MAC) entity for controlling one PHY entity may be provided to the eNB. For example, baseband processing may be carried out in the PHY layer. For example, the L1/L2 scheduler operation including not only MAC PDU (Protocol Data Unit) creation of a transmitter but also MAC/RLC sub-layers may be carried out in the MAC layer. The MAC PDU packet block of the MAC layer is converted into a transport block through a logical transport layer, such that the resultant transport block is mapped to a physical layer input information block. In FIG. 5, the MAC layer is represented as the entire L2 layer, and may conceptually cover MAC/RLC/PDCP sub-layers. For convenience of description and better understanding of the present invention, the above-mentioned application may be used interchangeably in the MAC layer description of the present invention.

On the other hand, a multicarrier-supporting system may provide a plurality of MAC-PHY entities. In more detail, as can be seen from FIG. 5(a), the transmitter and receiver of the multicarrier-supporting system may be configured in such a manner that one MAC-PHY entity is mapped to each of n component carriers (n CCs). An independent PHY layer and an independent MAC layer are assigned to each CC, such that a PDSCH for each CC may be created in the range from the MAC PDU to the PHY layer.

Alternatively, the multicarrier-supporting system may provide one common MAC entity and a plurality of PHY entities. That is, as shown in FIG. 5(b), the multicarrier-supporting system may include the transmitter and the receiver in such a manner that n PHY entities respectively correspond to n CCs and one common MAC entity controlling the n PHY entities may be present in each of the transmitter and the receiver. In this case, a MAC PDU from one MAC layer may be branched into a plurality of transport blocks corresponding to a plurality of CCs through a transport layer. Alternatively, when generating a MAC PDU in the MAC layer or when generating an RLC PDU in the RLC layer, the MAC PDU or RLC PDU may be branched into individual CCs. As a result, a PDSCH for each CC may be generated in the PHY layer.

PDCCH for transmitting L1/L2 control signaling control information generated from a packet scheduler of the MAC layer may be mapped to physical resources for each CC, and then transmitted. In this case, PDCCH that includes control information (DL assignment or UL grant) for transmitting PDSCH or PUSCH to a specific UE may be separately encoded at every CC to which the corresponding PDSCH/PUSCH is transmitted. The PDCCH may be called a separate coded PDCCH. On the other hand, PDSCH/PUSCH transmission control information of several CCs may be configured in one PDCCH such that the configured PDCCH may be transmitted. This PDCCH may be called a joint coded PDCCH.

To support carrier aggregation, connection between a BS (or eNB) and a UE (or RN) needs to be established and preparation of connection setup between the BS and the UE is needed in such a manner that a control channel (PDCCH or PUCCH) and/or a shared channel (PDSCH or PUSCH) can be transmitted. In order to perform the above-mentioned connection or connection setup for a specific UE or RN, measurement and/or reporting for each carrier are needed, and CCs serving as the measurement and/or reporting targets may be assigned. In other words, CC assignment means that CCs (indicating the number of CCs and indexes of CCs) used for DL/UL transmission are established in consideration of not only capabilities of a specific UE (or RN) from among UL/DL CCs constructed in the BS but also system environment.

In this case, when CC assignment is controlled in third layer (L3) Radio Resource Management (RRM), UE-specific or RN-specific RRC signaling may be used. Alternatively, cell-specific or cell cluster-specific RRC signaling may be used. Provided that dynamic control such as a series of CC activation/deactivation settings is needed for CC assignment, a predetermined PDCCH may be used for L1/L2 control signaling, or a dedicated physical control channel for CC assignment control information or an L2 MAC-message formatted PDSCH may be used. On the other hand, if CC assignment is controlled by a packet scheduler, a predetermined PDCCH may be used for L1/L2 control signaling, a physical control channel dedicated for CC assignment control information may be used, or a PDSCH configured in the form of an L2 MAC message may be used.

FIG. 6 is a conceptual diagram illustrating downlink (DL) and uplink (UL) component carriers (CCs). Referring to FIG. 6, DL and UL CCs may be assigned from an eNB (cell) or RN. For example, the number of DL CCs may be set to N and the number of UL CCs may be set to M.

Through the UE's initial access or initial deployment process, after RRC connection is established on the basis of one certain CC for DL or UL (cell search) (for example, system information acquisition/reception, initial random access process, etc.), a unique carrier setup for each UE may be provided from a dedicated signaling (UE-specific RRC signaling or UE-specific L1/L2 PDCCH signaling). For example, assuming that a carrier setup for UE is commonly achieved in units of an eNB (cell or cell-cluster), the UE carrier setup may also be provided through cell-specific RRC signaling or cell-specific UE-common L1/L2 PDCCH signaling. In another example, carrier component information for use in an eNB may be signaled to a UE through system information for RRC connection setup, or may also be signaled to additional system information or cell-specific RRC signaling upon completion of the RRC connection setup.

While DL/UL CC setup has been described, centering on the relationship between an eNB and a UE, to which the present invention is not limited, an RN may also provide DL/UL CC setup to a UE contained in an RN region. In addition, in association with an RN contained in an eNB region, the eNB may also provide DL/UL CC setup of the corresponding RN to the RN of the eNB region. For clarity, while the following description will disclose DL/UL CC setup on the basis of the relationship between the eNB and the UE, it should be noted that the same content may also be applied to the relationship between the RN and the UE (i.e., access uplink and downlink) or the relation between the eNB and the RN (backhaul uplink or downlink) without departing from the scope or spirit of the present invention.

When the above-mentioned DL/UL CCs are uniquely assigned to individual UEs, DL/UL CC linkage may be implicitly or explicitly configured through a certain signaling parameter definition.

Figure 7:
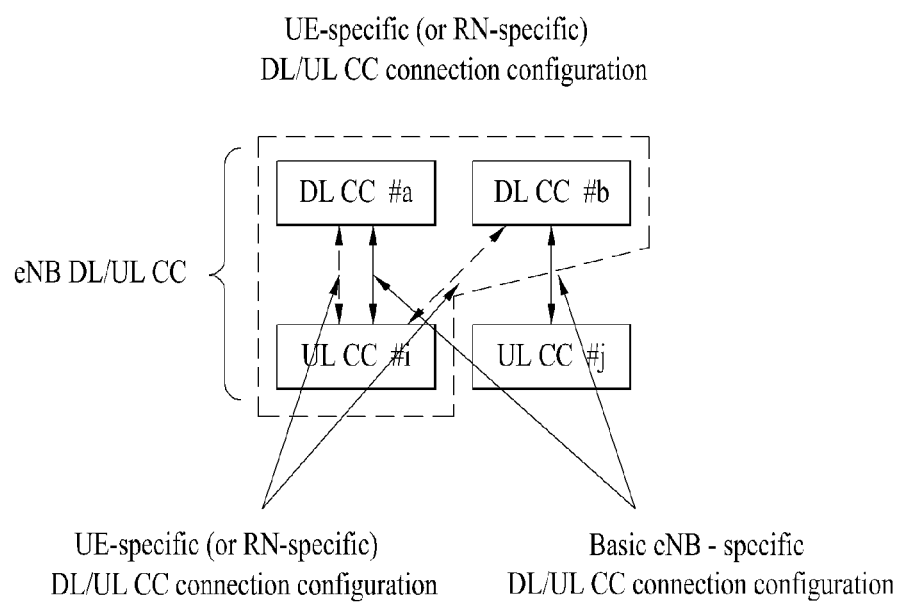
FIG. 7 shows an exemplary linkage of DL/UL CCs.

FIG. 7 shows an exemplary linkage of DL/UL CCs. In more detail, when an eNB configures two DL CCs (DL CC #a and DL CC #b) and two UL CCs (UL CC #i and UL CC #j), FIG. 6 shows a DL/UL CC linkage defined when two DL CCs (DL CC #a and DL CC #b) and one UL CC (UL CC #i) are assigned to a certain UE.

In a DL/UL CC linkage setup shown in FIG. 7, a solid line indicates a linkage setup between DL CC and UL CC that are basically constructed by an eNB, and this linkage setup between DL CC and UL CC may be defined in "System Information Block (SIB) 2". In the DL/UL CC linkage setup shown in FIG. 7, a dotted line indicates a linkage setup between DL CC and UL CC configured in a specific UE. The above-mentioned DL CC and UL CC linkage setup shown in FIG. 7 is disclosed only for illustrative purposes, and the scope or spirit of the present invention is not limited thereto. That is, in accordance with various embodiments of the present invention, the number of DL CCs or UL CCs configured by an eNB may be set to an arbitrary number. Thus, the number of UE-specific DL CCs or the number of UE-specific UL CCs in the above-mentioned DL CCs or UL CCs may be set to an arbitrary number, and associated DL/UL CC linkage may be defined in a different way from that of FIG. 7.

Further, from among DL CCs and UL CCs configured or assigned, a primary CC (PCC), or a primary cell (P-cell) or an anchor CC (also called an anchor cell) may be configured. For example, a DL PCC (or DL P-cell) aiming to transmit configuration/reconfiguration information on RRC connection setup may be configured. In another example, UL CC for transmitting PUCCH to be used when a certain UE transmits UCI that must be transmitted on uplink may be configured as UL PCC (or UL P-cell). For convenience of description, it is assumed that one DL PCC (P-cell) and one UL PCC (P-cell) are basically assigned to each UE. Alternatively, if a large number of CCs is assigned to UE or if CCs can be assigned from a plurality of eNBs, one or more DL PCCs (P-cells) and/or one or more UL PCCs (P-cells) may be assigned from one or more eNBs to a certain UE. For linkage between DL PCC (P-cell) and UL PCC (P-cell), a UE-specific configuration method may be considered by the eNB as necessary. To implement a more simplified method, a linkage between DL PCC (P-cell) and UL PCC (P-cell) may be configured on the basis of the relationship of basic linkage that has been defined in LTE Release-8 (LTE Rel-8) and signaled to System Information Block (or Base) 2. DL PCC (P-cell) and UL PCC (P-cell) for the above-mentioned linkage configuration are grouped so that the grouped result may be denoted by a UE-specific P-cell.

SC-FDMA Transmission and OFDMA Transmission

Figure 8:
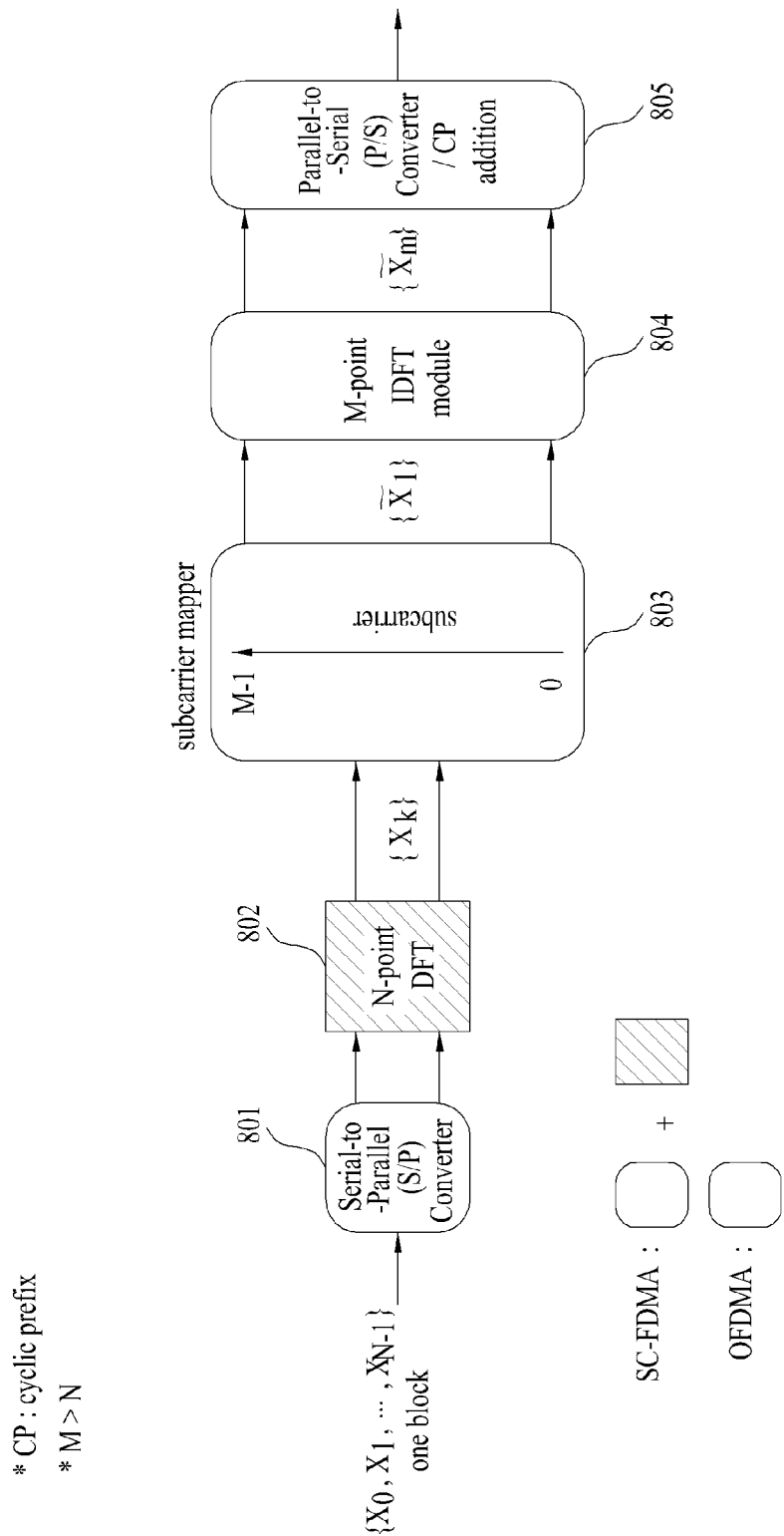
FIG. 8 is a conceptual diagram illustrating an SC-FDMA transmission scheme and an OFDMA transmission scheme.

FIG. 8 is a conceptual diagram illustrating an SC-FDMA transmission scheme and an OFDMA transmission scheme for use in a mobile communication system. The SC-FDMA transmission scheme may be used for UL transmission and the OFDMA transmission scheme may be used for DL transmission.

Each of the UL signal transmission entity (e.g., UE) and the DL signal transmission entity (e.g., eNB) may include a Serial-to-Parallel (S/P) Converter 801, a subcarrier mapper 803, an M-point Inverse Discrete Fourier Transform (IDFT) module 804, and a Parallel-to-Serial Converter 805. Each input signal that is input to the S/P converter 801 may be a channel coded and modulated data symbol. However, a user equipment (UE) for transmitting signals according to the SC-FDMA scheme may further include an N-point Discrete Fourier Transform (DFT) module 802. The influence of IDFT processing of the M-point IDFT module 804 is considerably offset, such that a transmission signal may be designed to have a single carrier property. That is, the DFT module 802 performs DFT spreading of an input data symbol such that a single carrier property requisite for UL transmission may be satisfied. The SC-FDMA transmission scheme basically provides good or superior Peak to Average Power ratio (PAPR) or Cubic Metric (CM), such that the UL transmitter can more effectively transmit data or information even in the case of the power limitation situation, resulting in an increase in user throughput.

FIG. 9 is a conceptual diagram illustrating maximum transmission power for single antenna transmission and MIMO transmission. FIG. 9(a) shows the case of single antenna transmission. As can be seen from FIG. 9(a), one power amplifier (PA) may be provided to one antenna. In FIG. 9(a), an output signal ($P_{max}$) of the power amplifier (PA) may have a specific value, for example, 23 dBm. In contrast, FIGS. 9(b) and 9(c) show the case of MIMO transmission. As can be seen from FIGS. 9(b) and 9(c), several PAs may be mapped to respective transmission (Tx) antennas. For example, provided that the number of transmission (Tx) antennas is set to 2, 2 PAs may be mapped to respective transmission (Tx) antennas. The setting of output values (i.e., maximum transmission power) of 2 PAs may be configured in different ways as shown in FIGS. 9(b) and 9(c).

In FIG. 9(b), maximum transmission power ($P_{max}$) for single antenna transmission may be divisionally applied to PA1 and PA2. That is, if a transmission power value of x [dBm] is assigned to PA1, a transmission power value of ($P_{max}$−x) [dBm] may be applied to PA2. In this case, since total transmission power ($P_{max}$) is maintained, the transmitter may have higher robustness against the increasing PAPR in the power limitation situation.

On the other hand, as can be seen from FIG. 9(c), only one Tx antenna (ANT1) may have a maximum transmission power value ($P_{max}$), and the other Tx antenna (ANT2) may have a half value ($P_{max}/2$) of the maximum transmission power value ($P_{max}$). In this case, only one transmission antenna may have higher robustness against increasing PAPR.

MIMO System

MIMO technology is not dependent on one antenna path to receive one message, collects a plurality of data pieces received via several antennas, and completes total data. As a result, MIMO technology can increase a data transfer rate within a specific range, or can increase a system range at a specific data transfer rate. Under this situation, MIMO technology is a next-generation mobile communication technology capable of being widely applied to mobile communication terminals or RNs. MIMO technology can extend the range of data communication, so that it can overcome the limited amount of transmission (Tx) data of mobile communication systems reaching a critical situation.

FIG. 10(a) is a block diagram illustrating a general MIMO communication system. Referring to FIG. 10(a), if the number of transmission (Tx) antennas increases to $N_T$, and at the same time the number of reception (Rx) antennas increases to $N_R$, a theoretical channel transmission capacity of the MIMO communication system increases in proportion to the number of antennas, differently from the above-mentioned case in which only a transmitter or receiver uses several antennas, so that transfer rate and frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four transmission (Tx) antennas and four reception (Rx) antennas, the MIMO system can theoretically acquire a high transfer rate which is four times higher than that of a one antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 10(a), it is assumed that there are $N_T$ transmission (Tx) antennas and $N_R$ reception (Rx) antennas. In the case of a transmission (Tx) signal, a maximum number of transmission information pieces is $N_T$ under the condition that $N_T$ transmission (Tx) antennas are used, so that the transmission (Tx) information can be represented by a specific vector shown in the following equation 2.

$$s = [s_1, s_2, \ldots, s_{N_T}]^T \quad \text{[Equation 2]}$$

In the meantime, individual transmission (Tx) information pieces ($s_1, s_2, \ldots, s_{N_T}$) may have different transmission powers. In this case, if the individual transmission powers are denoted by ($P_1, P_2, \ldots, P_{N_T}$) transmission (Tx) information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission (Tx) power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix (W), so that $N_T$ transmission (Tx) signals ($x_1, x_2, \ldots, x_{N_T}$) to be actually transmitted are configured. In this case, the weight matrix (W) is adapted to properly distribute transmission (Tx) information to individual antennas according to transmission channel situations. The above-mentioned transmission (Tx) signals ($x_1, x_2, \ldots, x_{N_T}$) can be represented by the following equation 5 using the vector (X).

$$x = \quad \text{[Equation 5]}$$

$$\begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

Next, if $N_R$ reception (Rx) antennas are used, reception (Rx) signals ($y_1, y_2, \ldots, Y_{N_R}$) of individual antennas can be represented by a specific vector (y) shown in the following equation 6.

$$y = [y_1, y_2, \ldots, y_{N_R}]^T \quad \text{[Equation 6]}$$

In the meantime, if a channel modeling is executed in the MIMO communication system, individual channels can be distinguished from each other according to transmission/reception (Tx/Rx) antenna indexes. A specific channel passing the range from a transmission (Tx) antenna (j) to a reception (Rx) antenna (i) is denoted by $h_{ij}$. In this case, it should be noted that the index order of the channel $h_{ij}$ is located before a reception (Rx) antenna index and is located after a transmission (Tx) antenna index.

Several channels are tied up, so that they are displayed in the form of a vector or matrix. An exemplary vector is as follows. FIG. 10(b) shows channels from $N_T$ transmission (Tx) antennas to a reception (Rx) antenna (i).

Referring to FIG. 10(b), the channels passing the range from the $N_T$ transmission (Tx) antennas to the reception (Rx) antenna (i) can be represented by the following equation 7.

$$h_i^T = [h_{i1}, h_{i2}, \ldots, h_{iN_T}] \quad \text{[Equation 7]}$$

If all channels passing the range from the $N_T$ transmission (Tx) antennas to $N_R$ reception (Rx) antennas are denoted by the matrix shown in Equation 7, the following equation 8 is acquired.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive white Gaussian noise (AWGN) is added to an actual channel which has passed the channel matrix (H) shown in Equation 8. The AWGN ($n_1, n_2, \ldots, n_{N_R}$) added to each of $N_R$ reception (Rx) antennas can be represented by a specific vector shown in the following equation 9.

$$n = [n_1, n_2, \ldots, n_{N_R}]^T \quad \text{[Equation 9]}$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix. Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \leq \min(N_T, N_R) \quad \text{[Equation 11]}$$

A variety of MIMO transmission/reception (Tx/Rx) schemes may be used for operating the MIMO system, for example, frequency switched transmit diversity (FSTD), Space Frequency Block Coding (SFBC), Space Time Block Coding (STBC), Cyclic Delay Diversity (CDD), time switched transmit diversity (TSTD), etc. In case of Rank 2 or higher, Spatial Multiplexing (SM), Generalized Cyclic Delay Diversity (GCDD), Selective Virtual Antenna Permutation (S-VAP), etc. may be used.

The FSTD scheme serves to allocate subcarriers having different frequencies to signals transmitted through multiple antennas so as to obtain diversity gain. The SFBC scheme efficiently applies selectivity of a spatial region and a frequency region so as to obtain diversity gain and multiuser scheduling gain. The STBC scheme applies selectivity of a spatial domain and a time region. The CDD scheme serves to obtain diversity gain using path delay between transmission antennas. The TSTD scheme serves to temporally divide signals transmitted through multiple antennas. The spatial multiplexing scheme serves to transmit different data through different antennas so as to increase a transfer rate. The GCDD scheme serves to apply selectivity of a time region and a frequency region. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

In case of the STBC scheme from among the above-mentioned MIMO transmission schemes, the same data symbol is repeated to support orthogonality in a time domain so that time diversity can be obtained. Similarly, the SFBC scheme enables the same data symbol to be repeated to support orthogonality in a frequency domain so that frequency diversity can be obtained. An exemplary time block code used for STBC and an exemplary frequency block code used for SFBC are shown in Equation 12 and Equation 13, respectively. Equation 12 shows a block code of the case of 2 transmission (Tx) antennas, and Equation 13 shows a block code of the case of 4 transmission (Tx) antennas.

$$\frac{1}{\sqrt{2}} \begin{pmatrix} S_1 & S_2 \\ -S_2^* & S_1^* \end{pmatrix} \quad \text{[Equation 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In Equations 12 and 13, $S_i$ (i=1, 2, 3, 4) means a modulated data symbol. In addition, each row of the matrixes of Equation 12 and 13 may indicate an antenna port, and each column may indicate time (in case of STBC) or frequency (in case of SFBC).

On the other hand, the CDD scheme from among the above-mentioned MIMO transmission schemes mandatorily increases delay spread so as to increase frequency diversity. FIG. 11 is a conceptual diagram illustrating a general CDD structure for use in the MIMO system. FIG. 11(a) shows a method for applying cyclic delay to a time domain. If necessary, the CDD scheme based on the cyclic delay of FIG. 11(a) may also be implemented as phase-shift diversity of FIG. 11(b).

Figure 12:
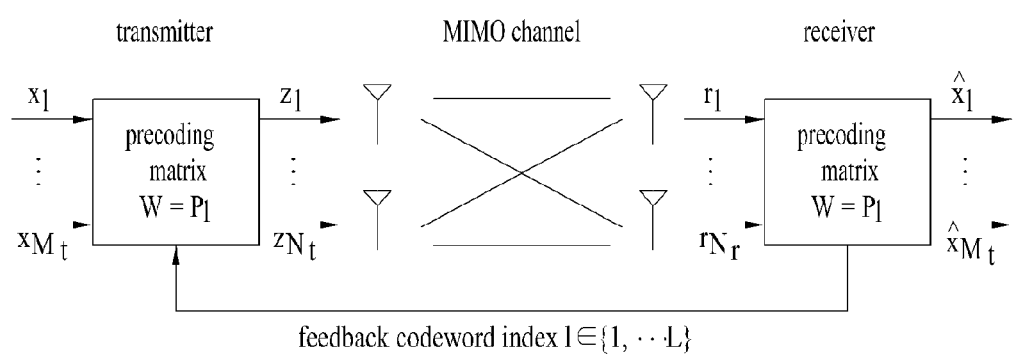
FIG. 12 is a conceptual diagram illustrating codebook-based precoding.

In association with the above-mentioned MIMO transmission techniques, the codebook-based precoding method will hereinafter be described with reference to FIG. 12. FIG. 12 is a conceptual diagram illustrating codebook-based pre coding.

In accordance with the codebook-based precoding scheme, a transceiver may share codebook information including a predetermined number of precoding matrixes according to a transmission rank, the number of antennas, etc. That is, if feedback information is infinite, the precoding-based codebook scheme may be used. The receiver measures a channel status through a reception signal, so that an infinite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likelihood) or MMSE (Minimum Mean Square Error) scheme. Although the receiver shown in FIG. 12 transmits precoding matrix information for each codeword to the transmitter, the scope or spirit of the present invention is not limited thereto.

Upon receiving feedback information from the receiver, the transmitter may select a specific preceding matrix from a codebook on the basis of the received information. The transmitter that has selected the preceding matrix performs a precoding operation by multiplying the selected precoding matrix by as many layer signals as the number of transmission ranks, and may transmit each precoded Tx signal over a plurality of antennas. If the receiver receives the precoded signal from the transmitter as an input, it performs inverse processing of the precoding having been conducted in the transmitter so that it can recover the reception (Rx) signal.

Generally, the precoding matrix satisfies a unitary matrix (U) such as (U*U$^H$=I), so that the inverse processing of the above-mentioned preceding may be conducted by multiplying a Hermit matrix (P$^H$) of the precoding matrix H used in the precoding of the transmitter by the reception (Rx) signal.

Physical Uplink Control Channel (PUCCH)

PUCCH including UL control information will hereinafter be described in detail.

A plurality of UE control information pieces may be transmitted through a PUCCH. When Code Division Multiplexing (CDM) is performed in order to discriminate signals of UEs, a Constant Amplitude Zero Autocorrelation (CAZAC) sequence having a length of 12 is mainly used. Since the CAZAC sequence has a property that a constant amplitude is maintained in a time domain and a frequency domain, a Peak-to-Average Power Ratio (PAPR) of a UE or Cubic Metic (CM) may be decreased to increase coverage. In addition, ACK/NACK information for DL data transmitted through the PUCCH may be covered using an orthogonal sequence.

In addition, control information transmitted through the PUCCH may be discriminated using cyclically shifted sequences having different cyclic shift values. A cyclically shifted sequence may be generated by cyclically shifting a basic sequence (also called a base sequence) by a specific cyclic shift (CS) amount. The specific CS amount is indicated by a CS index. The number of available CSs may be changed according to channel delay spread. Various sequences may be used as the basic sequence and examples thereof include the above-described CAZAC sequence.

PUCCH may include a variety of control information, for example, a Scheduling Request (SR), DL channel measurement information, and ACK/NACK information for DL data transmission. The channel measurement information may include a Channel Quality Indicator (CQI), a Precoding Matrix Index (PMI), and a Rank Indicator (RI).

PUCCH format may be defined according to the type of control information contained in a PUCCH, modulation scheme information thereof, etc. That is, PUCCH format 1 may be used for SR transmission, PUCCH format 1a or 1b may be used for HARQ ACK/NACK transmission, PUCCH format 2 may be used for CQI transmission, and PUCCH format 2a/2b may be used for HARQ ACK/NACK transmission.

If HARQ ACK/NACK is transmitted alone in an arbitrary subframe, PUCCH format 1a or 1b may be used. If SR is transmitted alone, PUCCH format 1 may be used. The UE may transmit the HARQ ACK/NACK and the SR through the same subframe, and a detailed description thereof will hereinafter be described in detail.

PUCCH format may be summarized as shown in Table 1.

TABLE 1

| PUCCH format | Modulation scheme | Number of bits per subframe | Usage | etc. |
| --- | --- | --- | --- | --- |
| 1 | N/A | N/A | SR (Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

Figure 13:
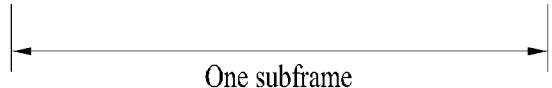
FIG. 13 shows a resource mapping structure of PUCCH.

FIG. 13 shows a PUCCH resource mapping structure for use in a UL physical resource block (PRB). N$_{RB}^{UL}$ is the number of resource blocks (RBs) for use in uplink (UL), and n$_{PRB}$ is a physical resource block (PRB) number. PUCCH may be mapped to both edges of a UL frequency block. CQI resources may be mapped to a PRB located just after the edge of a frequency band, and ACK/NACK may be mapped to this PRB.

PUCCH format 1 may be a control channel used for SR transmission. SR (Scheduling Request) may be transmitted in such a manner that SR is requested or not requested.

PUCCH format 1a/1b is a control channel used for ACK/NACK transmission. In the PUCCH format 1a/1b, a symbol modulated using the BPSK or QPSK modulation scheme is multiplied by a CAZAC sequence of length 12. Upon completion of the CAZAC sequence multiplication, the resultant symbol is blockwise-spread as an orthogonal sequence. A Hadamard sequence of length 4 is applied to general ACK/NACK information, and a DFT (Discrete Fourier Transform) sequence of length 3 is applied to the shortened ACK/NACK information and a reference signal. A Hadamard sequence of length 2 may be applied to the reference signal for the extended CP.

The UE may also transmit HARQ ACK/NACK and SR through the same subframe. For positive SR transmission, the UE may transmit HARQ ACK/NACK information through resources allocated for the SR. For negative SR transmission, the UE may transmit HARQ ACK/NACK information through resources allocated for ACK/NACK information.

PUCCH format 2/2a/2b will hereinafter be described in detail. PUCCH format 2/2a/2b is a control channel for transmitting channel measurement feedback (CQI, PMI, RI).

The PUCCH format 2/2a/2b may support modulation based on a CAZAC sequence, and a QPSK-modulated symbol may be multiplied by a CAZAC sequence of length 12. Cyclic shift (CS) of the sequence may be changed between a symbol and a slot. For a reference signal (RS), orthogonal covering may be used.

Figure 14:
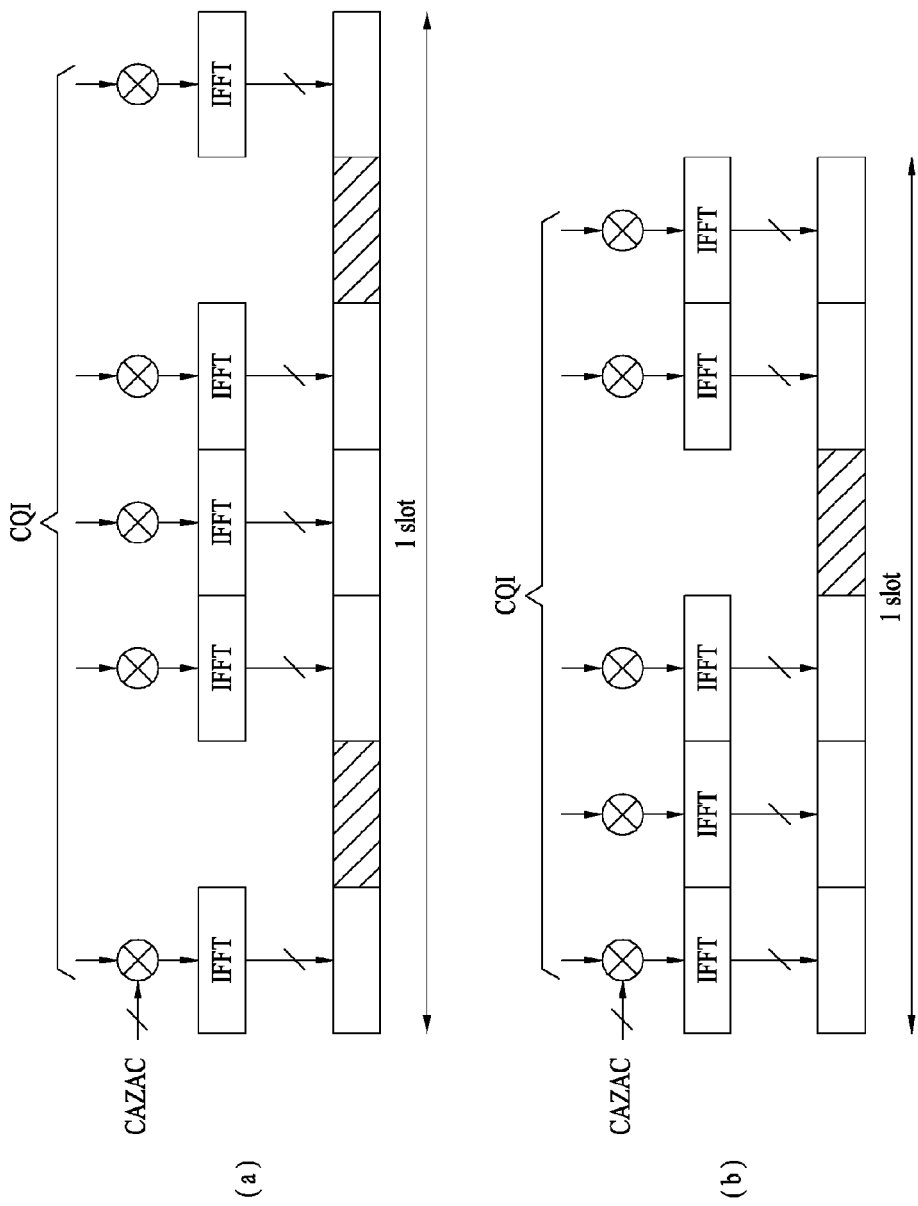
FIG. 14 shows a channel structure of a CQI information bit.
Figure 15:
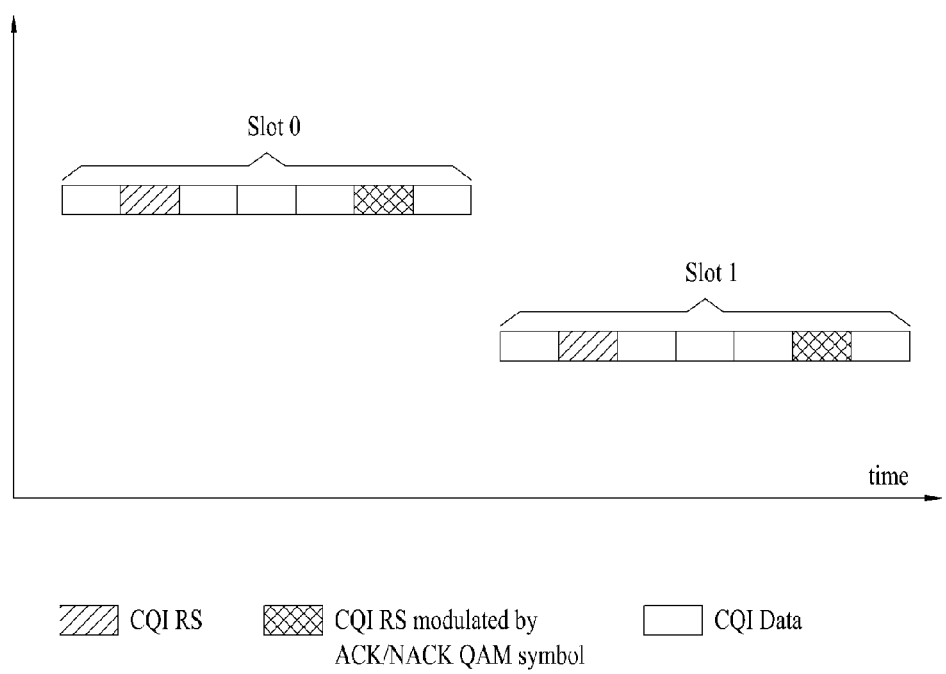
FIG. 15 is a conceptual diagram illustrating transmission of CQI and ACK/NACK information.

FIG. 14 shows a channel structure of a CQI information bit. The CQI bit may include one or more fields. For example, the CQI bit may include a CQI field indicating a CQI index for MCS decision, a PMI field indicating an index of a precoding matrix of a codebook, and an RI field indicating rank.

Referring to FIG. 14(a), a reference signal (RS) may be loaded on two SC-FDMA symbols spaced apart from each other by a predetermined distance corresponding to 3 SC-FDMA symbol intervals from among 7 SC-FDMA symbols contained in one slot, and CQI information may be loaded on the remaining 5 SC-FDMA symbols. The reason why two RSs may be used in one slot is to support a high-speed UE. In addition, each UE may be discriminated by a sequence. CQI symbols may be modulated in the entire SC-FDMA symbol, and the modulated CQI symbols may then be transmitted. The SC-FDMA symbol is composed of one sequence. That is, a UE performs CQI modulation using each sequence, and transmits the modulated result.

The number of symbols that can be transmitted to one TTI is set to 10, and CQI modulation is extended up to QPSK. If QPSK mapping is applied to the SC-FDMA symbol, a CQI value of 2 bits may be loaded on the SC-FDMA symbol, so that a CQI value of 10 bits may be assigned to one slot. Therefore, a maximum of 20-bit CQI value may be assigned to one subframe. A frequency domain spreading code may be used to spread CQI in a frequency domain.

CAZAC sequence (for example, a ZC sequence) may be used as a frequency domain spread code. In addition, another sequence having superior correlation characteristics may be used as the frequency domain spread code. Specifically, CAZAC sequences having different cyclic shift (CS) values may be applied to respective control channels, such that the CAZAC sequences may be distinguished from one another. IFFT may be applied to the frequency domain spread CQI.

FIG. 14(b) shows the example of PUCCH format 2/2a/2b transmission in case of the extended CP. One slot includes 6 SC-FDMA symbols. RS is assigned to one OFDM symbol from among 6 OFDM symbols of each slot, and a CQI bit may be assigned to the remaining 5 OFDM symbols. Except for the six SC-FDMA symbols, the example of the normal CP of FIG. 14(a) may be used without change.

Orthogonal covering applied to the RS of FIGS. 14(a) and 14(b) is shown in Table 2.

TABLE 2

| Normal CP | Extended CP |
|---|---|
| [1 1] | [1] |

Simultaneous transmission of CQI and ACK/NACK information will hereinafter be described with reference to Table 15.

In case of the normal CP, CQI and ACK/NACK information can be simultaneously transmitted using PUCCH format 2a/2b. ACK/NACK information may be transmitted through a symbol where CQI RS is transmitted. That is, a second RS for use in the normal CP may be modulated into an ACK/NACK symbol. In the case where the ACK/NACK symbol is modulated using the BPSK scheme as shown in the PUCCH format 1a, CQI RS may be modulated into the ACK/NACK symbol according to the BPSK scheme. In the case where the ACK/NACK symbol is modulated using the QPSK scheme as shown in the PUCCH format 1b, CQI RS may be modulated into the ACK/NACK symbol according to the QPSK scheme. On the other hand, in case of the extended CP, CQI and ACK/NACK information are simultaneously transmitted using the PUCCH format 2. For this purpose, CQI and ACK/NACK information may be jointcoded.

For details of PUCCH other than the above-mentioned description, the 3GPP standard document (e.g., 3GPP TS36.211 5.4) may be referred to, and detailed description thereof will herein be omitted for convenience of description. However, it should be noted that PUCCH contents disclosed in the above-mentioned standard document can also be applied to a PUCCH used in various embodiments of the present invention without departing from the scope or spirit of the present invention.

Channel Status Information (CSI) Feedback

In order to correctly perform MIMO technology, the receiver may feed back a rank indicator (RI), a precoding matrix index (PMI) and a channel quality indicator (CQI) to the transmitter. RI, PMI and CQI may be generically named Channel Status Information (CSI) as necessary. Alternatively, the term "CQI" may be used as the concept of channel information including RI, PMI and CQI.

Figure 16:
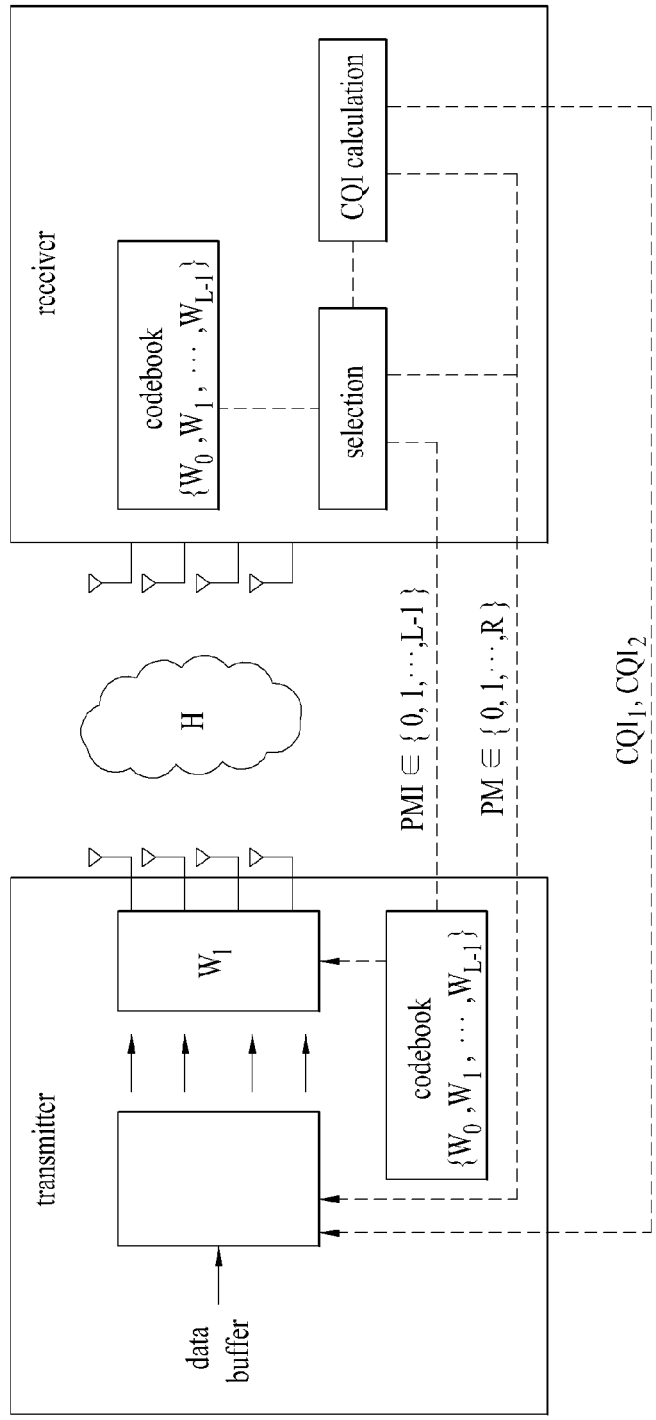
FIG. 16 is a conceptual diagram illustrating feedback of channel status information.

FIG. 16 is a conceptual diagram illustrating a feedback of channel status information.

Referring to FIG. 16, MIMO transmission data from the transmitter may be received at a receiver over a channel (H). The receiver may select a preferred precoding matrix from a codebook on the basis of the received signal, and may feed back the selected PMI to the transmitter. In addition, the receiver may measure a Signal-to-Interference plus Noise Ratio (SINR) of the reception (Rx) signal, calculate channel quality information (CQI), and feed back the calculated CQI to the transmitter. In addition, the receiver may measure a Signal-to-Interference plus Noise Ratio (SINR) of the reception (Rx) signal, calculate a CQI, and feed back the calculated SINR to the transmitter. In addition, the receiver may feed back a rank indicator (RI) of the Rx signal to the transmitter. The transmitter may determine the number of layers suitable for data transmission to the receiver and time/frequency resources, MCS (Modulation and Coding Scheme), etc. using RI and CQI information fed back from the receiver. In addition, the receiver may transmit the precoded Tx signal using the precoding matrix ($W_1$) indicated by a PMI fed back from the receiver over a plurality of antennas.

Channel status information will hereinafter be described in detail.

RI is information regarding a channel rank (i.e., the number of layers for data transmission of a transmitter). RI may be determined by the number of allocated Tx layers, and may be acquired from associated downlink control information (DCI).

PMI is information regarding a precoding matrix used for data transmission of a transmitter. The precoding matrix fed back from the receiver may be determined considering the number of layers indicated by RI. PMI may be fed back in case of closed-loop spatial multiplexing (SM) and large delay cyclic delay diversity (CDD). In the case of open-loop transmission, the transmitter may select a precoding matrix according to predetermined rules. A process for selecting a PMI for each rank (rank 1 to 4) is as follows. The receiver may calculate a post processing SINR in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI feedback from the receiver may use a preceding matrix recommended by the receiver. This fact may be contained as a 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information. For details of PMI, the 3GPP standard document (e.g., 3GPP TS36.211) may be referred to.

CQI is information regarding channel quality. CQI may be represented by a predetermined MCS combination. CQI index may be given as shown in the following table 3.

TABLE 3

| CQI Index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |

TABLE 3-continued

| CQI Index | modulation | code rate × 1024 | efficiency |
|---|---|---|---|
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Referring to Table 3, CQI index may be represented by 4 bits (i.e., CQI indexes of 0~15). Each CQI index may indicate a modulation scheme and a code rate.

A CQI calculation method will hereinafter be described. The following assumptions (1) to (5) for allowing a UE to calculate a CQI index are defined in the 3GPP standard document (e.g., 3GPP TS36.213).

(1) The first three OFDM symbols in one subframe are occupied by control signaling.

(2) Resource elements (REs) used by a primary synchronization signal, a secondary synchronization signal or a physical broadcast channel (PBCH) are not present.

(3) CP length of a non-MBSFN subframe is assumed.

(4) Redundancy version is set to zero (0).

(5) PDSCH transmission method may be dependent upon a current transmission mode (e.g., a default mode) configured in a UE.

(6) The ratio of PDSCH EPRE (Energy Per Resource Element) to a cell-specific reference signal EPRE may be given with the exception of $\rho_A$. (A detailed description of $\rho_A$ may follow the following assumption. Provided that a UE for an arbitrary modulation scheme may be set to a Transmission Mode 2 having four cell-specific antenna ports or may be set to a Transmission Mode 3 having an RI of 1 and four cell-specific antenna ports, $\rho_A$ may be denoted by $\rho_A = P_A + \Delta_{offset} + 10\log_{10}(2)$ [dB]. In the remaining cases, in association with an arbitrary modulation method and the number of arbitrary layers, $\rho_A$ may be denoted by $\rho_A = P_A + \Delta_{offset}$ [dB]. $\Delta_{offset}$ is given by a nomPDSCH-RS-EPRE-Offset parameter configured by higher layer signaling.)

Definition of the above-mentioned assumptions (1) to (5) may indicate that a CQI includes not only a CQI but also various information of a corresponding UE. That is, different CQI indexes may be fed back according to a throughput or performance of the corresponding UE at the same channel quality, so that it is necessary to define a predetermined reference for the above-mentioned assumption.

The UE may receive a downlink reference signal (DL RS) from an eNB, and recognize a channel status on the basis of the received DL RS. In this case, the RS may be a common reference signal (CRS) defined in the legacy 3GPP LTE system, and may be a Channel Status Information Reference Signal (CSI-RS) defined in a system (e.g., 3GPP LTE-A system) having an extended antenna structure. The UE may satisfy the assumption given for CQI calculation at a channel recognized through a reference signal (RS), and at the same time calculate a CQI index in which a Block Error Rate (BLER) is not higher than 10%. The UE may transmit the calculated CQI index to the eNB. The UE may not apply a method for improving interference estimation to a CQI index calculation process.

The process for allowing the UE to recognize a channel status and calculate an appropriate MCS may be defined in various ways in terms of UE implementation. For example, the UE may calculate a channel status or an effective SINR using a reference signal (RS). In addition, the channel status or the effective SINR may be measured on the entire system bandwidth (also called 'Set S') or may also be measured on some bandwidths (specific subband or specific RB). The CQI for the set S may be referred to as a Wideband WB CQI, and the CQI for some bandwidths may be referred to as a subband (SB) CQI. The UE may calculate the highest MCS on the basis of the calculated channel status or effective SINR. The highest MCS may indicate an MCS that satisfies the CQI calculation assumption without exceeding a transport block error rate of 10% during the decoding. The UE may determine a CQI index related to the calculated MCS, and may report the determined CQI index to the eNB.

Further, CQI-only transmission may be considered in which a UE transmits only a CQI. Aperiodic CQI transmission may be event-triggered upon receiving a request from the eNB. Such request from the eNB may be a CQI request defined by one bit of DCI format 0. In addition, for CQI-only transmission, MCS index ($I_{MCS}$) of 29 may be signaled as shown in the following table 4. In this case, the CQI request bit of the DCI format 0 is set to 1, transmission of 4 RBs or less may be configured, Redundancy Version 1 (RV1) is indicated in PUSCH data retransmission, and a modulation order ($Q_m$) may be set to 2. In other words, in the case of CQI-only transmission, only a QPSK (Quadrature Phase Shift Keying) scheme may be used as a modulation scheme.

TABLE 4

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The CQI reporting operation will hereinafter be described in detail.

In the 3GPP LTE system, when a DL reception entity (e.g., UE) is coupled to a DL transmission entity (e.g., eNB), a Reference Signal Received Power (RSRP) and a Reference Signal Received Quality (RSRQ) that are transmitted via downlink are measured at an arbitrary time, and the measured result may be periodically or event-triggeredly reported to the eNB.

In a cellular OFDM wireless packet communication system, each UE may report DL channel information based on a DL channel condition via uplink, and the eNB may determine time/frequency resources and MCS (Modulation and Coding Scheme) so as to transmit data to each UE using DL channel information received from each UE.

In case of the legacy 3GPP LTE system (e.g., 3GPP LTE Release-8 system), such channel information may be composed of Channel Quality Indication (CQI), Precoding Matrix Indicator (PMI), and Rank Indication (RI). All or some of CQI, PMI and RI may be transmitted according to a transmission mode of each UE. CQI may be determined by the received signal quality of the UE. Generally, CQI may be determined on the basis of DL RS measurement. In this case, a CQI value actually applied to the eNB may correspond to an MCS in which the UE maintains a Block Error Rate (BLER) of 10% or less at the measured Rx signal quality and at the same time has a maximum throughput or performance. In addition, such channel information reporting scheme may be divided into periodic reporting and aperiodic reporting upon receiving a request from the eNB.

Information regarding the aperiodic reporting may be assigned to each UE by a CQI request field of 1 bit contained in uplink scheduling information sent from the eNB to the UE. Upon receiving the aperiodic reporting information, each UE may transmit channel information considering the UE's transmission mode to the eNB over a physical uplink shared channel (PUSCH). If necessary, RI and CQI/PMI need not be transmitted over the same PUSCH.

In case of the aperiodic reporting, a cycle in which channel information is transmitted via an upper layer signal, an offset of the corresponding period, etc. may be signaled to each UE in units of a subframe, and channel information considering a transmission (Tx) mode of each UE may be transmitted to the eNB over a physical uplink control channel (PUCCH) at intervals of a predetermined time. In the case where UL transmission data is present in a subframe to which channel information is transmitted at intervals of a predetermined time, the corresponding channel information may be transmitted together with data over not a PUCCH but a PUSCH together. In case of the periodic reporting over a PUCCH, a limited number of bits may be used as compared to PUSCH. RI and CQI/PMI may be transmitted over the same PUSCH. If the periodic reporting collides with the aperiodic reporting, only the aperiodic reporting may be performed within the same subframe.

In order to calculate a WB CQI/PMI, the latest transmission RI may be used. In a PUCCH reporting mode, RI may be independent of another RI for use in a PUSCH reporting mode. RI may be effective only at CQI/PMI for use in the corresponding PUSCH reporting mode.

The CQI/PMI/RI feedback type for the PUCCH reporting mode may be classified into four feedback types (Type 1 to Type 4). Type 1 is CQI feedback for a user-selected subband. Type 2 is WB CQI feedback and WB PMI feedback. Type 3 is RI feedback. Type 4 is WB CQI feedback.

Referring to Table 5, in the case of periodic reporting of channel information, a reporting mode is classified into four reporting modes (Modes 1-0, 1-1, 2-0 and 2-1) according to CQI and PMI feedback types.

TABLE 5

| | | PMI Feedback Type | |
|---|---|---|---|
| | | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
| | UE Selected | Mode 2-0<br>RI (only for Open-Loop SM)<br>Wideband CQI (4 bit)<br>Best-1 CQI (4 bit) in each BP<br>Best-1 indicator (L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

The reporting mode is classified into a wideband (WB) CQI and a subband (SB) CQI according to a CQI feedback type. The reporting mode is classified into a No-PMI and a Single PMI according to transmission or non-transmission of PMI. As can be seen from Table 5, 'NO PMI' may correspond to an exemplary case in which an Open Loop (OL), a Transmit Diversity (TD), and a single antenna are used, and 'Single PMI' may correspond to an exemplary case in which a closed loop (CL) is used.

Mode 1-0 may indicate an exemplary case in which PMI is not transmitted but only WB CQI is transmitted. In case of Mode 1-0, RI may be transmitted only in the case of Spatial Multiplexing (SM), and one WB CQI denoted by 4 bits may be transmitted. If RI is higher than '1', a CQI for a first codeword may be transmitted. In case of Mode 1-0, Feedback Type 3 and Feedback Type 4 may be multiplexed at different time points within the predetermined reporting period, and then transmitted. The above-mentioned Mode 1-0 transmission scheme may be referred to as Time Division Multiplexing (TDM)-based channel information transmission.

Mode 1-1 may indicate an exemplary case in which a single PMI and a WB CQI are transmitted. In this case, 4-bit WB CQI and 4-bit WB PMI may be transmitted simultaneously with RI transmission. In addition, if RI is higher than '1', 3-bit WB Spatial Differential CQI may be transmitted. In case of transmission of two codewords, the WB spatial differential CQI may indicate a differential value between a WB CQI index for Codeword 1 and a WB CQI index for Codeword 2. These differential values may be assigned to the set {−4, −3, −2, −1, 0, 1, 2, 3}, and each differential value may be assigned to any one of values contained in the set and be represented by 3 bits. In case of Mode 1-1, Feedback Type 2 and Feedback Type 3 may be multiplexed at different time points within the predetermined reporting period, and then transmitted.

Mode 2-0 may indicate that no PMI is transmitted and a CQI of a UE-selected band is transmitted. In this case, RI may be transmitted only in case of open loop spatial multiplexing (OL SM), a WB CQI denoted by 4 bits may be transmitted. In each Bandwidth Part (BP), Best-1 CQI may be transmitted, and Best-1 CQI may be denoted by 4 bits. In addition, an indicator of L bits indicating Best-1 may be further transmitted. If RI is higher than '1', CQI for a first codeword may be transmitted. In case of Mode 2-0, the above-mentioned feedback type 1, feedback type 3, and feedback type 4 may be multiplexed at different time points within a predetermined reporting period, and then transmitted.

Mode 2-1 may indicate an exemplary case in which a single PMI and a CQI of a UE-selected band are transmitted. In this case, WB CQI of 4 bits, WB spatial differential CQI of 3 bits, and WB PMI of 4 bits are transmitted simultaneously with RI transmission. In addition, a Best-1 CQI of 4 bits and a Best-1 indicator of L bits may be simultaneously transmitted at each bandwidth part (BP). If RI is higher than '1', a Best-1 spatial differential CQI of 3 bits may be transmitted. During transmission of two codewords, a differential value between a Best-1 CQI index of Codeword 1 and a Best-1 CQI index of Codeword 2 may be indicated. In Mode 2-1, the above-mentioned feedback type 1, feedback 2, and feedback type 3 may be multiplexed at different time points within a predetermined reporting period, and then transmitted.

In the UE selected SB CQI reporting mode, the size of BP (Bandwidth Part) subband may be defined by the following table 6.

TABLE 6

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Table 6 shows a bandwidth part (BP) configuration and the subband size of each BP according to the size of a system bandwidth. A UE may select a preferred subband within each BP, and calculate a CQI for the corresponding subband. In Table 6, if the system bandwidth is set to 6 or 7, this means no application of both the subband size and the number of bandwidth parts (BPs). That is, the system bandwidth of 6 or 7 means application of only WB CQI, no subband state, and a BP of 1.

Figure 17:
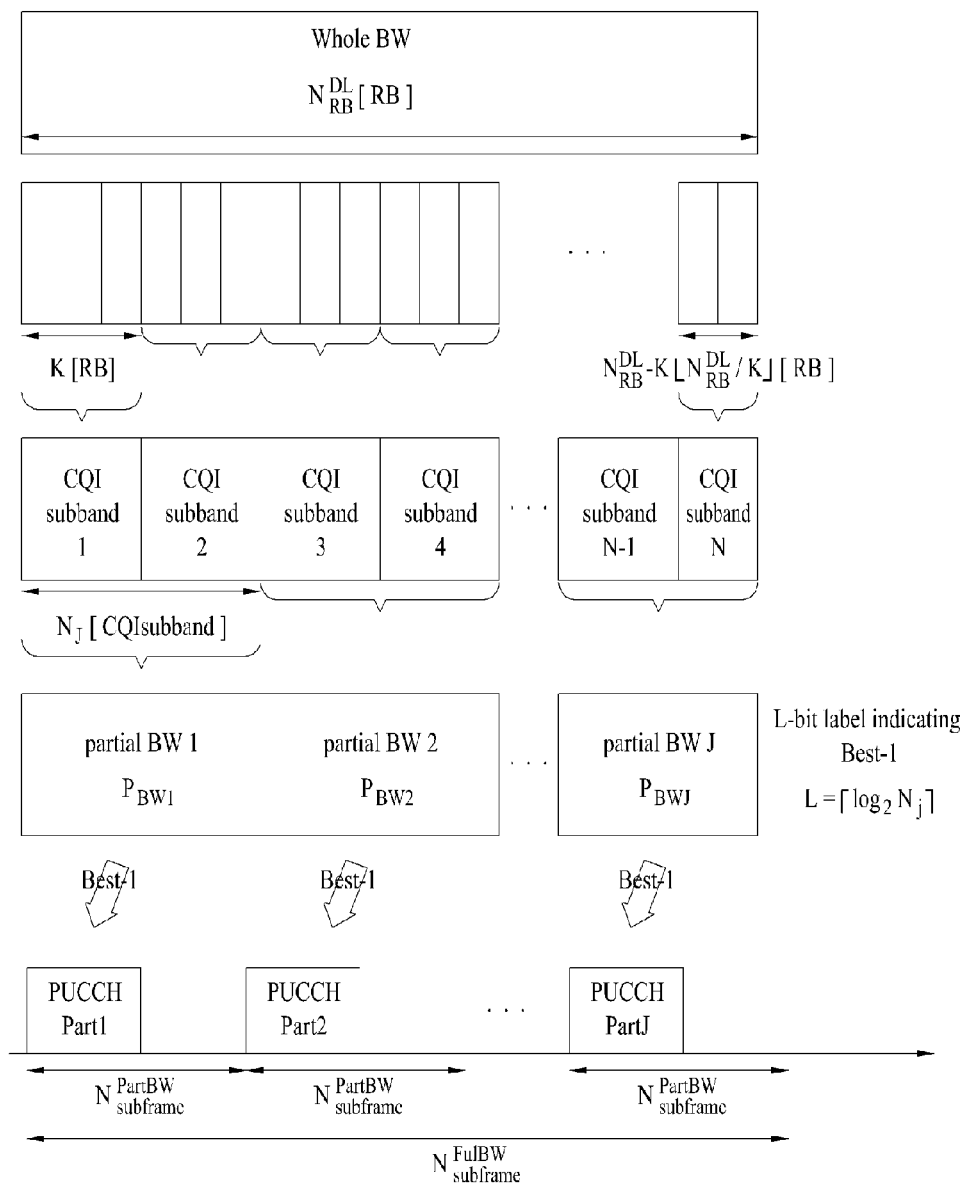
FIG. 17 shows an example of a CQI report mode.

FIG. 17 shows an example of a UE selected CQI reporting mode.

$N_{RB}^{DL}$ is the number of RBs of the entire bandwidth. The entire bandwidth may be divided into N CQI subbands (1, 2, 3, ..., N). One CQI subband may include k RBs defined in Table 6. If the number of RBs of the entire bandwidth is not denoted by an integer multiple of k, the number of RBs contained in the last CQI subband (i.e., the N-th CQI subband) may be determined by the following equation 14.

$$N_{RB}^{DL} - k \cdot \lfloor N_{RB}^{DL}/k \rfloor \quad \text{[Equation 14]}$$

In Equation 14, $\lfloor \ \rfloor$ represents a floor operation, and $\lfloor x \rfloor$ or floor(x) represents a maximum integer not higher than 'x'.

In addition, $N_J$ CQI subbands construct one BP, and the entire bandwidth may be divided into J BPs. UE may calculate a CQI index for one preferred Best-1 CQI subband in contained in one BP, and transmit the calculated CQI index over a PUCCH. In this case, a Best-1 indicator indicating which a Best-1 CQI subband is selected in one BP may also be transmitted. The Best-1 indicator may be composed of L bits, and L may be represented by the following equation 15.

$$L = \lceil \log_2 N_J \rceil \quad \text{[Equation 15]}$$

In Equation 15, $\lceil \ \rceil$ may represent a ceiling operation, and $\lceil X \rceil$ or ceiling(x) may represent a minimum integer not higher than 'x'.

In the above-mentioned UE selected CQI reporting mode, a frequency band for CQI index calculation may be determined. Hereinafter, a CQI transmission cycle will hereinafter be described in detail.

Each UE may receive information composed of a combination of a transmission cycle of channel information and an offset from an upper layer through RRC signaling. The UE may transmit channel information to an eNB on the basis of the received channel information transmission cycle information.

Figure 18:
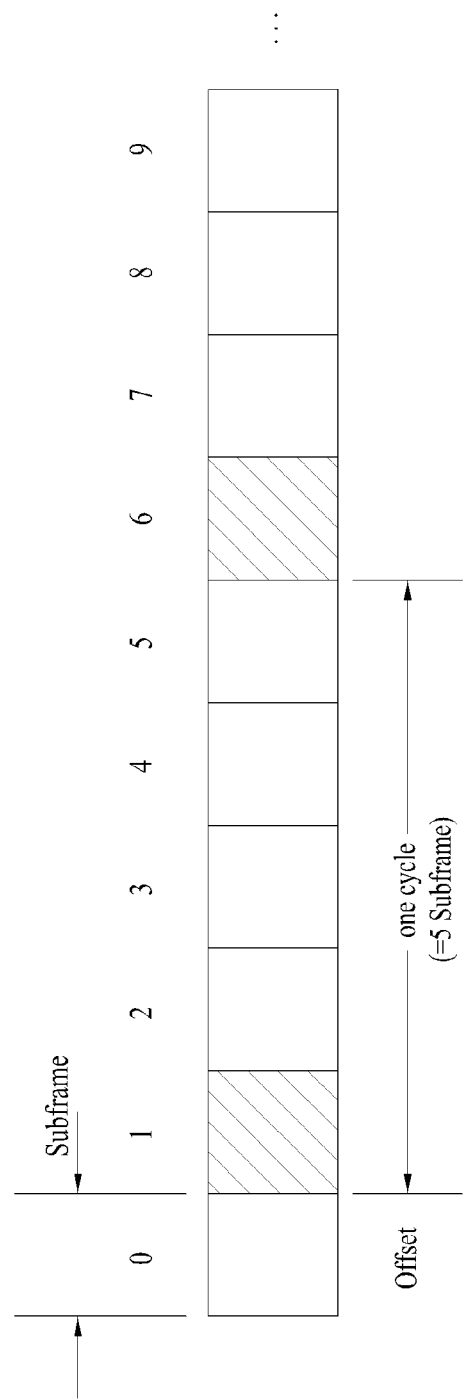
FIG. 18 is a conceptual diagram illustrating a method for enabling a user equipment (UE) to periodically transmit channel information.

FIG. 18 is a conceptual diagram illustrating a method for enabling a UE to periodically transmit channel information. For example, if a UE receives combination information in which a channel information transmission cycle is set to 5 and an offset is set to 1, the UE transmits channel information in units of 5 subframes, one subframe offset is assigned in the increasing direction of a subframe index on the basis of the $0^{th}$ subframe, and channel information may be assigned over a PUCCH. In this case, the subframe index may be comprised of a combination of a system frame number ($n_f$) and 20 slot indexes ($n_s$, 0~19) present in the system frame. One subframe may be comprised of 2 slots, such that the subframe index may be represented by $10 \times n_f + \text{floor}(n_s/2)$.

One type for transmitting only WB CQI and the other type for transmitting both WB CQI and SB CQI may be classified according to CQI feedback types. In case of the first type for transmitting only the WB CQI, WB CQI information for the entire band is transmitted at a subframe corresponding to each CQI transmission cycle. The WB periodic CQI feedback transmission cycle may be set to any of 2, 5, 10, 16, 20, 32, 40, 64, 80, or 160 ms or no transmission of the WB periodic CQI feedback transmission cycle may be established. In this case, if it is necessary to transmit PMI according to the PMI feedback type of Table 5, PMI information is transmitted together with CQI. In case of the second type for transmitting both WB CQI and SB CQI, WB CQI and SB CQI may be alternately transmitted.

Figure 19:
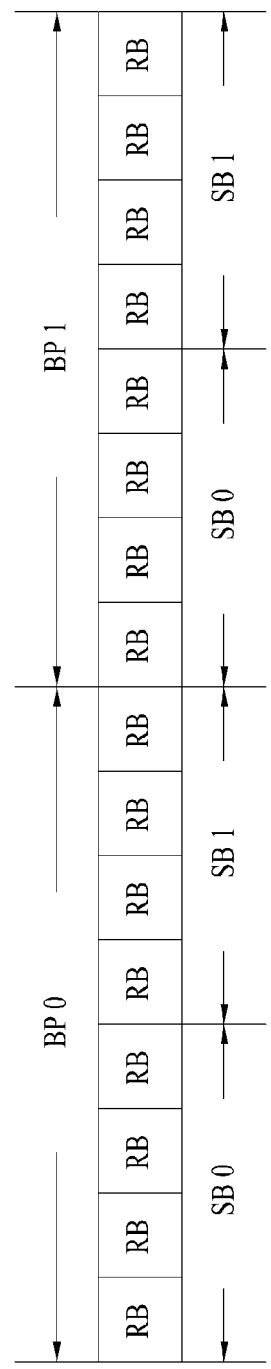
FIG. 19 is a conceptual diagram illustrating SB CQI transmission.

FIG. 19 is a conceptual diagram illustrating a method for transmitting both WB CQI and SB CQI according to an embodiment of the present invention. FIG. 19 shows an exemplary system comprised of 16 RBs. If a system frequency band is comprised of 16 RBs, for example, it is assumed that two bandwidth parts (BPs) (BP0 and BP1) may be configured, each BP may be composed of 2 subbands (SBs) (SB0 and SB1), and each SB may be composed of 4 RBs. In this case, as previously stated in Table 6, the number of BPs and the size of each SB are determined according to the number of RBs contained in the entire system band, and the number of SBs contained in each BP may be determined according to the number of RBs, the number of BPs and the size of SB.

In case of the type for transmitting both WB CQI and SB CQI, the WB CQI is transmitted to the CQI transmission subframe. In the next transmission subframe, a CQI of one SB (i.e., Best-1) having a good channel state from among SB0 and SB1 at BP0 and an index (i.e., Best-1 indicator) of the corresponding SB are transmitted. In the further next transmission subframe, a CQI of one SB (i.e., Best-1) having a good channel state from among SB0 and SB1 at BP1 and an index (i.e., Best-1 indicator) of the corresponding SB are transmitted. After transmitting the WB CQI, CQIs of individual BPs are sequentially transmitted. In this case, CQI of a BP located between a first WB CQI transmitted once and a second WB CQI to be transmitted after the first WB CQI may be sequentially transmitted one to four times. For example, if the CQI of each BP is transmitted once during a time interval between two WB CQIs, CQIs may be transmitted in the order of WB CQI→BP0 CQI→BP1 CQI→WB CQI. In another example, if the CQI of each BP is transmitted four times during a time interval between two WB CQIs, CQIs may be transmitted in the order of WB CQI→BP0 CQI→BP1 CQI→BP0 CQI→BP1 CQI→BP0 CQI→BP1 CQI→BP0 CQI→BP1 CQI→WB CQI. Information about the number of sequential transmission times of BP CQI during a time interval between two WB CQIs is signaled through a higher layer. Irrespective of WB CQI or SB CQI, the above-mentioned information about the number of sequential transmission times of BP CQI may be transmitted through a PUCCH in a subframe corresponding to information of a combination of channel information transmission cycle signaled from the higher layer of FIG. 18 and an offset.

In this case, if PMI also needs to be transmitted according to the PMI feedback type, PMI information and CQI must be simultaneously transmitted. If PUSCH for UL data transmission is present in the corresponding subframe, CQI and PMI can be transmitted along with data through PUSCH instead of PUCCH.

Figure 20:
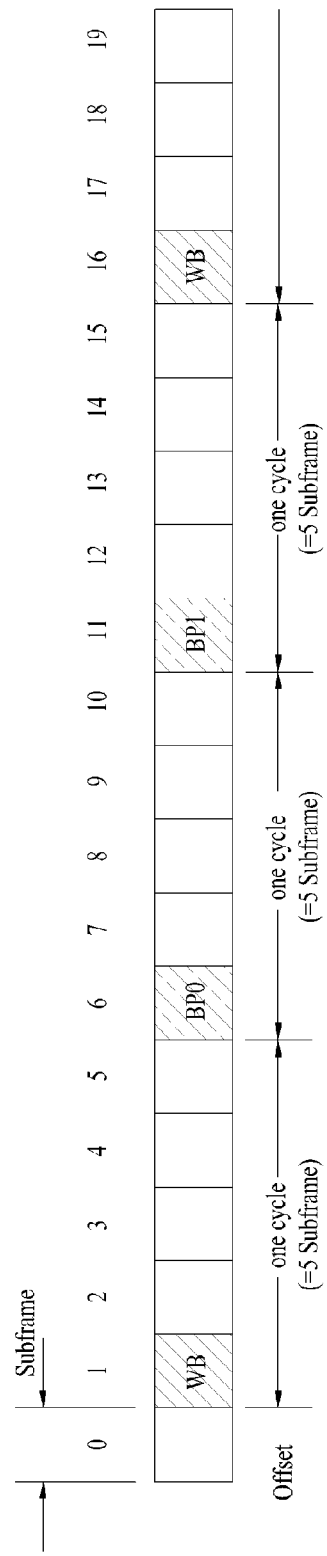
FIG. 20 is a conceptual diagram illustrating transmission of WB CQI and SB CQI.

FIG. 20 is a conceptual diagram illustrating an exemplary CQI transmission scheme when both WB CQI and SB CQI are transmitted. In more detail, provided that combination information in which a channel information transmission cycle is set to 5 and an offset is set to 1 is signaled as shown in FIG. 18, and BP information between two WB CQI/PMI parts is sequentially transmitted once, FIG. 20 shows the example of channel information transmission operation of a UE.

On the other hand, in case of RI transmission, RI may be signaled by information of a combination of one signal indicating how many WB CQI/PMI transmission cycles are used for RI transmission and an offset of the corresponding transmission cycle. In this case, the offset may be defined as a relative offset for a CQI/PMI transmission offset. For example, provided that an offset of the CQI/PMI transmission cycle is set to 1 and an offset of the RI transmission cycle is set to zero, the offset of the RI transmission cycle may be identical to that of the CQI/PMI transmission cycle. The offset of the RI transmission cycle may be defined as a negative value or zero.

Figure 21:
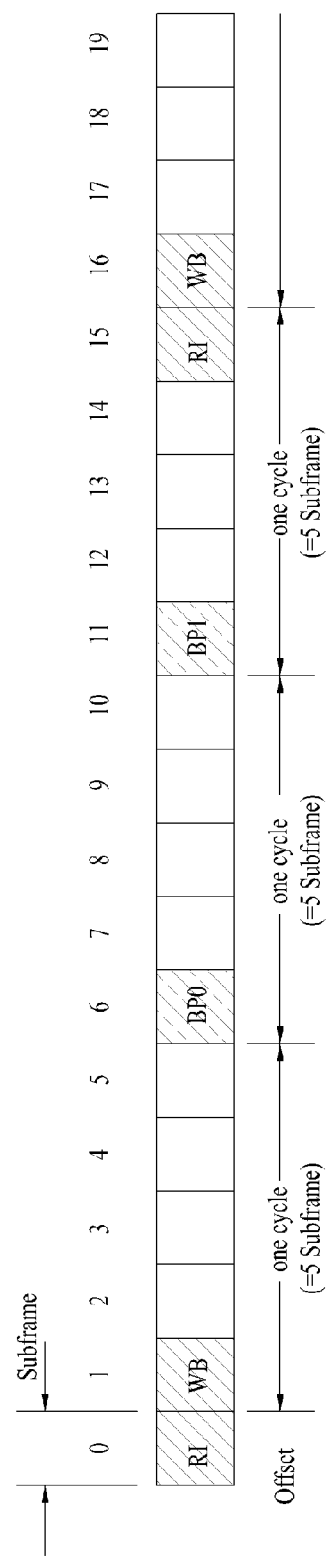
FIG. 21 is a conceptual diagram illustrating transmission of WB CQI, SB CQI and RI.

FIG. 21 is a conceptual diagram illustrating transmission of WB CQI, SB CQI and RI. In more detail, FIG. 21 shows that, under CQI/PMI transmission of FIG. 20, an RI transmission cycle is one time the WB CQI/PMI transmission cycle and the offset of RI transmission cycle is set to '−1'. Since the RI transmission cycle is one time the WB CQI/PMI transmission cycle, the RI transmission cycle has the same time cycle. A relative difference between the RI offset value '−1' and the CQI offset '1' of FIG. 20 is set to '−1', such that RI can be transmitted on the basis of the subframe index '0'.

In addition, provided that RI transmission overlaps with WB CQI/PMI transmission or SB CQI/PMI transmission, WB CQI/PMI or SB CQI/PMI may drop. For example, provided that the RI offset is set to '0' instead of '−1', the WB CQI/PMI transmission subframe overlaps with the RI transmission subframe. In this case, WB CQI/PMI may drop and RI may be transmitted.

By the above-mentioned combination, CQI, PMI, and RI may be transmitted, and such information may be transmitted from each UE by RRC signaling of a higher layer. The BS (or eNB) may transmit appropriate information to each UE in consideration of a channel situation of each UE and a distribution situation of UEs contained in the BS (or eNB).

Meanwhile, payload sizes of SB CQI, WB CQI/PMI, RI and WB CQI in association with the PUCCH report type may be represented by the following table 7.

TABLE 7

| PUCCH | | | PUCCH Reporting Modes | | | |
|---|---|---|---|---|---|---|
| Report Type | Reported | Mode State | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
|   |   | RI > 1 | NA | 7 + L | NA | 4 + L |
| 2 | Wideband CQI/PMI | 2 TX Antennas RI = 1 | 6 | 6 | NA | NA |
|   |   | 4 TX Antennas RI = 1 | 8 | 8 | NA | NA |
|   |   | 2 TX Antennas RI > 1 | 8 | 8 | NA | NA |
|   |   | 4 TX Antennas RI > 1 | 11 | 11 | NA | NA |
| 3 | RI | 2-layer spatial multiplexing | 1 | 1 | 1 | 1 |
|   |   | 4-layer spatial multiplexing | 2 | 2 | 2 | 2 |
| 4 | Wideband CQI | RI = 1 or RI > 1 | NA | NA | 4 | 4 |

Aperiodic transmission of CQI, PMI and RI over a PUSCH will hereinafter be described.

In case of the aperiodic reporting, RI and CQI/PMI may be transmitted over the same PUSCH. In case of the aperiodic reporting mode, RI reporting may be effective only for CQI/PMI reporting in the corresponding aperiodic reporting mode. CQI-PMI combinations capable of being supported to all the rank values are shown in the following table 8.

TABLE 8

| | | PMI Feedback Type | |
|---|---|---|---|
| | | No PMI (OL, TD, single-antenna) | with PMI (CL) |
| PUSCH CQI Feedback Type | Wideband (Wideband CQI) | | Mode 1-2: Multiple PMI<br>RI<br>$1^{st}$ Wideband CQI (4 bit)<br>$2^{nd}$ Wideband CQI (4 bit) if RI > 1<br>subband PMIs on each subband |
| | UE Selected (Subband CQI) | Mode 2-0<br>RI (only for Open-Loop SM)<br>Wideband CQI (4 bit) + Best-M CQI (2 bit)<br>Best-M index<br>when RI > 1, CQI of first codeword | Mode 2-2: Multiple PMI<br>RI<br>$1^{st}$ Wideband CQI (4 bit) + Best-M CQI (2 bit)<br>$2^{nd}$ Wideband CQI (4 bit) + Best-M CQI (2 bit)<br>if RI > 1<br>Wideband PMI + Best-M PMI<br>Best-M index |
| | Higher layer-configured (subband CQI) | Mode 3-0<br>RI (only for Open-Loop SM)<br>Wideband CQI (4 bit) + subband CQI (2 bit)<br>when RI > 1, CQI of first codeword | Mode 3-1: Single PMI<br>RI<br>$1^{st}$ Wideband CQI (4 bit) + subband CQI (2 bit)<br>$2^{nd}$ Wideband CQI (4 bit) + subband CQI (2 bit) if RI > 1<br>Wideband PMI |

Mode 1-2 of Table 8 may indicate a WB feedback. In Mode 1-2, a preferred precoding matrix for each subband may be selected from a codebook subset on the assumption of transmission only in the corresponding subband. The UE may report one WB CQI at every codeword, and WB CQI may be calculated on the assumption that data is transmitted on subbands of the entire system bandwidth (Set S) and the corresponding selected precoding matrix is used on each subband. The UE may report the selected PMI for each subband. In this case, the subband size may be given as shown in the following table 9. In Table 9, if the system bandwidth is set to 6 or 7, this means no application of the subband size. That is, the system bandwidth of 6 or 7 means application of only WB CQI and no subband state.

TABLE 9

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

In Table 8, Mode 3-0 and Mode 3-1 show a subband feedback configured by a higher layer (also called an upper layer).

In Mode 3-0, the UE may report a WB CQI value calculated on the assumption of data transmission on the set-S (total system bandwidth) subbands. The UE may also report one subband CQI value for each subband. The subband CQI value may be calculated on the assumption of data transmission only at the corresponding subband. Even in the case of RI>1, WB CQI and SB CQI may indicate a channel quality for Codeword 1.

In Mode 3-1, a single precoding matrix may be selected from a codebook subset on the assumption of data transmission on the set-S subbands. The UE may report one SB CQI value for each codeword on each subband. The SB CQI value may be calculated on the assumption of a single precoding matrix used in all subbands and data transmission on the corresponding subband. The UE may report a WB CQI value for each codeword. The WB CQI value may be calculated on the assumption of a single precoding matrix used in all the subbands and data transmission on the set-S subbands. The UE may report one selected precoding matrix indicator. The SB CQI value for each codeword may be represented by a differential WB CQI value using a 2-bit subband differential CQI offset. That is, the subbband differential CQI offset may be defined as a differential value between a SB CQI index and a WB CQI index. The subband differential CQI offset value may be assigned to any one of four values {−2, 0, +1, +2}. In addition, the subband size may be given as shown in the following table 7.

In Table 8, Mode 2-0 and Mode 2-2 illustrate a UE selected subband feedback. Mode 2-0 and Mode 2-2 illustrate reporting of best-M averages.

In Mode 2-0, the UE may select the set of M preferred subbands (i.e., best-M) from among the entire system bandwidth (set S). The size of one subband may be given as k, and k and M values for each set-S range may be given as shown in the following table 10. In Table 10, if the system bandwidth is set to 6 or 7, this means no application of both the subband size and the M value. That is, the system bandwidth of 6 or 7 means application of only WB CQI and no subband state.

The UE may report one CQI value reflecting data transmission only at the best-M subbands (i.e., M selected subbands). This CQI value may indicate a CQI for Codeword 1 even in the case of RI>1. In addition, the UE may report a WB CQI value calculated on the assumption of data transmission on the set-S subbands. The WB CQI value may indicate a CQI for Codeword 1 even in the case of RI>1.

TABLE 10

| System Bandwidth $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In Mode 2-2, the UE may select the set of M preferred subbands (i.e., best-M) from among the set-S subbands (where the size of one subband is set to k). Simultaneously, one preferred precoding matrix may be selected from among a codebook subset to be used for data transmission on the M selected subbands. The UE may report one CQI value for each codeword on the assumption that data transmission is achieved on M selected subbands and selection precoding matrices are used in each of the M subbands. The UE may report an indicator of one precoding matrix selected for the M subbands. In addition, one precoding matrix (i.e., a precoding matrix different from the precoding matrix for the above-mentioned M selected subbands) may be selected from among the codebook subset on the assumption that data transmission is achieved on the set-S subbands. The UE may report a WB CQI, that is calculated on the assumption that data transmission is achieved on the set-S subbands and one precoding matrix is used in all the subbands, at every codeword. The UE may report an indicator of the selected one precoding matrix in association with all subbands.

In association with entirety of UE-selected subband feedback modes (Mode 2-0 and Mode 2-2), the UE may report the positions of M selected subbands using a combination index (r), where r may be represented by the following equation 16.

$$r = \sum_{i=0}^{M-1} \binom{N - s_i}{M - i}$$ [Equation 16]

In Equation 16, the set $\{s_i\}_{i=0}^{M-1}$, ($1 \leq s_i \leq N$, $s_i < s_{i+1}$) may include M sorted subband indexes. In Equation 14, $$\binom{x}{y}$$

may indicate an extended binomial coefficient, which is set to $$\binom{x}{y}$$

in case of $x \geq y$ and is set to zero (0) in case of $x < y$. Therefore, r may have a unique label and may be denoted by $$r \in \left\{0, \ldots, \binom{N}{M} - 1\right\}.$$

In addition, a CQI value for M selected subbands for each codeword may be denoted by a relative differential value in association with a WB CQI. The relative differential value may be denoted by a differential CQI offset level of 2 bits, and may have a value of 'CQI index—WB CQI index' of M selected subbands. An available differential CQI value may be assigned to any one of four values $\{+1, +2, +3, +4\}$.

In addition, the size (k) of supported subbands and the M value may be given as shown in Table 10. As shown in Table 10, k or M may be given as a function of a system bandwidth.

A label indicating the position of each of M selected subbands (i.e., best-M subbands) may be denoted by L bits, where L is denoted by $$L = \left\lceil \log_2 \binom{N}{M} \right\rceil.$$

Feedback Information for Multiple MIMO Transmission Modes

As described above, Channel Status Information (CSI) is required for MIMO transmission. The CSI may be fed back from the receiver to the transmitter. The transmitter may acquire a precoding weight, that is capable of being adaptively used in response to a channel state, from the CSI. In addition, the transmitter may acquire signal transmission information from the CSI modified by the precoding weight to be used for MIMO transmission. For example, the signal transmission information may include a modulation order, a coding rate, a transport block size, a scheduling band, etc.

The receiver may obtain channel status information (CSI) between the transmitter and the receiver using a reference signal (RS) received from the transmitter, and may feed back (or report) the obtained CSI to the transmitter. In this case, a variety of methods may be used to reduce the amount of feedback CSI. For example, a channel quality information/index (CQI), a precoding matrix index (PMI), a rank indicator (RI), etc. can be represented by quantized bits, such that the amount of feedback information is reduced, resulting in the implementation of efficient transmission.

Specifically, information regarding a rank suitable for MIMO transmission is changed according to long term fading, such that the above-mentioned rank information is not changed for a relatively longer term as compared to other CSI. On the other hand, PMI or CQI reflects a channel state abruptly changed by short-term fading, such that it is changed for a relatively short time. Accordingly, RI may be reported for a relatively longer term as compared to PMI/CQI, and the PMI and CQI may be reported for a relatively short term as compared to the RI. In addition, PMI and CQI are determined according to a rank used for transmission, such that the PMI and CQI are calculated on the basis of the determined RI until reaching the next RI report period.

As described above, there is a need for a rank value to be first determined when calculating channel status information (CSI). The rank value may be determined considering a MIMO transmission scheme. The MIMO transmission method may be classified into a Multi-User MIMO (MU-MIMO) and a Single-User MIMO (SU-MIMO). If a spatial channel capable of being created through multiple antennas is assigned to multiple users, this means the MU-MIMO. In contrast, if all spatial channels are assigned to a single user, this means SU-MIMO.

The MU-MIMO transmission scheme can be classified into a method for using a non-unitary matrix such as Dirty Paper Coding (DPC), Zero Forcing, etc. and a method for using a unitary precoding weight such as a Per-User Unitary Rate Control (PU2RC). The two methods are characterized in that the precoding weight calculated on the basis of the limited transmission rank is reported to the transmitter from the viewpoint of a single user. For example, a multi-antenna transmitter including M transmission (Tx) antennas can generate a maximum of 8 spatial channels and can transmit signals. The number of spatial channels capable of being assigned to the receiver participating in MU-MIMO transmission may be set to M or less. In this case, a maximum number of spatial channels assigned to each user is limited to N (where N<M), such that spatial channels of N or less may be received. Assuming that a maximum of N transport spatial channels can be assigned to the UE, the UE selects a rank that is most appropriate for transmission. That is, the UE may select the most appropriate rank from among the N or less ranks (i.e., 1 to N ranks). The precoding weight and the channel quality information (CQI) can be calculated according to the selected rank.

For example, if the number of spatial channels assigned to one receiver is limited to 2, the receiver can measure channel state information (CSI) on the assumption that one or two spatial channels can be assigned to the receiver. In this case, the amount of channel status information that must be measured and reported by the receiver can be greatly reduced. That is, rank information is limited to N or 2, such that the number of required bits is reduced from log 2 (N) to log 2(2).

PMI amount is determined according to the defined codebook set. Assuming that L codebook sets from Rank 1 to Rank N are defined and K (where K<L) codebook sets from Rank 1 to Rank 2 are defined, the amount of feedback information requisite for PMI reporting in case of a maximum rank limited to N~2 is reduced.

CQI must be calculated according to each codeword (CW). Provided that a system having multiple codewords (MCW) includes a maximum of 2 CWs on Rank-2 transmission, 2 CQIs should be reported for transmission of Rank-2 or higher. Provided that a maximum of 2 spatial channels are assigned, the same amount of CQI (i.e., 2 CQIs) may be reported.

The transmitter can calculate CQI in consideration of the number of transmission layers. Provided that Rank-2 is used in MCW transmission, the second layer calculates SINR in consideration of interference when calculating a CQI of a CW transmitted through a first layer. Similarly, the number of spatial channels simultaneously created by the transmitter is recognized by the receiver, the receiver measures channels status information (CSI) appropriate for the maximum number of spatial channels created by the transmitter. In this case, the accuracy of CQI may be increased. For example, provided that a maximum of 2 spatial channels are formed by the transmitter and each spatial channel is assigned to two users, the receiver may calculate the CQI on the assumption that there is an interference layer in CQI calculation.

On the other hand, SU-MIMO transmission is characterized in that one user uses all spatial channels created by the transmitter. The receiver may report rank information appropriate for transmission to a base station (BS), and the receiver may report PMI and CQI calculated on the basis of the rank information. For example, provided that a maximum number of spatial channels created by the transmitter is set to N, the receiver selects a transmission rank capable of obtaining the highest transmission efficiency from among 1 to N ranks, and reports the selected rank to an eNode B.

The transmitter can simultaneously support SU-MIMO transmission and MU-MIMO transmission. Specialized control signals may be requested for individual SU-MIMO and MU-MIMO transmission. For example, a maximum of N ranks may be received in SU-MIMO transmission, and the transmitter for MU-MIMO transmission may generate a maximum of N spatial channels. If the receiver considers a maximum of N spatial channels as the effective spatial channels corresponding to individual users, a control signal optimized for each transmission mode may be transmitted. In this case, the transmitter transmits indication information regarding the transmission mode to the receiver, such that the receiver may pre-recognize which transmission mode is to be used for signal transmission of the transmitter. Thereafter, a control signal suitable for the pre-recognized information is transmitted, such that SU-MIMO transmission and MU-MIMO transmission can be simultaneously supported.

On the other hand, the transmitter does not provide indication messages of the SU-MIMO transmission mode and the MU-MIMO transmission mode to the receiver, such that the transmitter may allow the receiver to recognize any one of the two transmission modes and decode corresponding data. In this case, the transmitter may inform the receiver of the number of layers that must be received by a current UE. In this case, it is impossible for the UE to identify the SU-MIMO mode and the MU-MIMO mode. Therefore, it is possible to support MIMO transmission using the same control signal. However, there is a need for the receiver to report different feedback information to the transmitter so as to support SU-MIMO and MU-MIMO. For example, in order to support SU-MIMO transmission, a transmission rank most appropriate for transmission may be reported in consideration of a maximum number of spatial channels capable of being generated in the transmitter. To support MU-MIMO transmission, a rank most appropriate for transmission may be selected and reported from among the restricted ranks in consideration of reception of a limited number of layers from the viewpoint of the receiver.

Multi-Rank PMI Feedback

In a feedback method for allowing a system supporting the extended antenna configuration to smoothly support multiple MIMO modes, multi-rank PMI feedback may be used.

For example, PMI may be determined on the assumption that a receiver is scheduled to receive r layers from an eNode B during SU-MIMO rank-r transmission and performs rank-r SU-MIMO transmission. On the other hand, although one receiver can receive one layer during MU-MIMO transmission, the transmitter may actually transmit multiple layers.

The multi-rank PMI feedback may indicate that a PMI of Rank-r is used for SU-MIMO mode transmission and the restricted rank (for example, Rank-1 or Rank-2) is used for MU-MIMO mode transmission. For example, it should be noted that a Rank-r PMI based on SU-MIMO can be fed back during Rank-r SU-MIMO transmission. Otherwise, PMI/CQI having the restricted rank (for example, Rank-1 or Rank-2) based on the SU-MIMO assumption may be fed back to MU-MIMO pairing. A method of using a PMI having the restricted rank (or low rank) will hereinafter be described in detail.

A restricted PMI of a low rank value (Rank-1 or Rank-2) is appended to the regular rank-r PMI so as to facilitate dynamic switching between the SU-MIMO mode and the MU-MIMO mode. In order to support dynamic SU-MIMO/MU-MIMO switching in all ranks from Rank-1 to Rank-8, a single transmission mode for Ranks 1 to 8 has to support dynamic SU-MIMO and MU-MIMO switching on a per subframe basis. In other words, the same UE feedback (up to a Rank-8 PMI/CQI) shall be used in both SU-MIMO scheduling and MU-MIMO scheduling.

Since the UE does not recognize the actual transmission mode or the actual transmission rank, a natural question is how to schedule a UE in low-rank MU-MIMO transmission mode (for example, Rank-1 or Rank-2) when the UE reports a high rank PMI/CQI (for example, Ranks 3 to 8). One possible solution is to extract the first two columns of the high rank PMI (for example, any of Rank-3 to Rank-8 PMIs) fed back from the UE for MU-MIMO scheduling. However, such "truncated PMI" are sometimes not used as the optimal rank-1/2 PMI computed under low rank (for example, Rank-1 or Rank-2) hypothesis. Of course, although the truncated PMI may adversely impact MU-MIMO performance, it is possible to use the sub-optimal "truncated PMI". In addition, due to the low mobility setup (i.e., low rank adaptation) typically seen in a scenario suitable for the MU-MIMO transmission mode, once a UE may report a rank-r PMI, the UE may continue to report a Rank-r PMI for a long period without any Rank-1 PMI. Hence, the benefit of the multi-rank PMI proposal is to allow the UE to supplement the optimal low-rank PMI such that sufficient CSI accuracy for Rank-1 or Rank-2 MU-MIMO pairing is achieved. From this perspective, multi-rank PMI enhances CSI accuracy in addition to facilitating dynamic SU-MIMO and MU-MIMO switching.

Precoder for 8 Tx Antennas

In the system (e.g., 3GPP LTE Release-10 system) for supporting the extended antenna structure, for example, MIMO transmission based on 8 Tx antennas may be carried out, such that it is necessary to design a codebook for supporting MIMO transmission.

In order to report a CQI of a channel transmitted through 8 antenna ports, the use of codebooks shown in Tables to 18 may be considered. 8 CSI antenna ports may be represented by indexes of antenna ports 15~22. Table 11 shows an example of the codebook for 1-layer CSI reporting using antenna ports 15 to 22. Table 12 shows an example of the codebook for 2-layer CSI reporting using antenna ports 15 to 22. Table 13 shows an example of the codebook for 3-layer CSI reporting using antenna ports 15 to 22. Table 14 shows an example of the codebook for 4-layer CSI reporting using antenna ports 15 to 22. Table 15 shows an example of the codebook for 5-layer CSI reporting using antenna ports 15 to 22. Table 16 shows an example of the codebook for 6-layer CSI reporting using antenna ports 15 to 22. Table 17 shows an example of the codebook for 7-layer CSI reporting using antenna ports 15 to 22. Table 18 shows an example of the codebook for 8-layer CSI reporting using antenna ports 15 to 22.

In Tables 11 to 18, $\phi_n$ and $v_m$ can be represented by the following equation 17.

$$\phi_n = e^{j\pi n/2}$$

$$v_m = [1\ e^{j2\pi m/32}\ e^{j4\pi m/32}\ e^{j6\pi m/32}]^T \quad \text{[Equation 17]}$$

TABLE 11

| $i_1$ | $i_2$ | | | | |
|---|---|---|---|---|---|
| | 0 | 1 | 2 | 3 | 4 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ |

| $i_1$ | $i_2$ | | | | |
|---|---|---|---|---|---|
| | 5 | 6 | 7 | 8 | 9 |
| 0-15 | $W_{2i_1+1,1}^{(1)}$ | $W_{2i_1+1,2}^{(1)}$ | $W_{2i_1+1,3}^{(1)}$ | $W_{2i_1+2,0}^{(1)}$ | $W_{2i_1+2,1}^{(1)}$ |

| $i_1$ | $i_2$ | | | | |
|---|---|---|---|---|---|
| | 10 | 11 | 12 | 13 | 14 |
| 0-15 | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ |

| $i_1$ | $i_2$ |
|---|---|
| | 15 |
| 0-15 | $W_{2i_1+3,3}^{(1)}$ |

TABLE 11-continued where $W_{m,n}^{(1)} = \dfrac{1}{\sqrt{8}}\begin{bmatrix} v_m \\ \varphi_n v_m \end{bmatrix}$

TABLE 12

| $i_1$ | $i_2$ | | | |
|---|---|---|---|---|
| | 0 | 1 | 2 | 3 |
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ | | | |
|---|---|---|---|---|
| | 4 | 5 | 6 | 7 |
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ | | | |
|---|---|---|---|---|
| | 8 | 9 | 10 | 11 |
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | | |
|---|---|---|---|---|
| | 12 | 13 | 14 | 15 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \dfrac{1}{4}\begin{bmatrix} v_m & v_{m'} \\ \varphi_n v_m & -\varphi_n v_{m'} \end{bmatrix}$

TABLE 13

| $i_1$ | $i_2$ | | |
|---|---|---|---|
| | 0 | 1 | 2 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ |

| $i_1$ | $i_2$ | | |
|---|---|---|---|
| | 3 | 4 | 5 |
| 0-3 | $\tilde{W}_{8i_1+8,8i_1,8i_1}^{(3)}$ | $W_{8i_1+2,8i_1+2,4i_1+10}^{(3)}$ | $W_{8i_1+10,8i_1+2,8i_1+10}^{(3)}$ |

| $i_1$ | $i_2$ | | |
|---|---|---|---|
| | 6 | 7 | 8 |
| 0-3 | $\tilde{W}_{8i_1+2,8i_1+10,8i_1+10}^{(3)}$ | $\tilde{W}_{8i_1+10,8i_1+2,8i_1+2}^{(3)}$ | $W_{8i_1+4,8i_1+4,8i_1+12}^{(3)}$ |

| $i_1$ | $i_2$ | | |
|---|---|---|---|
| | 9 | 10 | 11 |
| 0-3 | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | |
|---|---|---|---|
| | 12 | 13 | 14 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ |

| $i_1$ | $i_2$ |
|---|---|
| | 15 |
| 0-3 | $\tilde{W}_{8i_1+14,8i_1+6,8i_1+6}^{(3)}$ |

TABLE 13-continued where $W^{(3)}_{m,m',m''} = \frac{1}{\sqrt{24}} \begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}} \begin{bmatrix} v_m & v_{m'} & v_{m''} \\ v_m & v_{m'} & -v_{m''} \end{bmatrix}$

TABLE 14

| $i_1$ | $i_2$ | | | |
|---|---|---|---|---|
|  | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| $i_1$ | $i_2$ | | | |
|---|---|---|---|---|
|  | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 15

| $i_1$ | $i_2$ |
|---|---|
|  | 0 |
| 0-3 | $W^{(5)}_{i_1} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 16

| $i_1$ | $i_2$ |
|---|---|
|  | 0 |
| 0-3 | $W^{(6)}_{i_1} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 17

| $i_1$ | $i_2$ |
|---|---|
|  | 0 |
| 0-3 | $W^{(7)}_{i_1} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 18

| $i_1$ | $i_2$ |
|---|---|
|  | 0 |
| 0 | $W^{(8)}_{i_1} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

DCI format 0

DCI format 0 is used for the PUSCH scheduling. Control information transmitted by the DCI format 0 will hereinafter be described in detail.

A 'Flag for format 0/format 1A differentiation' field assigned to one bit is used to differentiate between DCI format 0 and DCI format 1A. DCI format 1A is used to schedule downlink (DL) transmission and has the same payload size as that of DCI format 0, such that there is needed a field for allowing the same format to be assigned to DCI format 0 and DCI format 1A in such a manner that DCI format 0 and DCI format 1A can be distinguished from each other. If the 'Flag for format 0/format 1A differentiation' field is set to 0, this indicates DCI format 0. If the 'Flag for format 0/format 1A differentiation' field is set to 1, this indicates DCI format 1A.

A 'Frequency hopping flag' field is given by one bit and indicates application or non-application of PUSCH frequency hopping. If the 'Frequency hopping flag' field is set to 0, this means the non-application of PUSCH frequency hopping. If the 'Frequency hopping flag' field is set to 1, this indicates application of PUSCH frequency hopping.

A 'Resource block assignment and hopping resource allocation' field indicates resource block allocation information in a UL subframe according to the presence or absence of PUSCH frequency hopping. The 'Resource block assignment and hopping resource allocation' field is comprised of $\lceil \log_2(N_{RB}^{UL}(N_{RB}^{UL}+1)/2) \rceil$ bits. N is a UL bandwidth configuration value, and is represented by the number of resource blocks (RBs). In case of the application of PUSCH hopping, $N_{UL\_hop}$ Most Significant Bits (MSBs) are used to obtain the value of $\tilde{n}_{PRB}(i)$ (physical resource block index), and ($\lceil \log_2(N_{RB}^{UL}(N_{RB}^{UL}+1)/2) \rceil - N_{UL\_hop}$) bits provide resource allocation of the first slot in the UL subframe. In this case, $N_{UL\_hop}$ indicates hopping information of 1 or 2 bits according to system bandwidth. On the other hand, in case of non-application of PUSCH hopping, ($\lceil \log_2(N_{RB}^{UL}(N_{RB}^{UL}+1)/2) \rceil$) bits provide resource allocation of a UL subframe.

A 'Modulation and coding scheme and redundancy version' field is given by 5 bits, and indicates a PUSCH modulation order and a PUSCH redundancy version (RV). In case of retransmission, RV indicates information as to which subpacket is retransmitted. $0^{th}$ to $28^{th}$ states from among 32 states each denoted by 5 bits are used to indicate the modulation order, and 29$^{th}$ to 31$^{st}$ states may indicate RV indexes (1, 2, and 3).

A 'New data indicator' field is given by one bit, and indicates UL scheduling information related to new data or retransmission. If much more toggling is performed as compared to previous transmission NDI, this means new data transmission. If no toggling occurs, this means retransmission.

A 'TPC command for scheduled PUSCH' (Transmission Power Control (TPC) command for scheduled PUSCH) field is given by 2 bits, and indicates a specific value capable of determining PUSCH transmission power.

A 'Cyclic shift for DMRS' field is given by 3 bits and indicates a cyclic shift value used to generate a sequence for a Demodulation Reference Signal (DMRS). DMRS is a reference signal (RS) to estimate a UL channel either for each antenna port or for each layer.

A 'UL index (for TDD)' [UL index (in case of TDD)] field is given by 2 bits, and may indicate a subframe index, etc. for UL transmission in a specific UL-DL configuration when a radio frame is configured by a TDD scheme.

A 'Downlink Assignment Index (for TDD)' [DL index (in case of TDD)] field is given by 2 bits, and may indicate a total number of subframes for PDSCH transmission in a specific UL-DL configuration in a radio frame configured by a TDD scheme.

A 'CQI request' field is given by one 2 bit, and can aperiodically report a Channel Quality Information (CQI), a Precoding Matrix Indicator (PMI) and a Rank Indicator (RI) over a PUSCH.

If the 'CQI request' field is set to 1, a UE aperiodically transmits the CQI, PMI, and RI reporting information over a PUSCH.

A 'Modulation and coding scheme and redundancy version' field may perform signaling of an MCS index ($I_{MCS}$) that represents 32 states using 5 bits as shown in Table 4. If $I_{MCS}=29$ is signaled for $29 \leq I_{MCS} \leq 31$, a 'CQI request' bit of the DCI format 0 is set to 1, transmission of 4 RBs or less ($N_{PRB} \leq 4$) is configured, a redundancy version 1 (RV1) is indicated in PUSCH data retransmission, and a modulation order $Q_m$ is set to 2 ($Q_m=2$). In other words, when transmitting only the CQI, only QPSK may be used as the modulation scheme.

The 3GPP LTE system can transmit a maximum of 8 layers for SU-MIMO, and can transmit signals using a maximum of 2 layers for MU-MIMO. From the viewpoint of the receiver, signals can be demodulated using the same operation irrespective of SU-MIMO and MU-MIMO.

The receiver provides signal transmission information (for example, CSI) to the transmitter. Generally, it is assumed that SU-MIMO transmission is used for CSI reporting. Generally, CSI based on SU-MIMO is calculated without considering intra-cell interference, such that performance degradation may occur due to CQI mismatch on the assumption that the MU-MIMO transmission is attempted using the SU-MIMO based CSI. Therefore, in order to increase MU-MIMO transmission performance, a method for reporting the precoder appropriate for MU-MIMO transmission can be considered.

If the UE informs the eNode B of a transmission rank capable of acquiring maximum efficiency during the SU-MIMO transmission, for example, if the Rank-8 based codebook index and CQI are calculated and reported, feedback information may be used as information appropriate for Rank-8 transmission, however, the above-mentioned feedback information may be inappropriate for MU-MIMO transmission in which UEs each having Rank-1 and Rank-2 are multiplexed and transmitted. Accordingly, not only CSI for SU-MIMO but also CSI for MU-MIMO transmission should be reported to prevent performance deterioration.

Generally, two methods may be considered for reporting the CSI to the transmitter by the receiver. One of the two methods is a method for reporting CSI using promised resources at a promised time, and the other is a method for reporting CSI at a specific time upon receiving an indication message from the transmitter. As an exemplary method for reporting CSI at a promised time, a method for reporting the periodic CQI reporting information over a PUCCH in 3GPP LTE Release 8 may be used (However, if PUSCH data is transmitted at a periodic CSI report time point, CSI is multiplexed with data, and the multiplexed result is transmitted). As a method for reporting CSI at a specific time upon receiving an indication message from the transmitter, the aperiodic CSI reporting request field is established in uplink transmission control information contained in a downlink control channel, such that the established result can be reported over a PUSCH.

Embodiment 1

The present invention relates to a method for reporting CSI information that is capable of effectively supporting SU-MIMO and MU-MIMO transmission in aperiodic CSI reporting reported through a PUSCH. Embodiment 1 can be largely classified into Embodiment 1-A that simultaneously reports a UE recommended CSI and a restricted rank CSI and Embodiment 1-B that reports one of the UE Recommended CSI and the restricted rank CSI.

Embodiment 1-A

Embodiment 1-A relates to a method for simultaneously reporting the UE recommended CSI and the restricted rank CSI.

Assuming that the rank range capable of being measured by the receiver (i.e., UE) is set to Rank-N, the receiver calculates CQIs of Rank-1 to Rank-N such that it can select one rank capable of maximizing a throughput. However, assuming that the receiver selects a rank of Rank-M or higher (for example, M=3), information of a rank less than Rank-M needed for MU-MIMO transmission may be additionally reported. In this case, if the restricted rank is configured and rank adaptation is possible in the maximum rank, the rank indicator (RI) is requested. If the restricted rank is set to a restricted rank such as Rank-1 or Rank-2, only the PMI and CQI values may be reported without the rank indicator (RI).

If the UE recommended rank is set to M or less (for example, M=2), only the UE recommended CSI is reported. If the UE recommended rank is set to M or higher (for example, M=2), not only the UE recommended CSI but also the restricted rank CSI may be reported.

Embodiment 1-B

Embodiment 1-B relates to a method for reporting only one of the UE recommended CSI and the restricted rank CSI.

Provided that the rank range capable of being measured by the receiver is set to Rank-N, the receiver calculates CQIs of Rank-1 to Rank-N such that it can select one rank capable of maximizing throughput. However, provided that the receiver selects a rank of Rank-M or higher (for example, M=3), the transmitter may request a CQI (for example, CSI of Rank of M or less) needed for MU-MIMO transmission. The transmitter may request information of a rank lower than the rank range capable of being calculated and reported by the receiver. For this operation, a variety of embodiments of the present invention will hereinafter be described in detail.

Embodiment 1-B-1

There may be used an indication method in which an indicator is defined in a DCI format of a PDCCH so that rank information desired by the eNode B can be reported.

An indicator for indicating CQI attributes is defined in UL transmission control information, such that the receiver may report a CQI of a rank contained in a range indicated by the transmitter.

A CQI request field is defined in a DCI format 0 of the 3GPP LTE Release 8. If the CQI request field is set to 1, the UE transmits CSI. In this case, the transmitted CSI information includes a Rank, a PMI, and a CQI. Generally, rank information is selected as a UE preferred value.

For example, in a DCI format (for example, DCI format 4) newly defined for UL transmission in a system having the extended antenna configuration (for example, a 3GPP LTE Release 10 system), a UE preferred Rank is primarily reported when the eNode B (or eNB) reports a CQI. If the eNB indicates a rank, the UE may report a CQI in response to an eNB configured rank. The rank indicated by the eNB may designate a specific rank value, may indicate a maximum rank value, may indicate an index for the maximum rank value, may be an indicator for using the promised rank value (or the predetermined rank value), or may be an indicator for using the promised maximum rank value.

The rank for using the eNB configured rank (or the restricted rank) may be contained in a DCI format. For example, if the CQI request field from among the fields defined in the DCI format is activated, an unused field of the corresponding DCI format may also be interpreted as an indicator for using the eNB configured rank. Alternatively, the above-mentioned indicator may also be used as an indicator for using the eNB configured rank as a combination of other fields.

For example, the bit field of the DCI format 4 may be defined as follows.

TABLE 19

| Contents | | Number of bit |
|---|---|---|
| Resource block assignment | | N |
| $1^{st}$ TB | MCS and RV | 5 |
|  | NDI | 1 |
| $2^{nd}$ TB | MCS and RV | 5 |
|  | NDI | 1 |
| Precoding information | | M |
| TPC command for scheduled PUSCH | | 2 |
| Cyclic shift for DMRS | | 3 |
| UL index (for TDD) | | 2 |
| Downlink Assignment Index (for TDD) | | 2 |
| CQI request | | 1 |
| Aperiodic SRS request | | 1 |

In Table 19, if the CQI request field is activated, the MCS and RV fields for a $2^{nd}$ transport block (TB) may be unused. In this case, the MCS and RV fields for the $2^{nd}$ TB may be used to indicate the eNB configured rank (or restricted rank).

Embodiment 1-B-2

A method for establishing the report rank range according to PDCCH DCI format types may be used.

Control information for UL transmission may be classified into a DCI format for supporting single layer transmission and a DCI format for supporting multi-layer transmission. For example, single antenna transmission is single layer transmission. For this operation, DCI format 0 is defined. In addition, in order to support a specific allocation method in spite of single layer transmission, a new DCI format 0A (for example, DCI format 0A) may be defined. In spite of single layer transmission, a new DCI format (for example, DCI format 0B) including a single layer precoder indicator may be defined. In addition, a DCI format for MIMO transmission may be defined, and a new DCI format (for example, DCI format 4) may be defined for multi-TB transmission.

A CQI request field may be defined in each DCI format. In this case, if the CQI request field of the DCI format supporting one transport block (TB) is activated, the UE calculates and reports a CQI in the restricted rank. In addition, if the CQI request field of the DCI format supporting multiple transport blocks is activated, the UE calculates and reports a CQI in a rank that can be measured and received by the UE.

In other words, if the CQI request indication is received from the DCI format supporting the single TB in the same manner as in the DCI format '0', '0A', or '0B', a CQI is calculated in the restricted rank. If the CQI request indication is received from a DCI format supporting multiple TBs in the same manner as in the DCI format '4', the UE calculates and reports the CQI at a rank that can be measured and received by the UE.

In this case, the restricted rank may be established as a value independent of the UE measurable rank. The restricted rank may be informed through the RRC signaling or may be set to a fixed value. For example, the restricted rank may be set to a maximum of Rank 2.

Embodiment 1-B-3

A method for establishing a reported information type according to a number of transmission PUSCH may be used.

When a CQI request field of the DCI format 0 is set to 1 in the 3GPP LTE Release-8, PUSCH is transmitted at a (n+k)-th time point corresponding to k subframes from a time at which a DCI is received over a PDCCH. In case of FDD, k is set to 4 (k=4).

The reported CSI may be changed according to whether 'n' is an even or odd number on the basis of the n-th subframe at which a DCI format having an activated CQI request field requesting the aperiodic CQI is received. For example, if the n-th subframe is an even subframe, CSI of the UE recommended rank may be reported. Additionally, if the n-th subframe is an odd number, CSI of the restricted rank may be reported. Alternatively, if the n-th subframe is an odd subframe, CSI of the UE recommended rank is reported. Additionally, if the n-th subframe is an even number, CSI of the restricted rank may be reported.

At the n-subframe corresponding to a reception time of the DCI format in which a CQI request field requesting the aperiodic CQI is requested is activated, the reported CSI may be changed according to whether the value of (n+k) is an even or odd number. For example, if the $(n+k)^{th}$ subframe is an even subframe, CSI of the UE recommended rank may be reported. Additionally, if the $(n+k)^{th}$ subframe is an odd number, CSI of the restricted rank may be reported. Alternatively, if the $(n+k)^{th}$ subframe is an odd subframe, CSI of the UE recommended rank may be reported. Additionally, if the $(n+k)^{th}$ subframe is an odd subframe, CSI of the restricted rank may be reported.

The CSI reporting method for effectively supporting the SU-MIMO and MU-MIMO transmission proposed in Embodiment 1 may be applied to a transmission mode newly defined in a system (for example, 3GPP LTE-A) supporting the extended antenna configuration.

Embodiment 2

A method for selecting a precoder suitable for the restricted rank using the precoder selected in response to the UE recommended rank on the condition that the UE recommended rank is higher than the restricted rank will hereinafter be described.

The precoder having Rank-N is composed of a combination of N precoding vectors. A low rank may be transmitted using some vectors from among N vectors. Using some vectors of the precoder may be referred to as subset selection.

A variety of methods for performing subset selection for the precoder that is reported from the UE to the eNB may be used. For example, 1) a method for selecting arbitrary vectors at random, 2) a method for selecting a subset according to a predetermined or promised rule, and 3) a method for reporting a vector preferred by the reporting side (i.e., UE) may be used. In this case, the above-mentioned methods (1) (Method for selecting arbitrary vectors) and (2) (Method for selecting a subset according to a promised rule) need not use additional signals. On the other hand, according to the method (3) for reporting the UE preferred vector, the reporting side (IE) has to provide subset selection information to the reported side (eNB).

Rules and examples applicable to the above-mentioned method (2) for selecting a subset according to the promised rule will hereinafter be described.

For example, a specific rule for sequentially selecting columns starting from the first column of the precoder may be used. In case of Rank-1, a first column may be selected. In case of Rank-2, first and second columns may be selected.

In another example, another rule for selecting a subset in consideration of a layer mapped to a transport block (TB) may be used. A precoder corresponding to the $M^{th}$ layer from among layers mapped to the TB may be selected. For example, assuming that 2 TBs (TB1 and TB2) are mapped to layers (Layer 1, Layer 2, Layer 3, Layer 4), the $1^{st}$ TB (TB1) is mapped to the $1^{st}$ and $2^{nd}$ layers (Layer 1 and Layer 2), and the $2^{nd}$ TB (TB2) is mapped to the $3^{rd}$ and $4^{th}$ layers. In this case, if M=1 is given in precoder subset selection, a subset corresponding to a first layer (Layer 1) mapped to a TB1 and a subset corresponding to a first layer (Layer 3) mapped to a TB2 may be selected as two precoders.

Exemplary signaling methods capable of being applied to the method for reporting the preferred vector at the reporting side will hereinafter be described in detail.

For example, the precoder subset may be reported as a bitmap format. In case of a Rank-N, by means of a bitmap composed of N bits for displaying N vectors, information as to what the UE preferred precoder vector is can be reported to the eNB.

In another example, provided that preferring one vector from among the precoder subsets is reported, information as to which one of the precoder vectors is preferred by the UE may be reported to the eNB using $\log_2(N)$ bits (where N=Rank).

If the precoder is selected according to the above-mentioned schemes, a CQI corresponding to the selected precoder may be calculated and reported. For SU-MIMO transmission, the Rank-N precoder may be selected, and a CQI may be calculated in response to the selected precoder. In this case, some precoder vectors are selected from among the Rank-N precoder, a CQI corresponding to the selected subset may be re-calculated. For example, if the precoder for a Rank-4 is selected, a CQI for Rank-4 may be calculated by the precoder. In addition, if two precoder vectors are selected on the basis of the Rank-4 precoder, a Rank-2 CQI may be calculated.

A variety of exemplary feedback methods applicable to the above-mentioned precoder selection will hereinafter be described in detail.

According to a first feedback method, a method for feeding back "RI-PMI1-CQI1-PMI2-CQI2" may be used. In the first feedback method, RI is rank information corresponding to PMI1 (or Precoder1), and CQI1 is calculated on the basis of PMI1. PMI1 is precoder(s) selected from among the PMI1, and CQI2 is calculated on the basis of the PMI2. In this case, each of PMI1, PMI2, CQI1 and CQI2 may be transmitted one or more times.

According to a second feedback method, a method for feeding back "RI-PMI1-CQI1-CQI2" may be used. In the second feedback method, RI is rank information corresponding to PMI1 (or Precoder1), and CQI1 is calculated on the basis of PMI1. CQI2 may be calculated on the basis of PMI2 (or Precoder2). PMI2 is precoder(s) selected from among the PMI1. If PMI2 is selected by the promised rule, PMI2 is not reported. In this way, each of PMI1, CQI1, and CQI2 may be transmitted one or more times.

According to a third feedback method, a method for feeding back "RI-PMI1-CQI1-PSI (Precoder Selection Indicator)—CQI2" may be used. In the third feedback method, RI is rank information corresponding to PMI1 (or Precoder1), and CQI1 is calculated on the basis of PMI1. PMI2 (or Precoder2) is precoder(s) selected from among the PMI1, and may report a PSI to indicate which value was selected as the PMI2. In this case, each of PMI1, CQI1, and CQI2 may be transmitted one or more times.

In case of the application of the above-mentioned feedback methods, feedback information may be simultaneously reported according to the reported channel (e.g., PUSCH or PUCCH), or may be reported at different cycles. For example, in case of feedback reporting over a PUSCH, an RI, a PMI and a CQI may be reported over one channel. If a PMI2 selected as some subsets of the PMI1 is reported, PMI2 and CQI2 may be simultaneously reported over only one channel. Alternatively, in case of the feedback reporting over a PUCCH, RI, PMI and CQI may be reported at different cycles. If a PMI2 selected as some subsets of a PMI1 is reported as described above, PMI2 and CQI2 may also be reported at different cycles.

Embodiment 3

A method for determining a transmission time point of feedback information when precoder information for the restricted rank is transmitted will hereinafter be described in detail.

Generally, a low rank precoder is used from the viewpoint of one user to implement MU-MIMO transmission, and it is preferable that users having low spatial correlation be generally multiplexed and transmitted. Even in the case of MU-MIMO transmission, the UE assumes SU-MIMO without distinction between MU-MIMO transmission and SU-MIMO transmission, and then determines and reports a rank value at which the maximum throughput is expected. Under the condition that the UE recommended rank and the precoder in response to the corresponding rank are selected and reported, a high rank precoder and associated CQI may be calculated and reported. When the high rank precoder is reported, a low rank precoder may be configured for MU-MIMO transmission using a subset of the reported precoder, or a method for additionally reporting the low rank precoder may be used.

First, the method for allowing an eNB to select a precoder subset reported from the UE so as to perform MU-MIMO transmission will hereinafter be described in detail. If the precoder subset depending on the UE recommended rank is used for MU-MIMO transmission, a CQI is needed for the MU-MIMO transmission of the eNB. Since the eNB receives report information of a CQI calculated on the basis of the precoder of the UE recommended rank, this CQI may be used as a MU-MIMO CQI. However, a channel state of the CQI calculated on the basis of the UE recommended rank precoder may be different from a channel state requisite for data that is transmitted using the corresponding precoder subset. Accordingly, in the case in which the eNB uses the CQI calculated on the basis of the UE recommended rank precoder as the MU-MIMO CQI, a CQI mismatch may occur. Preferably, it is preferable that the CQI calculated based on the precoder subset be reported to improve a MU-MIMO throughput.

Second, the method for allowing a UE to additionally report the low rank precoder will hereinafter be described. When the low rank precoder is reported, the CQI calculated on the basis of the precoder is preferably reported simultaneously with the low rank precoder.

PUCCH resources allocated from the eNB to the UE so as to report channel information using the conventional scheme are limited, and the precoder of the UE recommended rank and associated CQI may be reported over a PUCCH. Accordingly, in order to report the precoder subset and associated CQI or in order to report the restricted rank precoder and associated CQI, there is needed a method for newly defining a report time point and/or resources of such additional feedback information.

Embodiment 3-A

A method for establishing an offset at which the restricted rank based precoder and CQI is reported will hereinafter be described in detail.

In case of periodic PUCCH feedback reporting, a time point for RI and PMI/CQI transmission is defined. Generally, rank and PMI/CQI information are reported at different subframes. Specifically, RI is reported at a cycle longer than that of the PMI/CQI. If a rank is reported, the PMI/CQI information corresponding to the previously reported rank is reported in response to the corresponding transmission cycle until reaching the next rank reporting time.

If a higher rank is reported as described above, it is necessary to report the low rank PMI and associated CQI or the subset of a higher rank precoder and associated CQI. The low-rank precoder/CQI information may be referred to as PMI/CQI information of the restricted rank.

The time point at which the restricted rank PMI/CQI is reported may be some parts of another timing at which the higher rank PMI/CQI is reported. That is, a specific time from among a high-rank PMI/CQI report timing between rank reporting periods may be considered a report timing of the restricted rank PMI/CQI. The restricted rank PMI/CQI may be reported at a cycle longer than the reporting timing of the UE recommended rank PMI/CQI (that is, the restricted rank PMI/CQI may be reported less frequently than the UE recommended rank PMI/CQI), and may be reported with a predetermined offset at a UE recommended rank PMI/CQI reporting time point. Especially, an offset of the restricted rank PMI/CQI transmission time point may be reported later than the UE recommended rank PMI/CQI transmission time point.

On the other hand, a timing offset of a subsframe for rank information transmission may be the same subframe on the basis of the UE recommended rank PMI/CQI subframe, or may be transmitted at a subframe located before the above-mentioned subframe. In order to prevent the restricted rank PMI/CQI transmission from colliding with a subframe at which rank information is transmitted (i.e., in order to prevent the restricted rank PMI/CQI from being transmitted at the same subframe as the rank information), the restricted rank PMI/CQI may be reported later than a reference subframe at which the UE recommended rank PMI/CQI is transmitted. In addition, the offset for a transmission time point of the restricted rank PMI/CQI may be set to a positive (or negative) integer excluding '0'.

Figure 22:
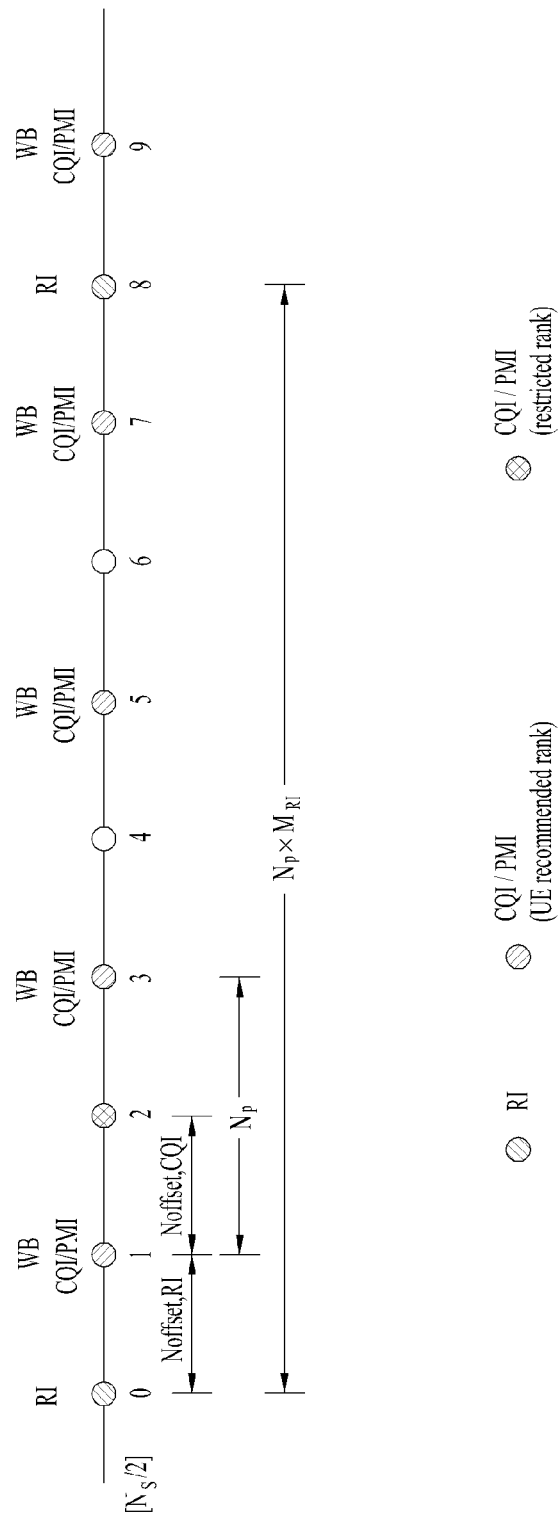
FIGS. 22 and 23 illustrate examples of the restricted rank PMI/CQI transmission timing and offset.
Figure 23:
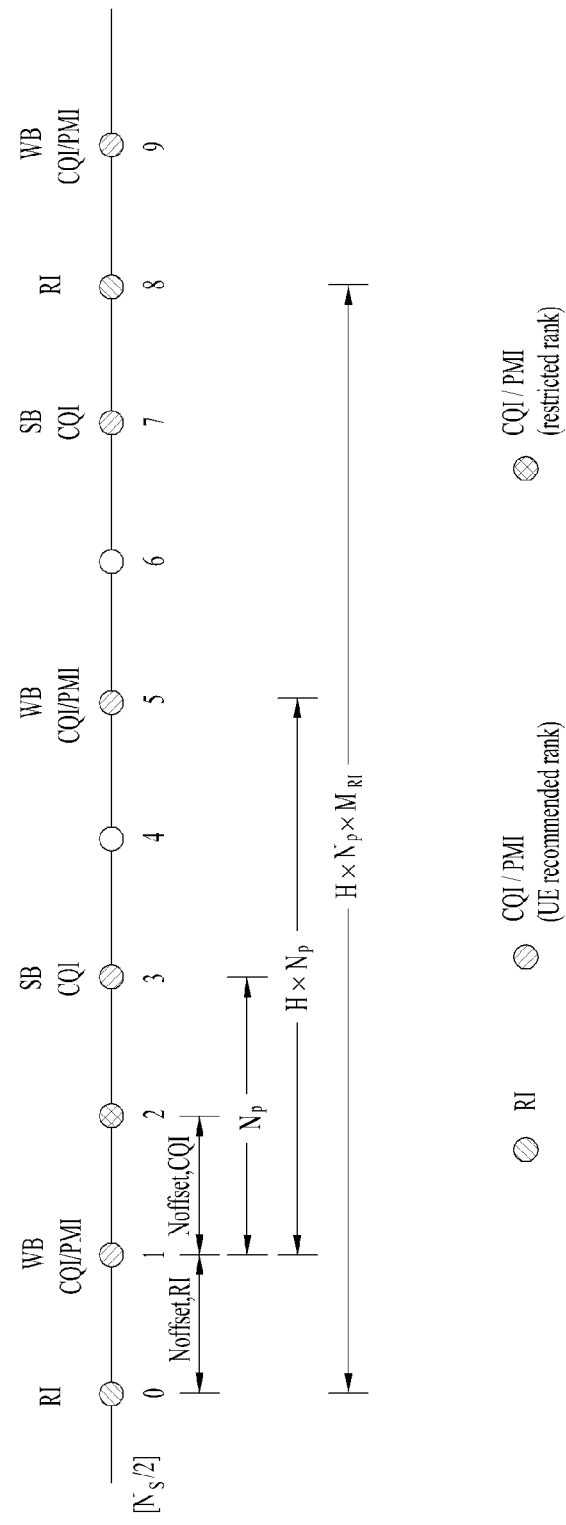

FIGS. 22 and 23 illustrate examples of the restricted rank PMI/CQI transmission timing and offset.

Examples of the restricted rank PMI/CQI transmission timing and offset will hereinafter be described with reference to FIGS. 22 and 23. In FIGS. 22 and 23, $N_s$ is a slot index, and may be 0, 1, ..., Ns. That is, one radio frame composed of 10 subframes is shown in FIGS. 22 and 23, and $\lfloor Ns/2 \rfloor$ is a subframe index.

In FIG. 22, a CQI/PMI based on the UE recommended rank is transmitted at intervals of Np, RI is transmitted at intervals of an integer multiple ($Np \times M_{RI}$) of the CQI/PMI cycle based on the UE recommended rank, and RI is transmitted at a time point located ahead of the CQI/PMI transmission time point of the UE recommended rank by a predetermined offset ($N_{offset,RI}$). As previously stated in the above-mentioned embodiments, the restricted rank PMI/CQI may be transmitted at a time point located behind a CQI/PMI transmission time point of the UE recommended rank by a predetermined offset ($N_{offset,CQI}$), and may be transmitted with a cycle longer than the UE recommended rank CQI/PMI transmission cycle.

As can be seen from FIG. 23, a WB CQI/PMI and an SB CQI are transmitted as the UE recommended rank CQI/PMI. WB CQI/PMI and SB CQI may be alternately transmitted at intervals of Np, and the transmission cycle of the WB CQI/PMI may be set to ($H \times Np$). RI may be transmitted at intervals of an integer multiple of the WB CQI/PMI cycle of the UE recommended rank (i.e., at intervals of ($H \times Np \times M_{RI}$)). RI is transmitted at a time point located ahead of a CQI/PMI transmission time point of the UE recommended rank by a predetermined offset ($N_{offset,RI}$). As previously sated in the above-mentioned embodiments, the restricted rank PMI/CQI may be transmitted at a time point located behind a CQI/PMI transmission time point of the UE recommended rank by a predetermined offset ($N_{offset,CQI}$), and may be transmitted with a cycle longer than the UE recommended rank CQI/PMI transmission cycle.

Embodiment 3-A-1

An example of a feedback mode of the restricted rank PMI/CQI will hereinafter be described in detail.

In accordance with Embodiment 3-A-1, a feedback mode of the restricted rank PMI/CQI may be based on a feedback mode of the UE recommended rank PMI/CQI. For example, if the feedback mode of the UE recommended rank PMI/CQI is a mode for transmitting a WB PMI and a WB CQI, the restricted rank PMI/CQI may also be transmitted as the WB PMI and WB CQI. Alternatively, if the feedback mode of the UE recommended rank PMI/CQI is a mode for transmitting the WB PMI and SB CQI, the restricted rank PMI/CQI may also be transmitted as the WB PMI and SB CQI.

In addition, if the SB CQI is reported in the same manner as in band cycling, there may be used one cycle in which a WB CQI is reported and all SB CQIs for individual bandwidth parts (BPs) are reported. The restricted rank PMI/CQI may be reported during one cycle in which a WB CQI and SB CQIs of individual BPs are reported. That is, at least one cycle from among the band cyclic reporting period having one or more periods in the RI report cycle may be set to the report period of the restricted rank PMI/CQI.

Figure 24:
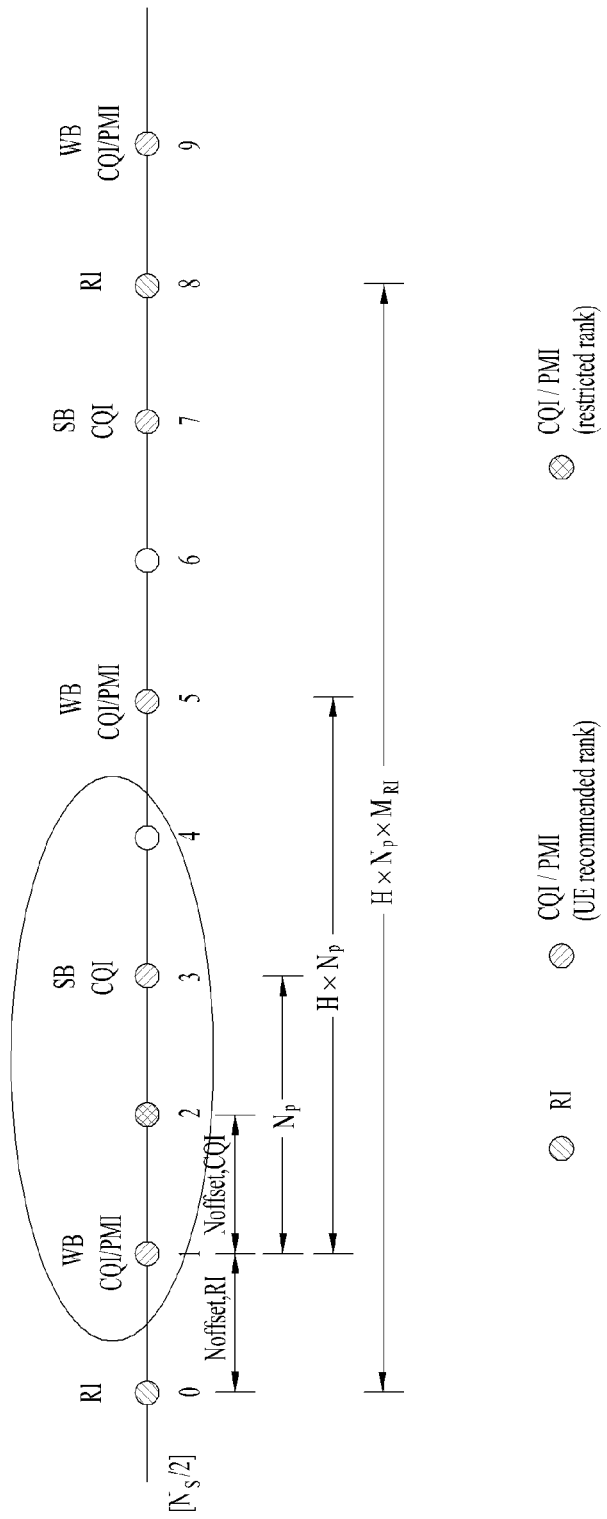
FIGS. 24 to 26 illustrate the restricted rank PMI/CQI reporting cycles.

An example of the restricted rank PMI/CQI reporting period will hereinafter be described with reference to FIG. 24. In FIG. 24, one of the band cyclic reporting periods, each of which is used to report a WB CQI and a CQI of each BP, from among the RI reporting period (H×Np×$M_{RI}$) may correspond to $\lfloor Ns/2 \rfloor$ of 1~4. In FIG. 24, as previously stated in the above-mentioned embodiments, the restricted rank PMI/CQI may be transmitted in one of the band cyclic reporting periods.

Embodiment 3-A-2

Another example of a feedback mode of the restricted rank PMI/CQI will hereinafter be described in detail.

In accordance with Embodiment 3-A-2, a feedback mode of the restricted rank PMI/CQI is established to have a constant feedback mode irrespective of the feedback mode of the UE recommended rank PMI/CQI. For example, the restricted rank PMI/CQI may be established to have a WB PMI and a WB CQI.

Embodiment 3-B-1

Embodiment 3-B-1 relates to a feedback method on the condition that a multiple-granular precoder is defined. The multiple-granular precoder may be comprised of a combination of two codebooks (W1 and W2). W1 and W2 may be composed of various codebooks. Therefore, the eNB may receive report information of different feedback indicators (W1 and W2) of the precoder and then select the entire precoder. Different information (W1 and W2) for the precoder may be reported at different time points. For example, W1 may be reported at long term and W2 may be reported at short term. When W1 is reported at long term, W1 may be reported along with rank information. Alternatively, W1 and W1 may be simultaneously reported. That is, in case of using the multiple-granular precoder, a transmission time point of feedback information may be established as shown in the following table 20.

TABLE 20

| | T1 | T2 |
|---|---|---|
| Mode (1) | Rank + W1 (wideband) | W2 (wideband) + CQI (wideband) |
| Mode (2) | Rank | W1 (wideband) + W2 (wideband) + CQI (wideband) |

As can be seen from Mode (1) of Table 20, rank information (RI) and a WB W1 may be transmitted at the same time point (T1), and a WB W2 and a WB CQI may be transmitted at an arbitrary time T2 lagging the T1 time. Alternatively, as can be seen from Mode (2), rank information (Ri) may be transmitted at the time T1, and a WB W1, a WB W2 and a WB CQI may be transmitted at an arbitrary time T2 lagging the T1 time.

In this way, under the condition that the indicators (W1 and W1) for the precoder are reported at the same or different time points, the restricted rank PMI/CQI may be fed back. If the restricted rank PMI/CQI is reported. W1 and W2 suitable for the restricted rank may be selected and fed back. In addition, a CQI calculated on the basis of the selected W1 and W2 may be fed back. In this case, W1, W2 and CQI may be reported at the same time point (i.e., at one subframe).

A feedback method including the restricted rank PMI/CQI under the multiple-granular precoder will hereinafter be described with reference to FIGS. 25 and 26.

Figure 25:
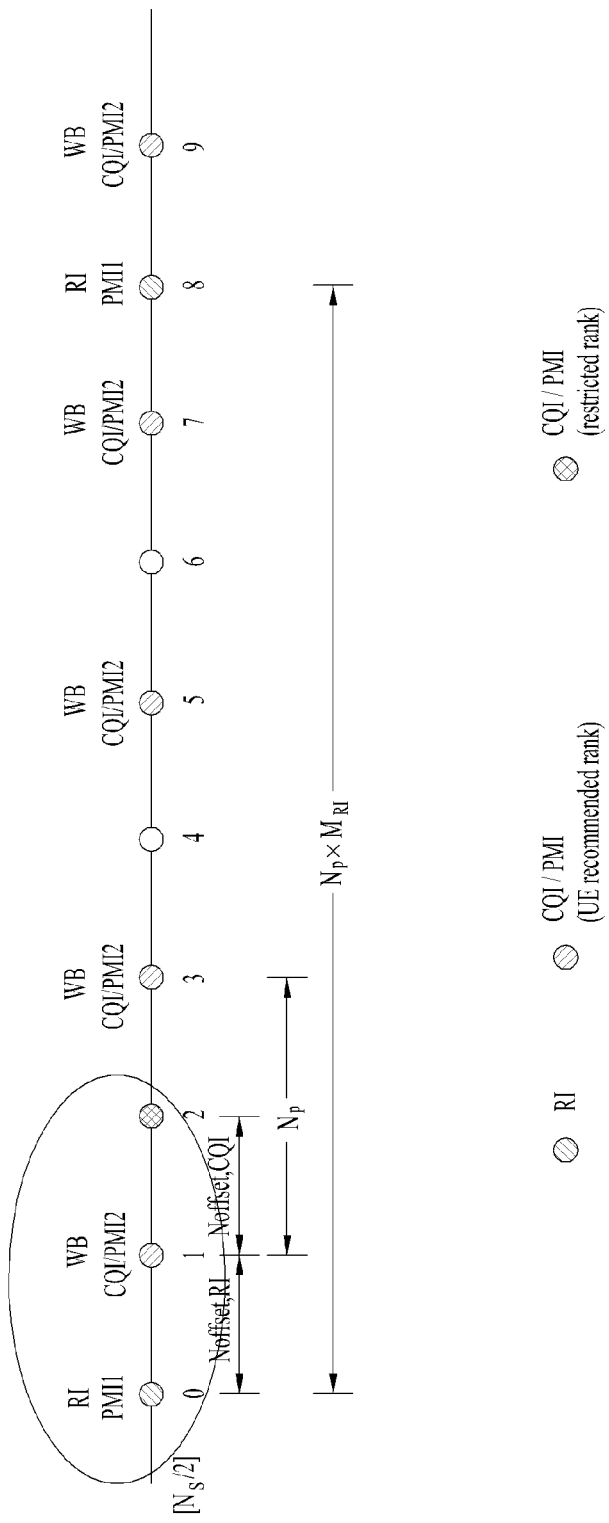

In FIG. 25, RI and PMI1 (i.e., WB W1) are simultaneously transmitted at one time point, and WB PMI2 (i.e., WB W2) and WB CQI are transmitted at a later time point. In this case, PMI1, PMI2, and CQI may be feedback information that is selected and calculated according to the UE recommended rank. In addition, the restricted rank PMI/CQI may be transmitted at a time point located behind the UE recommended rank CQI/PMI transmission time point by a predetermined offset ($N_{offset,CQI}$) In FIG. 25, PMI1, PMI2, and CQI of the restricted rank are transmitted at a time point corresponding to $\lfloor Ns/2 \rfloor = 2$.

Figure 26:
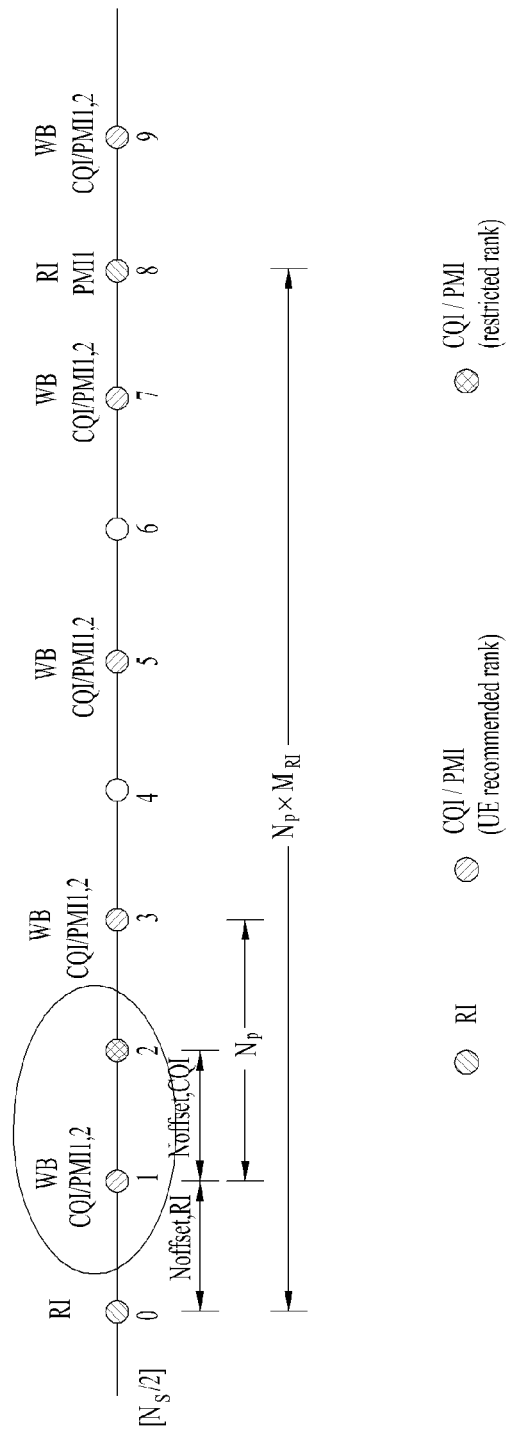

In FIG. 26, after RI is transmitted, WB PMI1 (i.e. WB W1), WB PMI2 (i.e., WB W2) and WB CQI are simultaneously transmitted. In this case, the transmitted PMI1, PMI2, and CQI may be feedback information that is selected and calculated according to the UE recommended rank. In addition, the restricted rank PMI/CQI may be transmitted at a time point located behind the UE recommended rank CQI/PMI transmission time point by a predetermined offset ($N_{offset,CQI}$). In FIG. 26, PMI1, PMI2, and CQI of the restricted rank are transmitted at a time point corresponding to $\lfloor Ns/2 \rfloor = 2$.

Embodiment 3-B-2

Embodiment 3-B-2 relates to a feedback method on the condition that a multiple-granular precoder is defined.

If multiple-granular precoder indicators (i.e., W1 and W2) are reported to the eNB, different feedback modes may be indicated using a Precoder Type Indication (PTI) bit.

In one feedback mode, R1, W1 and W2/CQI are transmitted at different subframes, and W1, W2 and CQI may be established as WB information. In the other feedback mode, W2 and CQI are reported at the same subframe, a W2/CQI frequency granularity may be WB or SB according to the reported subframe. That is, feedback modes of Table 21 can be defined.

TABLE 21

| | T1 | T2 | T3 |
|---|---|---|---|
| Mode (1) | PTI (0) + Rank | W1 (wideband) | W2 (wideband) + CQI (wideband) |
| Mode (2) | PTI (1) + Rank | W2 (wideband) + CQI (wideband) | W2 (subband) + CQI (subband) |

In Table 21, if PTI is set to zero (0), RI is transmitted at a time point T1, and a WB W1 is transmitted at an arbitrary time point T2. Thereafter, a feedback function may be carried out at an arbitrary time point T3 according to a mode for WB W2 and WB CQI transmission. In Table 21, if PTI is set to 1, RI is transmitted at a time point T1, and WB W1 and WB CQI are then transmitted at an arbitrary time point T2. After that, a feedback function may be carried out at an arbitrary time point T3 according to a mode for SB W2 and SB CQI transmission.

Mode (1) or Mode (2) may be determined according to a feedback cycle of the rank information (RI). After Mode (1) or Mode (2) is determined by a PTI, WB W1, WB W2, and WB CQI may be reported in response to a CQI cycle (See Mode (1)) or WB W2/WB CQI and SB W2/SB CQI may be reported in response to a CQI cycle (See Mode (2)). A reference of the reported cycle may be set to a transmission time point of WB W2 and WB CQI. Transmission timing of other feedback information may be determined as an offset for WB W2/WB CQI transmission timing.

In the feedback method of this embodiment, a method for establishing the cycle and offset for such WB W1 feedback will hereinafter be described in detail.

According to a first method, a WB W1 transmission cycle may be established at intervals of a specific time longer than a PTI/RI transmission cycle. That is, the WB W1 transmission cycle may be established less frequently than the PTI/RI transmission cycle. In addition, the WB W1 cycle may be an integer multiple of a transmission cycle of WB W2 and WB CQI. In addition, the WB W1 transmission timing may be established as an offset value of the reference timing (i.e., a transmission subframe of WB W2 and WB CQI).

According to a second method, the WB W1 transmission timing may be established as an offset value of the reference timing (i.e., a transmission subframe of WB W2 and WB CQI). In addition, if a PTI of PTI/RI feedback information is set to a specific value (0 or 1), the WB W1 may be immediately transmitted once after the PTI/RI transmission.

In the feedback method of this embodiment, a method for feeding back the restricted rank PMI/CQI will hereinafter be described in detail. The above-mentioned WB W1, WB W2, WB CQI, SB W2 and SB CQI are used as feedback information that is selected and calculated according to the UE recommended rank, and the restricted rank PMI/CQI may be further transmitted.

If PTI reported along with RI is set to 0, WB PMI and WB CQI may be reported as the restricted rank PMI/CQI. WB W1, WB W2 and WB CQI of the restricted rank may be reported at the same time point. In some subframes from among subframes in which (WB W2+WB CQI) of the UE recommended rank is reported, WB W1, WB W2 and WB CQI of the restricted rank may be simultaneously reported.

Alternatively, if PTI reported along with RI is set to 1, the restricted rank PMI/CQI may be reported. In this case, the following two methods may be used to report the restricted rank PMI/CQI.

In the first method, only WB W1, WB W2 and WB CQI of the restricted rank may be reported as the restricted rank PMI/CQI.

In the second method, WB W1, WB W2 and WB CQI of the restricted rank may be reported at one subframe, and SB W1 and SB CQI of the restricted rank may be reported at a different subframe. Transmission time points of the above-mentioned factors may be established according to the band cyclic reporting period.

Embodiment 4

Embodiment 4 discloses a method for deciding the number of bits of different precoder indexes constructing the entire precoder.

Tables 11 to 18 show codebooks for enabling a BS (or eNB) having 8 Tx antennas in the 3GPP LTE system to report a CSI. The CSI reporting codebooks shown in Tables 11 to 18 may decide the codebook element according to two kinds of feedback reports. Although Tables 11 to 18 represent two feedback report values as i1 and i2, i1 and i2 correspond to one precoder index W1 (or PMI1) and another precoder index W2 (or PMI2), respectively. Two report values may have different time points, and may be established to have different frequency granularities. For data transmission, the number (# of element) of constituent elements of the codebook may have different values according to the number of UE-recommended ranks, as represented by the following Table 22.

TABLE 22

| | Rank | | | | | | | |
|---|---|---|---|---|---|---|---|---|
| | 1 | 2 | 3 | 4 | 5 | 6 | 7 | 8 |
| # of element for i1 | 16 | 16 | 4 | 4 | 4 | 4 | 4 | 1 |
| # of element for i2 | 16 | 16 | 16 | 8 | 1 | 1 | 1 | 1 |

In Table 22, i1 may be defined to have an element of 16, 4 or 1 according to the rank, and i2 may be defined to have an element of 16, 8 or 1 according to the rank. For feedback, i1 may be represented by 0 to 4 bits, and i2 may be represented by 0 to 4 bits. A maximum number of bits capable of expressing i1 and i2 according to the rank can be represented by the following Table 23.

TABLE 23

| | Rank | | | | | | | |
|---|---|---|---|---|---|---|---|---|
| | 1 | 2 | 3 | 4 | 5 | 6 | 7 | 8 |
| Maximum bits for i1 | 4 | 4 | 2 | 2 | 2 | 2 | 2 | 0 |
| Maximum bits for i2 | 4 | 4 | 4 | 3 | 0 | 0 | 0 | 0 |

Due to limitation of control channel capacity defined to report feedback information, bits capable of representing i1 and i2 for CSI reporting may be restricted. That is, the i1 and i2 values must be transmitted to report a CSI. If an indicator for the it value and/or an indicator for the i2 value may be transmitted along with RI or CQI, an error rate similar to that of a channel that reports RI or CQI defined in the legacy 3GPP LTE Release-8 or Release-9 may be implemented and at the same time feedback information may be transmitted as necessary.

In the case where the indicator for the i1 value and/or the indicator for the i2 value are simultaneously transmitted along with RI or CQI, for example, RI may be reported through one subframe, and an indicator for the i1 value, an indicator for the i2 value and a CQI may be simultaneously reported through another subframe. In another example, RI and the indicator for i1 may be simultaneously reported through one subframe, and the indicator for i2 and a CQI may be simultaneously transmitted through another subframe.

The legacy 3GPP LTE Release-8 or Release-9 assumes transmission of a maximum of 2 bits for the RI. In case of RI transmission through a PUCCH, the same coding method as in ACK/NACK transmission may be used. In addition, it is assumed that a maximum of 11 bits is transmitted to report CQI/PMI, such that the coding may be carried out using a Reed-Muller (RM) code that is capable of supporting a maximum of 13 bits.

If it is assumed that the system (e.g., 3GPP LTE Release-10 system) supporting the extended antenna structure simultaneously reports i1, i2, and CQI (i1/i2/CQI), a maximum of 15 (=4+4+7) bits may be requisite for Rank-1 or Rank-2. To transmit 15 bits, the coding method for extending the legacy RM code may be used, or a control signal may be reported using the conventional convolution code. In addition, in order to implement the same level as that of maximum bits defined in the legacy system, a method for reducing the size of indicator bits for i1 and i2 may be used as necessary.

Table 24 shows numbers of bits needed to simultaneously report i1, i2 and CQI (i1/i2/CQI). If the indicator bits for i1 and i2 are set to 0~4, the number of bits transmitted in one subframe is shown in Table 24. In addition, according to the rank, the number of indicator bits for i1 or i2 may be a fullset or subset. For example, if the i1 indicator bit is set to 4 and the i2 indicator bit is set to 4, all the fullsets of a codebook may be used to transmit Rank-1 and Rank-2. Alternatively, in the case where 2 bits are used for i1 or (W1) and 4 bits are used for i2 (or W2), the subset of it may be used in Rank-1 or Rank-2, the fullset of i2 may be used, and all fullsets of i1 and i2 may be used in Rank-3. In Table 24, F may represent the fullset, and S may represent the subset. In addition, in association with each expression (F/F, F/S, S/F or S/S) of Table 21, a number located in front of a specific symbol (/) represents bits for i1 and another number located behind the symbol (/) represents bits for i2.

TABLE 24

| R | i1 | i2 | i1 + i2 + CQI | 1 | 2 | 3 | 4 | 5 | 6 | 7 | 8 |
|---|---|---|---|---|---|---|---|---|---|---|---|
| 1/ | 4 | 4 | 4 + 4 + 7 | F/F | F/F | — | — | — | — | — | — |
| 2/3 |   | 3 | 4 + 3 + 7 | F/S | F/S | — | — | — | — | — | — |
|   |   | 2 | 4 + 2 + 7 | F/S | F/S | — | — | — | — | — | — |
|   |   | 1 | 4 + 1 + 7 | F/S | F/S | — | — | — | — | — | — |
|   |   | 0 | 4 + 0 + 7 | F/S | F/S | — | — | — | — | — | — |
|   | 3 | 4 | 3 + 4 + 7 | S/F | S/F | — | — | — | — | — | — |
|   |   | 3 | 3 + 3 + 7 | S/S | S/S | — | — | — | — | — | — |
|   |   | 2 | 3 + 2 + 7 | S/S | S/S | — | — | — | — | — | — |
|   |   | 1 | 3 + 1 + 7 | S/S | S/S | — | — | — | — | — | — |
|   |   | 0 | 3 + 0 + 7 | S/S | S/S | — | — | — | — | — | — |
|   | 2 | 4 | 2 + 4 + 7 | S/F | S/F | F/F | — | — | — | — | — |
|   |   | 3 | 2 + 3 + 7 | S/S | S/S | F/S | F/F | — | — | — | — |
|   |   | 2 | 2 + 2 + 7 | S/S | S/S | F/S | F/S | — | — | — | — |
|   |   | 1 | 2 + 1 + 7 | S/S | S/S | F/S | F/S | — | — | — | — |
|   |   | 0 | 2 + 0 + 7 | S/S | S/S | F/S | F/S | F/F | F/F | F/F | — |
|   | 1 | 4 | 1 + 4 + 7 | S/F | S/F | S/F | — | — | — | — | — |
|   |   | 3 | 1 + 3 + 7 | S/S | S/S | S/F | S/F | — | — | — | — |
|   |   | 2 | 1 + 2 + 7 | S/S | S/S | S/S | S/S | — | — | — | — |
|   |   | 1 | 1 + 1 + 7 | S/S | S/S | S/S | S/S | — | — | — | — |
|   |   | 0 | 1 + 0 + 7 | S/S | S/S | S/S | S/S | S/F | S/F | S/F | — |
|   | 0 | 0 | 0 + 0 + 7 | S/S | S/S | S/S | S/S | S/S | S/S | S/S | F/F |

To apply the legacy coding method to PUCCH feedback transmission or to obtain an error rate similar to that of the conventional feedback channel, 13 bits or less may be transmitted within one subframe. In this case, when using a subset including only too small a number of codebook elements, the probability that the codebook element for expressing a CSI appropriate for an actual channel state is contained in the corresponding subset is gradually decreased, resulting in a reduction in transmission throughput. Therefore, the number of feedback bits must be reduced and a subset of an appropriate level must be used.

For example, for Rank-1 and Rank-2, a maximum of 4 bits may be requested for each of i1 and i2. The subset of an index in which '(bits for the it indicator/bits for the i2 indicator)' is set to any of (4/3), (4/2), (3/3), (3/2), (2/3), (2/2), etc. may be used as necessary.

In addition, the fullset or subset of index may be used according to rank. For example, in order to implement the level corresponding to a maximum of 11 bits, '2 bits/2 bits' may be used for i1 and i2 (i1/i2). In this case, '2 bits/2 bits' may be used at Ranks 1 to 4, '2 bits/0 bit' may be used at Ranks 5 to 7, and '0 bit/0 bit' may be used at Rank-8. Alternatively, in order to implement the level corresponding to a maximum of 13 bits, '3 bits/2 bits' may be used for i1 and i2 (i1/i2). In this case, '3 bits/2 bits' may be used at Ranks 1 and 2, '2 bits/4 bits' may be used at Rank-3, '2 bits/3 bits' may be used at Rank-4, '2 bits/0 bit' may be used at Ranks 5 to 7, and '0 bit/0 bit' may be used at Rank-8.

Table 25 shows exemplary bit numbers capable of being used for i1 and i2 (i1/i2) for each rank.

TABLE 25

| Rank | (i1/i2) |
|---|---|
| 1 | (4/2), (3/3), (3/2), (2/3), (2/2) |
| 2 | (4/2), (3/3), (3/2), (2/3), (2/2) |
| 3 | (2/4), (2/3), (2/2), (2/1), (2/0), (1/4), (1/3), (1/2), (1/1), (1/0) |
| 4 | (2/3), (2/2), (2/1), (2/0), (1/3), (1/2), (1/1) |
| 5 | (2/0) |
| 6 | (2/0) |
| 7 | (2/0) |
| 8 | (0/0) |

Table 26 shows preferable combination of number of bits of i1/i2 of Table 25.

TABLE 26

|  | Rank | | | | | | | |
|---|---|---|---|---|---|---|---|---|
|  | 1 | 2 | 3 | 4 | 5 | 6 | 7 | 8 |
| i1/i2 | 4/2 | 4/2 | 2/4 | 2/3 | 2/0 | 2/0 | 2/0 | 0/0 |
|  | 3/3 | 3/3 | 2/4 | 2/3 | 2/0 | 2/0 | 2/0 | 0/0 |
|  | 3/2 | 3/2 | 2/3 | 2/3 | 2/0 | 2/0 | 2/0 | 0/0 |
|  | 2/2 | 2/2 | 2/2 | 2/2 | 2/0 | 2/0 | 2/0 | 0/0 |

Table 27 shows bits required either when the RI and the i1 index are simultaneously transmitted within one subframe or when the i2 index and the CQI are simultaneously transmitted within another subframe.

TABLE 27

| RI | i1 | i2 | RI + i1 | i2 + CQI | 1 | 2 | 3 | 4 | 5 | 6 | 7 | 8 |
|---|---|---|---|---|---|---|---|---|---|---|---|---|
| 3 | 4 | 4 | 3 + 4 | 4 + 7 | F/F | F/F | — | — | — | — | — | — |
|   |   | 3 |   | 3 + 7 | F/S | F/S | — | — | — | — | — | — |
|   |   | 2 |   | 2 + 7 | F/S | F/S | — | — | — | — | — | — |
|   |   | 1 |   | 1 + 7 | F/S | F/S | — | — | — | — | — | — |
|   |   | 0 |   | 0 + 7 | F/S | F/S | — | — | — | — | — | — |
|   | 3 | 4 | 3 + 3 | 4 + 7 | S/F | S/F | — | — | — | — | — | — |
|   |   | 3 |   | 3 + 7 | S/S | S/S | — | — | — | — | — | — |
|   |   | 2 |   | 2 + 7 | S/S | S/S | — | — | — | — | — | — |
|   |   | 1 |   | 1 + 7 | S/S | S/S | — | — | — | — | — | — |
|   |   | 0 |   | 0 + 7 | S/S | S/S | — | — | — | — | — | — |
|   | 2 | 4 | 3 + 2 | 4 + 7 | S/F | S/F | F/F | — | — | — | — | — |
|   |   | 3 |   | 3 + 7 | S/S | S/S | F/S | F/F | — | — | — | — |
|   |   | 2 |   | 2 + 7 | S/S | S/S | F/S | F/S | — | — | — | — |
|   |   | 1 |   | 1 + 7 | S/S | S/S | F/S | F/S | — | — | — | — |
|   |   | 0 |   | 0 + 7 | S/S | S/S | F/S | F/S | F/F | F/F | F/F | — |
|   | 1 | 4 | 3 + 1 | 4 + 7 | S/F | S/F | S/F | — | — | — | — | — |
|   |   | 3 |   | 3 + 7 | S/S | S/S | S/F | S/F | — | — | — | — |
|   |   | 2 |   | 2 + 7 | S/S | S/S | S/S | S/S | — | — | — | — |
|   |   | 1 |   | 1 + 7 | S/S | S/S | S/S | S/S | — | — | — | — |
|   | 0 | 0 | 3 + 0 | 0 + 7 | S/S | S/S | S/S | S/S | S/F | S/F | S/F | — |
| 2 | 4 | 4 |   | 0 + 7 | S/S | S/S | S/S | S/S | S/S | S/S | S/S | F/F |
|   |   |   | 2 + 4 | 4 + 7 | F/F | F/F | — | — | — | — | — | — |
|   |   | 3 |   | 3 + 7 | F/S | F/S | — | — | — | — | — | — |
|   |   | 2 |   | 2 + 7 | F/S | F/S | — | — | — | — | — | — |
|   |   | 1 |   | 1 + 7 | F/S | F/S | — | — | — | — | — | — |
|   |   | 0 |   | 0 + 7 | F/S | F/S | — | — | — | — | — | — |
|   | 3 | 4 | 2 + 3 | 4 + 7 | S/F | S/F | — | — | — | — | — | — |
|   |   | 3 |   | 3 + 7 | S/S | S/S | — | — | — | — | — | — |
|   |   | 2 |   | 2 + 7 | S/S | S/S | — | — | — | — | — | — |
|   |   | 1 |   | 1 + 7 | S/S | S/S | — | — | — | — | — | — |
|   |   | 0 |   | 0 + 7 | S/S | S/S | — | — | — | — | — | — |
|   | 2 | 4 | 2 + 2 | 4 + 7 | S/F | S/F | F/F | — | — | — | — | — |
|   |   | 3 |   | 3 + 7 | S/S | S/S | F/S | F/F | — | — | — | — |
|   |   | 2 |   | 2 + 7 | S/S | S/S | F/S | F/S | — | — | — | — |
|   |   | 1 |   | 1 + 7 | S/S | S/S | F/S | F/S | — | — | — | — |
|   |   | 0 |   | 0 + 7 | S/S | S/S | F/S | F/S | — | — | — | — |

TABLE 27-continued

| RI | i1 | i2 | RI + i1 | i2 + CQI | Rank 1 | 2 | 3 | 4 | 5 | 6 | 7 | 8 |
|----|----|----|---------|----------|---|---|---|---|---|---|---|---|
|    | 1  | 4  | 2 + 1   | 4 + 7    | S/F | S/F | S/F | — | — | — | — | — |
|    |    | 3  |         | 3 + 7    | S/S | S/S | S/F | S/F | — | — | — | — |
|    |    | 2  |         | 2 + 7    | S/S | S/S | S/S | S/S | — | — | — | — |
|    |    | 1  |         | 1 + 7    | S/S | S/S | S/S | S/S | — | — | — | — |
|    |    | 0  |         | 0 + 7    | S/S | S/S | S/S | S/S | — | — | — | — |
|    | 0  | 0  | 2 + 0   | 0 + 7    | S/S | S/S | S/S | S/S | — | — | — | — |
| 1  | 4  | 4  | 1 + 4   | 4 + 7    | F/F | F/F | — | — | — | — | — | — |
|    |    | 3  |         | 3 + 7    | F/S | F/S | — | — | — | — | — | — |
|    |    | 2  |         | 2 + 7    | F/S | F/S | — | — | — | — | — | — |
|    |    | 1  |         | 1 + 7    | F/S | F/S | — | — | — | — | — | — |
|    |    | 0  |         | 0 + 7    | F/S | F/S | — | — | — | — | — | — |
|    | 3  | 4  | 1 + 3   | 4 + 7    | S/F | S/F | — | — | — | — | — | — |
|    |    | 3  |         | 3 + 7    | S/S | S/S | — | — | — | — | — | — |
|    |    | 2  |         | 2 + 7    | S/S | S/S | — | — | — | — | — | — |
|    |    | 1  |         | 1 + 7    | S/S | S/S | — | — | — | — | — | — |
|    |    | 0  |         | 0 + 7    | S/S | S/S | — | — | — | — | — | — |
|    | 2  | 4  | 1 + 2   | 4 + 7    | S/F | S/F | — | — | — | — | — | — |
|    |    | 3  |         | 3 + 7    | S/S | S/S | — | — | — | — | — | — |
|    |    | 2  |         | 2 + 7    | S/S | S/S | — | — | — | — | — | — |
|    |    | 1  |         | 1 + 7    | S/S | S/S | — | — | — | — | — | — |
|    |    | 0  |         | 0 + 7    | S/S | S/S | — | — | — | — | — | — |
|    | 1  | 4  | 1 + 1   | 4 + 7    | S/F | S/F | — | — | — | — | — | — |
|    |    | 3  |         | 3 + 7    | S/S | S/S | — | — | — | — | — | — |
|    |    | 2  |         | 2 + 7    | S/S | S/S | — | — | — | — | — | — |
|    |    | 1  |         | 1 + 7    | S/S | S/S | — | — | — | — | — | — |
|    |    | 0  |         | 0 + 7    | S/S | S/S | — | — | — | — | — | — |
|    | 0  | 0  | 1 + 0   | 0 + 7    | S/S | S/S | — | — | — | — | — | — |

If the maximum number of Ranks reported by a UE is determined according to either a maximum rank capable of being received at the UE or a maximum rank to be transmitted from an eNB, a bit for Rank indication may be determined. Provided that RI and i1 are combined and simultaneously transmitted, a maximum number of bits requisite for feedback may be 7 (=3+4) bits, and a minimum number of bits may be 5 (=1+4) bits.

Rank information is basically used to select/calculate other feedback information, such that it is necessary to robustly transmit the rank information. Thus, it is preferable that the number of bits contained in a subframe corresponding to rank transmission be reduced as much as possible. For such transmission, a method for reducing the number of bits of the i1 indicator may be used as necessary. Considering the above-mentioned condition, Table 28 exemplarily shows bit numbers capable of being used for i1 and i2 (i1/i2) for each rank.

TABLE 28

| Rank | (i1/i2) |
|------|---------|
| 1 | (3/4), (3/3), (3/2), (2/4), (2/3), (2/2) |
| 2 | (3/4), (3/3), (3/2), (2/4), (2/3), (2/2) |
| 3 | (2/4), (2/3), (2/2), (2/1), (2/0), (1/4), (1/3), (1/2), (1/1), (1/0) |
| 4 | (2/3), (2/2), (2/1), (2/0), (1/3), (1/2), (1/1) |
| 5 | (2/0), (1/0) |
| 6 | (2/0), (1/0) |
| 7 | (2/0), (1/0) |
| 8 | (0/0) |

In case of setting the subset of the i1/i2 indicators, for example, the i1 and i2 subsets may be designed to have different sizes according to a preferred rank. In another example, the i1 and i2 subsets may be designed to have different sizes according to UE category. The UE category may be classified according to UE capability.

Embodiment 5

A method for setting the codebook subset through different precoder indexes (i1/i2) according to the present invention will hereinafter be described in detail.

Table 29 shows another example of a codebook appropriate for Rank-1 CSI reporting shown in Table 11. A Rank-1 codeword may be configured on the basis of a 4 Tx DFT vector ($v_m$), and may be represented by a combination of the 4Tx DFT vector ($v_m$) and a phase ($\phi_n$). If the i1 index is defined as 0 to 15 and the i2 index is defined as 0 to 15, the codebook may be configured by both $v_m$ having a 32PSK (Phase Shift Keying) phase and $\phi_n$ having a QPSK (Quadrature PSK) phase. In this case, the same element may be repeated between contiguous indexes of the i1 value.

TABLE 29

| i1 | i2 0 | 1 | 2 | 3 | 4 | 5 | 6 | 7 |
|----|------|---|---|---|---|---|---|---|
| 0 | V0 | V0 | V0 | V0 | V1 | V1 | V1 | V1 |
|   | V0 | jV0 | −V0 | −jV0 | V1 | jV1 | −V1 | −jV1 |
| 1 | V2 | V2 | V2 | V2 | V3 | V3 | V3 | V3 |
|   | V2 | jV2 | −V2 | −jV2 | V3 | jV3 | −V3 | −jV3 |
| 2 | V4 | V4 | V4 | V4 | V5 | V5 | V5 | V5 |
|   | V4 | jV4 | −V4 | −jV4 | V5 | jV5 | −V5 | −jV5 |
| 3 | V6 | V6 | V6 | V6 | V7 | V7 | V7 | V7 |
|   | V6 | jV6 | −V6 | −jV6 | V7 | jV7 | −V7 | −jV7 |
| 4 | V8 | V8 | V8 | V8 | V9 | V9 | V9 | V9 |
|   | V8 | jV8 | −V8 | −jV8 | V9 | jV9 | −V9 | −jV9 |
| 5 | V10 | V10 | V10 | V10 | V11 | V11 | V11 | V11 |
|   | V10 | jV10 | −V10 | −jV10 | V11 | jV11 | −V11 | −jV11 |
| 6 | V12 | V12 | V12 | V12 | V13 | V13 | V13 | V13 |
|   | V12 | jV12 | −V12 | −jV12 | V13 | jV13 | −V13 | −jV13 |
| 7 | V14 | V14 | V14 | V14 | V15 | V15 | V15 | V15 |
|   | V14 | jV14 | −V14 | −jV14 | V15 | jV15 | −V15 | −jV15 |
| 8 | V16 | V16 | V16 | V16 | V17 | V17 | V17 | V17 |
|   | V16 | jV16 | −V16 | −jV16 | V17 | jV17 | −V17 | −jV17 |
| 9 | V18 | V18 | V18 | V18 | V19 | V19 | V19 | V19 |
|   | V18 | jV18 | −V18 | −jV18 | V19 | jV19 | −V19 | −jV19 |
| 10 | V20 | V20 | V20 | V20 | V21 | V21 | V21 | V21 |
|    | V20 | jV20 | −V20 | −jV20 | V21 | jV21 | −V21 | −jV21 |
| 11 | V22 | V22 | V22 | V22 | V23 | V23 | V23 | V23 |
|    | V22 | jV22 | −V22 | −jV22 | V23 | jV23 | −V23 | −jV23 |
| 12 | V24 | V24 | V24 | V24 | V25 | V25 | V25 | V25 |
|    | V24 | jV24 | −V24 | −jV24 | V25 | jV25 | −V25 | −jV25 |
| 13 | V26 | V26 | V26 | V26 | V27 | V27 | V27 | V27 |
|    | V26 | jV26 | −V26 | −jV26 | V27 | jV27 | −V27 | −jV27 |
| 14 | V28 | V28 | V28 | V28 | V29 | V29 | V29 | V29 |
|    | V28 | jV28 | −V28 | −jV28 | V29 | jV29 | −V29 | −jV29 |
| 15 | V30 | V30 | V30 | V30 | V31 | V31 | V31 | V31 |
|    | V30 | jV30 | −V30 | −jV30 | V31 | jV31 | −V31 | −jV31 |

| i1 | i2 8 | 9 | 10 | 11 | 12 | 13 | 14 | 15 |
|----|------|---|----|----|----|----|----|----|
| 0 | V2 | V2 | V2 | V2 | V3 | V3 | V3 | V3 |
|   | V2 | jV2 | −V2 | −jV2 | V3 | jV3 | −V3 | −jV3 |
| 1 | V4 | V4 | V4 | V4 | V5 | V5 | V5 | V5 |
|   | V4 | jV4 | −V4 | −jV4 | V5 | jV5 | −V5 | −jV5 |
| 2 | V6 | V6 | V6 | V6 | V7 | V7 | V7 | V7 |
|   | V6 | jV6 | −V6 | −jV6 | V7 | jV7 | −V7 | −jV7 |
| 3 | V8 | V8 | V8 | V8 | V9 | V9 | V9 | V9 |
|   | V8 | jV8 | −V8 | −jV8 | V9 | jV9 | −V9 | −jV9 |
| 4 | V10 | V10 | V10 | V10 | V11 | V11 | V11 | V11 |
|   | V10 | jV10 | −V10 | −jV10 | V11 | jV11 | −V11 | −jV11 |
| 5 | V12 | V12 | V12 | V12 | V13 | V13 | V13 | V13 |
|   | V12 | jV12 | −V12 | −jV12 | V13 | jV13 | −V13 | −jV13 |
| 6 | V14 | V14 | V14 | V14 | V15 | V15 | V15 | V15 |
|   | V14 | jV14 | −V14 | −jV14 | V15 | jV15 | −V15 | −jV15 |
| 7 | V16 | V16 | V16 | V16 | V17 | V17 | V17 | V17 |
|   | V16 | jV16 | −V16 | −jV16 | V17 | jV17 | −V17 | −jV17 |
| 8 | V18 | V18 | V18 | V18 | V19 | V19 | V19 | V19 |
|   | V18 | jV18 | −V18 | −jV18 | V19 | jV19 | −V19 | −jV19 |
| 9 | V20 | V20 | V20 | V20 | V21 | V21 | V21 | V21 |
|   | V20 | jV20 | −V20 | −jV20 | V21 | jV21 | −V21 | −jV21 |
| 10 | V22 | V22 | V22 | V22 | V23 | V23 | V23 | V23 |
|    | V22 | jV22 | −V22 | −jV22 | V23 | jV23 | −V23 | −jV23 |
| 11 | V24 | V24 | V24 | V24 | V25 | V25 | V25 | V25 |
|    | V24 | jV24 | −V24 | −jV24 | V25 | jV25 | −V25 | −jV25 |
| 12 | V26 | V26 | V26 | V26 | V27 | V27 | V27 | V27 |

TABLE 29-continued

|    | V26 | jV26 | -V26 | -jV26 | V27 | jV27 | -V27 | -jV27 |
|----|-----|------|------|-------|-----|------|------|-------|
| 13 | V28 | V28  | V28  | V28   | V29 | V29  | V29  | V29   |
|    | V28 | jV28 | -V28 | -jV28 | V29 | jV29 | -V29 | -jV29 |
| 14 | V30 | V30  | V30  | V30   | V31 | V31  | V31  | V31   |
|    | V30 | jV30 | -V30 | -jV30 | V31 | jV31 | -V31 | -jV31 |
| 15 | V0  | V0   | V0   | V0    | V1  | V1   | V1   | V1    |
|    | V0  | jV0  | -V0  | -jV0  | V1  | jV1  | -V1  | -jV1  |

Accordingly, in order to configure the subset of a codebook, a method for limiting a phase of a DFT matrix constructing the vector of $v_m$ or the phase of $\phi_n$, and a method for constructing the i1 value using different codebook elements at different i1 indexes of codebook elements contained in one i1 value may be considered. In this way, the codebook subset may be constructed.

According to whether the i1 or i2 subset is used, DFT vector of $v_m$ and a phase of $\phi_n$ may be determined. For example, it is assumed that, in order to indicate the i1 value, 3 bits may be used and 8 even indexes (0, 2, 4, 6, 8, 10, 12, 14) may be used. It is also assumed that, in order to indicate the i1 value, 3 bits may be used and 8 indexes (0, 1, 2, 3, 8, 9, 10, 11) may be used. Under these assumptions, a 4Tx DFT vector having a 16PSK phase for the $v_m$ value and a QPSK for the phase ($\phi_n$) may be configured.

As described above, when deciding the indication bit for the i1 value and the indication bit for the i2 value, one phase of the 4Tx DFT vector for constructing the $v_m$ value and the other phase for constructing the phase ($\phi_n$) according to a combination of indexes appropriate for individual bits may be represented by the following table 30.

TABLE 30

| Bit for i1 (elements number) | Bit for i2 (elements number) | $v_m$ | $\phi_n$ |
|---|---|---|---|
| 1  2 (4n, n: 0~3) | 1 (0, 1) | QPSK | {1, j} |
| 2  2 (4n, n: 0~3) | 1 (0, 2) | QPSK | BPSK |
| 3  2 (4n, n: 0~3) | 2 (0~3) | QPSK | QPSK |
| 4  2 (4n, n: 0~3) | 2 (2m, m: 0~3) | QPSK + QPSK (2pi/32) | BPSK |
| 5  2 (4n, n: 0~3) | 3 (0~7) | QPSK + QPSK (2pi/32) | QPSK |
| 6  2 (4n, n: 0~3) | 3 (0~3, 8~11) | QPSK + QPSK (2 × 2pi/32) | QPSK |
| 7  2 (4n, n: 0~3) | 3 (2m, m: 0~7) | QPSK + QPSK (2pi/32) + QPSK (2 × 3pi/32) | BPSK |
| 8  2 (4n, n: 0~3) | 4 (0~15) | QPSK + QPSK (2pi/32) + QPSK (2 × 2pi/32) + QPSK (2 × 3pi/32) | QPSK |
| 9  3 (2n, n: 0~7) | 1 (0, 1) | 8 PSK | {1, j} |
| 10 3 (2n, n: 0~7) | 1 (0, 2) | 8 PSK | BPSK |
| 11 3 (2n, n: 0~7) | 2 (0~3) | 8 PSK | QPSK |
| 12 3 (2n, n: 0~7) | 2 (2m, m: 0~3) | 8 PSK + 8 PSK (2pi/32) | BPSK |
| 13 3 (2n, n: 0~7) | 3 (0~7) | 8 PSK + 8 PSK (2pi/32) | QPSK |
| 14 3 (2n, n: 0~7) | 3 (0~3, 8~11) | 16 PSK | QPSK |
| 15 3 (2n, n: 0~7) | 3 (2m, m: 0~7) | 32 PSK | BPSK |
| 16 3 (2n, n: 0~7) | 4 (0~15) | 32 PSK | QPSK |
| 17 4 (0~15) | 1 (0, 1) | 16 PSK | {1, j} |
| 18 4 (0~15) | 1 (0, 2) | 16 PSK | BPSK |
| 19 4 (0~15) | 2 (0~3) | 16 PSK | QPSK |
| 20 4 (0~15) | 2 (2m, m: 0~3) | 32 PSK | BPSK |
| 21 4 (0~15) | 3 (0~7) | 32 PSK | QPSK |
| 22 4 (0~15) | 3 (0~3, 8~11) | 16 PSK (Overraped) | QPSK |
| 23 4 (0~15) | 3 (2m, m: 0~7) | 32 PSK (Overraped) | BPSK |
| 24 4 (0~15) | 4 (0~15) | 32 PSK (Overraped) | QPSK |

Table 31 shows another example of a codebook appropriate for Rank-2 CSI reporting shown in Table 12. In the Rank-2 CSI report, 16 indexes (0 to 15) are defined for each of the i1 and i2 values.

TABLE 31

|    |     | i2 |     |     |     |     |     |     |     |
|----|-----|------|------|------|------|------|------|------|------|
|    |     | 0   |     | 1   |     | 2   |     | 3   |     |
|    |     | 1st | 2nd | 1st | 2nd | 1st | 2nd | 1st | 2nd |
| i1 |     | 0   | 2   | 1   | 3   | 4   | 6   | 5   | 7   |
| 0  | V0  | V0  | V0  | V0  | V1  | V1  | V1  | V1  |
|    | V0  | -V0 | jV0 | -jV0| V1  | -V1 | jV1 | -jV1|
| 1  | V2  | V2  | V2  | V2  | V3  | V3  | V3  | V3  |
|    | V2  | -V2 | jV2 | -jV2| V3  | -V3 | jV3 | -jV3|
| 2  | V4  | V4  | V4  | V4  | V5  | V5  | V5  | V5  |
|    | V4  | -V4 | jV4 | -j V4| V5 | -V5 | jV5 | -j V5|
| 3  | V6  | V6  | V6  | V6  | V7  | V7  | V7  | V7  |
|    | V6  | -V6 | jV6 | -j V6| V7 | -V7 | jV7 | -j V7|
| 4  | V8  | V8  | V8  | V8  | V9  | V9  | V9  | V9  |
|    | V8  | -V8 | jV8 | -j V8| V9 | -V9 | jV9 | -j V9|
| 5  | V10 | V10 | V10 | V10 | V11 | V11 | V11 | V11 |
|    | V10 | -V10| jV10| -j V10| V11| -V11| jV11| -j V11|
| 6  | V12 | V12 | V12 | V12 | V13 | V13 | V13 | V13 |
|    | V12 | -V12| jV12| -j V12| V13| -V13| jV13| -j V13|
| 7  | V14 | V14 | V14 | V14 | V15 | V15 | V15 | V15 |
|    | V14 | -V14| jV14| -j V14| V15| -V15| jV15| -j V15|
| 8  | V16 | V16 | V16 | V16 | V17 | V17 | V17 | V17 |
|    | V16 | -V16| jV16| -j V16| V17| -V17| jV17| -j V17|
| 9  | V18 | V18 | V18 | V18 | V19 | V19 | V19 | V19 |
|    | V18 | -V18| jV18| -j V18| V19| -V19| jV19| -j V19|
| 10 | V20 | V20 | V20 | V20 | V21 | V21 | V21 | V21 |
|    | V20 | -V20| jV20| -j V20| V21| -V21| jV21| -j V21|
| 11 | V22 | V22 | V22 | V22 | V23 | V23 | V23 | V23 |
|    | V22 | -V22| jV22| -j V22| V23| -V23| jV23| -j V23|
| 12 | V24 | V24 | V24 | V24 | V25 | V25 | V25 | V25 |
|    | V24 | -V24| jV24| -j V24| V25| -V25| jV25| -j V25|
| 13 | V26 | V26 | V26 | V26 | V27 | V27 | V27 | V27 |
|    | V26 | -V26| jV26| -j V26| V27| -V27| jV27| -j V27|
| 14 | V28 | V28 | V28 | V28 | V29 | V29 | V29 | V29 |
|    | V28 | -V28| jV28| -j V28| V29| -V29| jV29| -j V29|
| 15 | V30 | V30 | V30 | V30 | V31 | V31 | V31 | V31 |
|    | V30 | -V30| jV30| -j V30| V31| -V31| jV31| -j V31|

|    |     | i2 |     |     |     |     |     |     |     |
|----|-----|------|------|------|------|------|------|------|------|
|    |     | 4   |     | 5   |     | 6   |     | 7   |     |
|    |     | 1st | 2nd | 1st | 2nd | 1st | 2nd | 1st | 2nd |
| i1 |     | 8   | 10  | 9   | 11  | 12  | 14  | 13  | 15  |
| 0  | V2  | V2  | V2  | V2  | V3  | V3  | V3  | V3  |
|    | V2  | -V2 | jV2 | -jV2| V3  | -V3 | jV3 | -jV3|
| 1  | V4  | V4  | V4  | V4  | V5  | V5  | V5  | V5  |
|    | V4  | -V4 | jV4 | -j V4| V5 | -V5 | jV5 | -j V5|
| 2  | V6  | V6  | V6  | V6  | V7  | V7  | V7  | V7  |
|    | V6  | -V6 | jV6 | -j V6| V7 | -V7 | jV7 | -j V7|
| 3  | V8  | V8  | V8  | V8  | V9  | V9  | V9  | V9  |
|    | V8  | -V8 | jV8 | -j V8| V9 | -V9 | jV9 | -j V9|
| 4  | V10 | V10 | V10 | V10 | V11 | V11 | V11 | V11 |
|    | V10 | -V10| jV10| -j V10| V11| -V11| jV11| -j V11|
| 5  | V12 | V12 | V12 | V12 | V13 | V13 | V13 | V13 |
|    | V12 | -V12| jV12| -j V12| V13| -V13| jV13| -j V13|
| 6  | V14 | V14 | V14 | V14 | V15 | V15 | V15 | V15 |
|    | V14 | -V14| jV14| -j V14| V15| -V15| jV15| -j V15|
| 7  | V16 | V16 | V16 | V16 | V17 | V17 | V17 | V17 |
|    | V16 | -V16| jV16| -j V16| V17| -V17| jV17| -j V17|
| 8  | V18 | V18 | V18 | V18 | V19 | V19 | V19 | V19 |
|    | V18 | -V18| jV18| -j V18| V19| -V19| jV19| -j V19|
| 9  | V20 | V20 | V20 | V20 | V21 | V21 | V21 | V21 |
|    | V20 | -V20| jV20| -j V20| V21| -V21| jV21| -j V21|
| 10 | V22 | V22 | V22 | V22 | V23 | V23 | V23 | V23 |
|    | V22 | -V22| jV22| -j V22| V23| -V23| jV23| -j V23|
| 11 | V24 | V24 | V24 | V24 | V25 | V25 | V25 | V25 |
|    | V24 | -V24| jV24| -j V24| V25| -V25| jV25| -j V25|
| 12 | V26 | V26 | V26 | V26 | V27 | V27 | V27 | V27 |
|    | V26 | -V26| jV26| -j V26| V27| -V27| jV27| -j V27|

TABLE 31-continued

| | | | | | | | | |
|---|---|---|---|---|---|---|---|---|
| 13 | V28 | V28 | V28 | V28 | V29 | V29 | V29 | V29 |
| | V28 | −V28 | jV28 | −j V28 | V29 | −V29 | jV29 | −j V29 |
| 14 | V30 | V30 | V30 | V30 | V31 | V31 | V31 | V31 |
| | V30 | −V30 | jV30 | −j V30 | V31 | −V31 | jV31 | −j V31 |
| 15 | V0 | V0 | V0 | V0 | V1 | V1 | V1 | V1 |
| | V0 | −V0 | jV0 | −jV0 | V1 | −V1 | jV1 | −jV1 |

| | i2 | | | | | | | |
|---|---|---|---|---|---|---|---|---|
| | 8 | | 9 | | 10 | | 11 | |
| | $1^{st}$ | $2^{nd}$ | $1^{st}$ | $2^{nd}$ | $1^{st}$ | $2^{nd}$ | $1^{st}$ | $2^{nd}$ |
| i1 | 0 | 6 | 1 | 7 | 4 | 10 | 5 | 9 |
| 0 | V0 | V1 | V0 | V1 | V1 | V2 | V1 | V2 |
| | V0 | −V1 | jV0 | −jV1 | V1 | −V2 | jV1 | −jV2 |
| 1 | V2 | V3 | V2 | V3 | V3 | V4 | V3 | V4 |
| | V2 | −V3 | jV2 | −jV3 | V3 | −V4 | jV3 | −j V4 |
| 2 | V4 | V5 | V4 | V5 | V5 | V6 | V5 | V6 |
| | V4 | −V5 | jV4 | −j V5 | V5 | −V6 | jV5 | −j V6 |
| 3 | V6 | V7 | V6 | V7 | V7 | V8 | V7 | V8 |
| | V6 | −V7 | jV6 | −j V7 | V7 | −V8 | jV7 | −j V8 |
| 4 | V8 | V9 | V8 | V9 | V9 | V10 | V9 | V10 |
| | V8 | −V9 | jV8 | −j V9 | V9 | −V10 | jV9 | −j V10 |
| 5 | V10 | V11 | V10 | V11 | V11 | V12 | V11 | V12 |
| | V10 | −V11 | jV10 | −j V11 | V11 | −V12 | jV11 | −j V12 |
| 6 | V12 | V13 | V12 | V13 | V13 | V14 | V13 | V14 |
| | V12 | −V13 | jV12 | −j V13 | V13 | −V14 | jV13 | −j V14 |
| 7 | V14 | V15 | V14 | V15 | V15 | V16 | V15 | V16 |
| | V14 | −V15 | jV14 | −j V15 | V15 | −V16 | jV15 | −j V16 |
| 8 | V16 | V17 | V16 | V17 | V17 | V18 | V17 | V18 |
| | V16 | −V17 | jV16 | −j V17 | V17 | −V18 | jV17 | −j V18 |
| 9 | V18 | V19 | V18 | V19 | V19 | V20 | V19 | V20 |
| | V18 | −V19 | jV18 | −j V19 | V19 | −V20 | jV19 | −j V20 |
| 10 | V20 | V21 | V20 | V21 | V21 | V22 | V21 | V22 |
| | V20 | −V21 | jV20 | −j V21 | V21 | −V22 | jV21 | −j V22 |
| 11 | V22 | V23 | V22 | V23 | V23 | V24 | V23 | V24 |
| | V22 | −V23 | jV22 | −j V23 | V23 | −V24 | jV23 | −j V24 |
| 12 | V24 | V25 | V24 | V25 | V25 | V26 | V25 | V26 |
| | V24 | −V25 | jV24 | −j V25 | V25 | −V26 | jV25 | −j V26 |
| 13 | V26 | V27 | V26 | V27 | V27 | V28 | V27 | V28 |
| | V26 | −V27 | jV26 | −j V27 | V27 | −V28 | jV27 | −j V28 |
| 14 | V28 | V29 | V28 | V29 | V29 | V30 | V29 | V30 |
| | V28 | −V29 | jV28 | −j V29 | V29 | −V30 | jV29 | −j V30 |
| 15 | V30 | V31 | V30 | V31 | V31 | V0 | V31 | V0 |
| | V30 | −V31 | jV30 | −j V31 | V31 | −V0 | jV31 | −jV0 |

TABLE 31-continued

| | i2 | | | | | | | |
|---|---|---|---|---|---|---|---|---|
| | 12 | | 13 | | 14 | | 15 | |
| | $1^{st}$ | $2^{nd}$ | $1^{st}$ | $2^{nd}$ | $1^{st}$ | $2^{nd}$ | $1^{st}$ | $2^{nd}$ |
| i1 | 0 | 14 | 1 | 13 | 4 | 14 | 5 | 15 |
| 0 | V0 | V3 | V0 | V3 | V1 | V3 | V1 | V3 |
| | V0 | −V3 | jV0 | −jV3 | V1 | −V3 | jV1 | −jV3 |
| 1 | V2 | V5 | V2 | V5 | V3 | V5 | V3 | V5 |
| | V2 | −V5 | jV2 | −j V5 | V3 | −V5 | jV3 | −j V5 |
| 2 | V4 | V7 | V4 | V7 | V5 | V7 | V5 | V7 |
| | V4 | −V7 | jV4 | −j V7 | V5 | −V7 | jV5 | −j V7 |
| 3 | V6 | V9 | V6 | V9 | V7 | V9 | V7 | V9 |
| | V6 | −V9 | jV6 | −j V9 | V7 | −V9 | jV7 | −j V9 |
| 4 | V8 | V11 | V8 | V11 | V9 | V11 | V9 | V11 |
| | V8 | −V11 | jV8 | −j V11 | V9 | −V11 | jV9 | −j V11 |
| 5 | V10 | V13 | V10 | V13 | V11 | V13 | V11 | V13 |
| | V10 | −V13 | jV10 | −j V13 | V11 | −V13 | jV11 | −j V13 |
| 6 | V12 | V15 | V12 | V15 | V13 | V15 | V13 | V15 |
| | V12 | −V15 | jV12 | −j V15 | V13 | −V15 | jV13 | −j V15 |
| 7 | V14 | V17 | V14 | V17 | V15 | V17 | V15 | V17 |
| | V14 | −V17 | jV14 | −j V17 | V15 | −V17 | jV15 | −j V17 |
| 8 | V16 | V19 | V16 | V19 | V17 | V19 | V17 | V19 |
| | V16 | −V19 | jV16 | −j V19 | V17 | −V19 | jV17 | −j V19 |
| 9 | V18 | V21 | V18 | V21 | V19 | V21 | V19 | V21 |
| | V18 | −V21 | jV18 | −j V21 | V19 | −V21 | jV19 | −j V21 |
| 10 | V20 | V23 | V20 | V23 | V21 | V23 | V21 | V23 |
| | V20 | −V23 | jV20 | −j V23 | V21 | −V23 | jV21 | −j V23 |
| 11 | V22 | V25 | V22 | V25 | V23 | V25 | V23 | V25 |
| | V22 | −V25 | jV22 | −j V25 | V23 | −V25 | jV23 | −j V25 |
| 12 | V24 | V27 | V24 | V27 | V25 | V27 | V25 | V27 |
| | V24 | −V27 | jV24 | −j V27 | V25 | −V27 | jV25 | −j V27 |
| 13 | V26 | V29 | V26 | V29 | V27 | V29 | V27 | V29 |
| | V26 | −V29 | jV26 | −j V29 | V27 | −V29 | jV27 | −j V29 |
| 14 | V28 | V31 | V28 | V31 | V29 | V31 | V29 | V31 |
| | V28 | −V31 | jV28 | −j V31 | V29 | −V31 | jV29 | −j V31 |
| 15 | V30 | V1 | V30 | V1 | V31 | V1 | V31 | V1 |
| | V30 | −V1 | jV30 | −jV1 | V31 | −V1 | jV31 | −jV1 |

When the indication bit for the i1 value and the indication bit for the i2 value are decided in the codebook subset configuration, a phase of the 4Tx DFT vector constructing the $v_m$ value and a phase of $\phi_n$ according to a combination of indexes appropriate for each bit may be represented by Table 30.

The DFT vector of $v_m$ and the phase of q are determined according to whether the i1 or i2 subset is used. As shown in Table 31, when deciding the indication bit for the i1 value and the indication bit for the i2 value, one phase of the 4Tx DFT vector for constructing the $v_m$ value and the other phase for constructing the phase ($\phi_n$) according to a combination of indexes appropriate for each bit may be represented by the following table 32.

TABLE 32

| | Bit for i1 (elements number) | Bit for i2 (elements number) | $v_m$ | $\phi_n$ |
|---|---|---|---|---|
| 1 | 2 (4n, n: 0~3) | 1 (0, 1) | QPSK + QPSK (2pi/32) | QPSK |
| 2 | 2 (4n, n: 0~3) | 1 (0, 2) | QPSK + QPSK (2pi/32) | BPSK |
| 3 | 2 (4n, n: 0~3) | 2 (0~3) | QPSK + QPSK (2pi/32) | QPSK |
| 4 | 2 (4n, n: 0~3) | 2 (0, 1, 4, 5) | QPSK + QPSK (2 × 2pi/32) | QPSK |
| 5 | 2 (4n, n: 0~3) | 2 (2m, m: 0~3) | QPSK + QPSK (2pi/32) + QPSK (2 × 2pi/32) + QPSK (2 × 3pi/32) | BPSK |
| 6 | 2 (4n, n: 0~3) | 2 (2m + 8, m: 0~3) | QPSK + QPSK (2pi/32) + QPSK (2 × 2pi/32) + QPSK (2 × 3pi/32) | BPSK |
| 7 | 2 (4n, n: 0~3) | 3 (0~7) | QPSK + QPSK (2pi/32) + QPSK (2 × 2pi/32) + QPSK (2 × 3pi/32) | QPSK |

TABLE 32-continued

| | Bit for i1 (elements number) | Bit for i2 (elements number) | $v_m$ | $\phi_n$ |
|---|---|---|---|---|
| 8 | 2 (4n, n: 0~3) | 3 (8~15) | QPSK + QPSK (2pi/32) + QPSK (2 × 2pi/32) + QPSK (2 × 3pi/32) | QPSK |
| 9 | 2 (4n, n: 0~3) | 3 (2m, m: 0~7) | QPSK + QPSK (2pi/32) + QPSK (2 × 2pi/32) + QPSK (2 × 3pi/32) | BPSK |
| 10 | 2 (4n, n: 0~3) | 4 (0~15) | QPSK + QPSK (2pi/32) + QPSK (2 × 2pi/32) + QPSK (2 × 3pi/32) | QPSK |
| 11 | 3 (2n, n: 0~7) | 1 (0, 1) | 8 PSK | QPSK |
| 12 | 3 (2n, n: 0~7) | 1 (0, 2) | 16 PSK | BPSK |
| 13 | 3 (2n, n: 0~7) | 1 (8, 9) | 8 PSK | QPSK |
| 14 | 3 (2n, n: 0~7) | 1 (8, 10) | 16 PSK | BPSK |
| 15 | 3 (2n, n: 0~7) | 2 (0~3) | 8 PSK + 8PSK (2pi/32) | QPSK |
| 16 | 3 (2n, n: 0~7) | 2 (0, 1, 4, 5) | 16 PSK | QPSK |
| 17 | 3 (2n, n: 0~7) | 2 (2m, m: 0~3) | 32 PSK | BPSK |
| 18 | 3 (2n, n: 0~7) | 2 (2m + 8, m: 0~3) | 32 PSK | BPSK |
| 19 | 3 (2n, n: 0~7) | 3 (0~7) | 32 PSK | QPSK |
| 20 | 3 (2n, n: 0~7) | 3 (8~15) | 32 PSK | QPSK |
| 21 | 3 (2n, n: 0~7) | 3 (2m, m: 0~7) | 32 PSK | BPSK |
| 22 | 3 (2n, n: 0~7) | 4 (0~15) | 32 PSK | QPSK |
| 23 | 4 (0~15) | 1 (0, 1) | 16 PSK | QPSK |
| 24 | 4 (0~15) | 1 (0, 2) | 32 PSK | BPSK |
| 25 | 4 (0~15) | 2 (0~3) | 32 PSK | QPSK |
| 26 | 4 (0~15) | 2 (0, 1, 4, 5) | 16 PSK (Overraped) | QPSK |
| 27 | 4 (0~15) | 2 (2m, m: 0~3) | 32 PSK | BPSK |
| 28 | 4 (0~15) | 2 (2m + 8, m: 0~3) | 32 PSK | BPSK |
| 29 | 4 (0~15) | 3 (0~7) | 32 PSK (Overraped) | QPSK |
| 30 | 4 (0~15) | 3 (8~15) | 32 PSK | QPSK |
| 31 | 4 (0~15) | 3 (2m, m: 0~7) | 32 PSK (Overraped) | QPSK |
| 32 | 4 (0~15) | 4 (0~15) | 32 PSK (Overraped) | QPSK |
| 33 | 4 (0~15) | 2 (8, 9, 10, 11) | | |
| 34 | 4 (0~15) | 2 (0, 1, 8, 9) | | |
| 35 | 4 (0~15) | 2 (0, 2, 9, 10) | | |
| 36 | 4 (0~15) | 2 (8, 10, 12, 14) | | |

Similar to the above-mentioned scheme, a method for selecting the subset of a codebook denoted by 'i1/i2' may be applied to the codebooks appropriate for Rank-3 to Rank-8 of Tables 13 to 18.

For example, the i2 value of the Rank-3 codebook of Table 13 may be composed of 16 elements (0~15), and may be composed of a matrix that generates three orthogonal beams using two vectors. Four types of Rank-3 codebooks may be configured using two vectors.

For example, if i2 is composed of 0, 1, 2 and 3, four Rank-3 codebooks (Type-A, Type-B, Type-C and Type-D) may be used, and a detailed description thereof will hereinafter be described in detail.

In case of Type-A, a $1^{st}$ column is composed of $W_{8i_1}^{(3)}$ with a positive (+) co-phase, a $2^{nd}$ column is composed of $W_{8i_1}^{(3)}$ with a negative (−) co-phase, and a $3^{rd}$ column is composed of $W_{8i_1+8}^{(3)}$ with a negative (−) co-phase. [A: $1^{st}$ col ($W_{8i_1}^{(3)}$ with (+) co-phase), $2^{nd}$ col ($W_{8i_1}^{(3)}$ with (−) co-phase), and $3^{rd}$ col ($W_{8i_1+8}^{(3)}$ with (−) co-phase)].

In case of Type-B, a $1^{st}$ column is composed of $W_{8i_1+8}^{(3)}$ with a positive (+) co-phase, a $2^{nd}$ column is composed of $W_{8i_1}^{(3)}$ with a negative (−) co-phase, and a $3^{rd}$ column is composed of $W_{8i_1+8}^{(3)}$ with a negative (−) co-phase. [B: $1^{st}$ col ($W_{8i_1+8}^{(3)}$ with (+) co-phase), $2^{nd}$ col ($W_{8i_1}^{(3)}$ with (−) co-phase), $3^{rd}$ col ($W_{8i_1+8}^{(3)}$ with (−) co-phase)].

In case of Type-C, a $1^{st}$ column is composed of H with a positive (+) co-phase, a $2^{nd}$ column is composed of $W_{8i_1+8}^{(3)}$ with a positive (+) co-phase, and a $3^{rd}$ column is composed of $W_{8i_1+8}^{(3)}$ with a negative (−) co-phase. [C: $1^{st}$ col ($W_{8i_1}^{(3)}$ with (+) co-phase), $2^{nd}$ col ($W_{8i_1+8}^{(3)}$ with (+) co-phase), $3^{rd}$ col ($W_{8i_1+8}^{(3)}$ with (−) co-phase)].

In case of Type-D, a $1^{st}$ column is composed of $W_{8i_1+8}^{(3)}$ with a positive (+) co-phase, a $2^{nd}$ column is composed of $W_{8i_1}^{(3)}$ with a positive (+) co-phase, and a $3^{rd}$ column is composed of $W_{8i_1}^{(3)}$ with a negative (−) co-phase. [D: $1^{st}$ col ($W_{8i_1+8}^{(3)}$ with (+) co-phase), $2^{nd}$ col ($W_{8i_1}^{(3)}$ with (+) co-phase), $3^{rd}$ col ($W_{8i_1}^{(3)}$ with (−) co-phase)].

In the above-mentioned examples, two vectors for use in the codebook are one vector $W_{8i_1}^{(3)}$ and the other vector $W_{8i_1}^{(3)}$. In case of i2=0 and i2=2, the $W_{8i_1}^{(3)}$ vector is used for the first column. In case of i2=1 and i2=3, the $W_{8i_1+8}^{(3)}$ vector is used for the first column. In addition, in case of i2=0 and i2=1, two different vectors (i.e., $W_{8i_1}^{(3)}$ and $W_{8i_1+8}^{(3)}$ vectors) are applied to the second and third columns, such that orthogonality may be achieved between two columns. On the other hand, in case of i2=2 and i2=3, one vector (i.e., $W_{8i_1}^{(3)}$ or $W_{8i_1+8}^{(3)}$ vector) may be applied to the second and third columns, such that orthogonality may be obtained using different co-phase components (i.e., (+) and (−) co-phases).

When comparing one case of (i2=0, 1, 2, 3) at the Rank-3 codebook of Table 13 with the case of (i2=4, 5, 6, 7) at the Rank-3 codebook of Table 13, it can be recognized that constituent vectors of the codebook are different from each other. That is, in association with the case of (i2=0, 1, 2, 3). $W_{8i_1}^{(3)}$ and $W_{8i_1}^{(3)}$ vectors are used. In association with the other case of (i2=4, 5, 6, 7), $W_{8i_1+2}^{(3)}$ and $W_{8i_1+10}^{(3)}$ vectors are used.

By means of the above-mentioned types (Type-A, Type-B, Type-C, and Type-D, a Rank-3 codebook generation matrix may also be represented by the following Table 33.

TABLE 33

| | | | | | | | | | | | | | | | | |
|---|---|---|---|---|---|---|---|---|---|---|---|---|---|---|---|---|
| | | | | | | | | I2 | | | | | | | | |
| | 0 | 1 | 2 | 3 | 4 | 5 | 6 | 7 | 8 | 9 | 10 | 11 | 12 | 13 | 14 | 15 |
| I1 | A | B | C | D | A | B | C | D | A | B | C | D | A | B | C | D |
| 0 | $W_{8i_1}^{(3)}$ | $W_{8i_1+8}^{(3)}$ | $W_{8i_1+2}^{(3)}$ | $W_{8i_1+10}^{(3)}$ | $W_{8i_1+4}^{(3)}$ | $W_{8i_1+12}^{(3)}$ | $W_{8i_1+6}^{(3)}$ | $W_{8i_1+14}^{(3)}$ | | | | | | | | |
| 1 | $W_{8i_1+8}^{(3)}$ | $W_{8i_1+16}^{(3)}$ | $W_{8i_1+10}^{(3)}$ | $W_{8i_1+18}^{(3)}$ | $W_{8i_1+12}^{(3)}$ | $W_{8i_1+20}^{(3)}$ | $W_{8i_1+14}^{(3)}$ | $W_{8i_1+22}^{(3)}$ | | | | | | | | |
| 2 | $W_{8i_1+16}^{(3)}$ | $W_{8i_1+24}^{(3)}$ | $W_{8i_1+18}^{(3)}$ | $W_{8i_1+26}^{(3)}$ | $W_{8i_1+20}^{(3)}$ | $W_{8i_1+28}^{(3)}$ | $W_{8i_1+22}^{(3)}$ | $W_{8i_1+30}^{(3)}$ | | | | | | | | |
| 3 | $W_{8i_1+24}^{(3)}$ | $W_{8i_1}^{(3)}$ | $W_{8i_1+26}^{(3)}$ | $W_{8i_1+2}^{(3)}$ | $W_{8i_1+28}^{(3)}$ | $W_{8i_1+4}^{(3)}$ | $W_{8i_1+30}^{(3)}$ | $W_{8i_1+6}^{(3)}$ | | | | | | | | |

As a method for reducing the size of bits requisite for codebook indication, the sub-sampling application may be used.

For example, 2 indication bits constructing the Rank-3 codebook may be reduced to exemplary bits shown in Table 34.

TABLE 34

| I1 | I2 | Total bit size |
|---|---|---|
| 2 | 4 | 6 |
| 1 | 4 | 5 |
| 2 | 3 | 5 |
| 0 | 4 | 4 |
| 1 | 3 | 4 |
| 2 | 2 | 4 |

In order to allow the entire bit size for codebook indication to be composed of 4 bits, three schemes (i.e., i1+i2=0+4, 1+3, 2+2) may be used as necessary. From among the three schemes, if 'i1' is composed of 0 bit, namely, if is composed of one element, beam resolution is deteriorated, resulting in a reduction in performance or throughout. Next, the remaining schemes other than the scheme of using 'i1' composed of 0 bit will hereinafter be described in detail.

First, various methods for constructing the i1 subset and the i2 subset on the condition that one bit (1 bit) is assigned to 'i1' and 3 bits are assigned to 'i2' will hereinafter be described.

In case of selecting/using the subset from among all indexes of i1 and i2, the element of a codebook capable of being generated according to which index is selected is changed to another element, such that it is preferable that indexes be properly selected to construct a high-performance codebook.

If i1 is composed of 1 bit, two indexes may be selected from among several indexes (0, 1, 2, 3) of the i1 composed of 1 bit. The number of vectors capable of being used as constituent elements of the codebook is set to 12 or 16 according to which index is selected from among indexes (0, 1, 2, 3) of i1. For example, provided that (0, 1) may be selected from among indexes (0, 1, 2, 3) of i1, 12 vectors of (m=0, 2, 4, 6, 8, 10, 12, 14, 16, 18, 20, 22) may be used. In another example, provided that (0, 2) may be selected from among indexes (0, 1, 2, 3) of i1, 16 vectors of $W_{8i_1+m}^{(3)}$ (m=0, 2, 4, 6, 8, 10, 12, 14, 16, 18, 20, 22, 24, 26, 28, 30) may be used. That is, if i1 is set to (0, 1) [i.e., i1=(0, 1)], duplicated or overlapping vectors may be applied to each of i1=0 and i1=1. If i1 is set to (0, 2) [i.e., i1=(0, 2)], different vectors may be applied to each of i1=0 and i1=2. Therefore, it is preferable that i1=(0, 2) be used from the viewpoint of beam resolution.

On the other hand, if i2 is assigned 3 bits, 8 indexes may be selected from among 16 i2 indexes from 0 to 15. A first method for selecting 8 indexes is designed to select the i2 index including various vectors so as to increase beam resolution. A second method for selecting 8 indexes performs index selection to include all of four types (Type-A, Type-B, Type-C, Type-D) constructing a Rank-3 element.

For example, the first method selects two groups from among four i2-index groups [(0, 1, 2, 3), (4, 5, 6, 7), (8, 9, 10, 11), (12, 13, 14, 15)] such that it may use 8 indexes. For example, provided that 8 indexes [(0, 2), (4, 6), (8, 10), (12, 14)] are selected as the i2 index, Rank-3 codebook elements based on Type-A and Type-C may be generated using 8 vectors. In another example, provided that 8 indexes [(1, 3), (5, 7), (9, 11), (13, 15)] are selected as the i2 indexes, Rank-3 codebook elements based on Type-B and Type-D may be generated using 8 vectors.

For example, the second method may select two groups from among four groups [(0, 1, 2, 3), (4, 5, 6, 7), (8, 9, 10, 11), (12, 13, 14, 15)] such that it may use 8 indexes. In case of the matrix constructing a Rank-3 codebook, +1 and −1 may be used as co-phase components. In addition, there are vectors capable of forming 8 Tx DFT vectors by co-phase components. For example, provided that (+1) is used as the co-phase element in case of vectors numbered 0, 8, 16 and 24, 8 Tx DFT vectors may be formed. In another example, provided that (−1) is used as the co-phase element in case of vectors numbered 4, 14, 20 and 28, 8 Tx DFT vectors may be formed. Considering the co-polarized antenna structure, the use of 8 Tx DFT vectors may achieve high throughput or performance.

Since the co-phase components used in the matrix constructing the Rank-3 codebook are set to (+1) and (−1), it is preferable that the i2 index be selected to include Nos. 0, 8, 16, 4, 14, 20, and 28 vectors capable of forming the 8Tx DFT vector using the above-mentioned co-phase components. For example, (0, 1, 2, 3) and (8, 9, 10, 11) may be selected as the i2 indexes.

Next, in the case where 2 bits are assigned to 'i1' and 2 bits are assigned to 'i2', various methods for constructing the i2 subset will hereinafter be described in detail. Since i1 includes indexes Nos. 0, 1, 2 and 3, all indexes can be represented through 2 bits.

For example, in order to select the subset of the i2 index when the i2 indexes 0 to 15 are classified into four groups [(0, 1, 2, 3), (4, 5, 6, 7), (8, 9, 10, 11), and (12, 13, 14, 15)], one group is selected from among the four groups so that four elements of the corresponding group may be used. One index is selected from among each of the four groups such that four elements may be configured. Alternatively, two groups are selected from among four groups, and two indexes are selected from among the selected group such that four elements may be configured.

The number of cases, each of which can selectively use two of four types (Type-A, Type-B, Type-C, and Type-D) constructing the Rank-3 codebook element, is set to 6, respective cases are (A, B), (A, C), (A, D), (B, C), (B, D), and (C, D).

In addition, the number of cases, each of which can selectively use two of four groups of the i2 index, is set to 6. If the frontmost vector from among the i2 index groups refers to the corresponding group, respective groups may be represented by Nos. 0, 4, 8, and 12 groups. Respective cases, each of which selects two of four groups, are (0, 4), (0, 8), (0, 12), (4, 8), (4, 12), and (8, 12).

As a combination of six cases about a method for constructing the Rank-3 codebook element and six cases about a method for selecting a vector group, a method for constructing subsets of a total of 36 i2 indexes is achieved.

According to the above-mentioned examples, in the case where, in association with the Rank-3 codebook, one bit is assigned to 'i1' and 3 bits are assigned to 'i2', and 2 bits are assigned to 'i1' and 2 bits are assigned to 'i2', examples constructing the i2 and i2 subsets may be represented by the following Table 35.

TABLE 35

| i1<br>Bit (index) | i2<br>Bit (index) |
|---|---|
| 1 (0, 1) | 3 (0, 2) (4, 6) (8, 10) (12, 14) |
| 1 (0, 1) | 3 (1, 3) (5, 7) (9, 11) (13, 15) |
| 1 (0, 1) | 3 (0, 1) (4, 5) (8, 9) (12, 13) |
| 1 (0, 1) | 3 (2, 3) (6, 7) (10, 11) (14, 15) |
| 1 (0, 1) | 3 (0, 1, 2, 3) (8, 9, 10, 11) |
| 1 (0, 1) | 3 (0, 1, 2, 3) (4, 5, 6, 7) |
| 1 (0, 1) | 3 (4, 5, 6, 7) (12, 13, 14, 15) |
| 1 (0, 1) | 3 (0, 2) (4, 6) (8, 10) (12, 14) |
| 1 (0, 1) | 3 (1, 3) (5, 7) (9, 11) (13, 15) |
| 1 (0, 1) | 3 (0, 1) (4, 5) (8, 9) (12, 13) |
| 1 (0, 1) | 3 (2, 3) (6, 7) (10, 11) (14, 15) |
| 1 (0, 1) | 3 (0, 1, 2, 3) (8, 9, 10, 11) |
| 1 (0, 1) | 3 (0, 1, 2, 3) (4, 5, 6, 7) |
| 1 (0, 1) | 3 (4, 5, 6, 7) (12, 13, 14, 15) |
| 2 (0, 1, 2, 3) | 2 (0, 1, 2, 3) |
| 2 (0, 1, 2, 3) | 2 (4, 5, 6, 7) |
| 2 (0, 1, 2, 3) | 2 (8, 9, 10, 11) |
| 2 (0, 1, 2, 3) | 2 (12, 13, 14, 15) |
| 2 (0, 1, 2, 3) | 2 (0, 4, 8, 12) |
| 2 (0, 1, 2, 3) | 2 (1, 5, 9, 13) |
| 2 (0, 1, 2, 3) | 2 (2, 6, 10, 14) |
| 2 (0, 1, 2, 3) | 2 (3, 7, 11, 15) |
| 2 (0, 1, 2, 3) | 2 (0, 2, 4, 6) |
| 2 (0, 1, 2, 3) | 2 (0, 2, 8, 9) |
| 2 (0, 1, 2, 3) | 2 (1, 3, 5, 7) |
| 2 (0, 1, 2, 3) | 2 (1, 3, 10, 11) |

Even in the case where the Rank-4 codebook is configured, the following subsampling may be used. For example, two indicators (i1 and i2) constructing the above-mentioned Rank-3 codebook may be reduced as shown in the following Table 36.

TABLE 36

| I1 | I2 | Total bit size |
|---|---|---|
| 2 | 3 | 5 |
| 1 | 3 | 4 |
| 2 | 2 | 2 |

In association with the Rank-4 codebook, the subsets of the i1 and i2 indexes can be selected in a similar way to the scheme for selecting the subset from among the above-mentioned Rank-3 codebook. The same parts may herein be omitted for convenience and clarity of description.

In the Rank-4 codebook, in case that one bit is assigned to 'i1' and 3 bits are assigned to 'i2', and in another case that 2 bits are assigned to 'i1' and 2 bits are assigned to 'i2', examples for constructing the i2 subset and the i2 subset can be represented by the following Table 33.

TABLE 37

| i1<br>Bit (index) | i2<br>Bit (index) |
|---|---|
| 1 (0, 1) | 3 |
| 1 (0, 2) | 3 |
| 2 (0, 1, 2, 3) | 2 (0, 1, 2, 3) |
| 2 (0, 1, 2, 3) | 2 (4, 5, 6, 7) |
| 2 (0, 1, 2, 3) | 2 (0, 1, 4, 5) |
| 2 (0, 1, 2, 3) | 2 (2, 3, 6, 7) |
| 2 (0, 1, 2, 3) | 2 (0, 2, 4, 6) |
| 2 (0, 1, 2, 3) | 2 (1, 3, 5, 7) |

On the other hand, the selected codebook subset may be used to report PUSCH. For example, during the mode for reporting a PMI for each subband as shown in the PUSCH report mode 1-2, the i1 and i2 subsets may be used to reduce PMI feedback overhead. In this case, in association with 'i1', one index may be reported at WB, and in association with 'i2', indexes for each SB may be reported.

In addition, the 3GPP LTE Release-10 system may use a specific mode for reporting SB CQI and SB PMI as a new PUSCH report mode. Even in the above-mentioned report mode, the codebook subset may be used to reduce the number of report bits for indicating the codebook. In this case, in association with 'i1', one index may be reported at WB, and in association with 'i2', indexes for each SB may be reported.

Embodiment 6

In Embodiment 6, a mode for periodically reporting multiple control information over a PUCCH is defined, and a method for determining transmission priority applicable to control information reporting will hereinafter be described in detail.

As previously stated in Table 5, various control information (RI, PMI, CQI) may be periodically fed back according to PUCCH reporting modes (Modes 1-0, 1-1, 2-0, and 2-1). Periodic feedback of the UE may be semi-statically established by a higher layer. A PUCCH reporting mode may be properly applied to corresponding DL transmission according to whether DL transmission is single antenna transmission, transmission diversity transmission, closed-loop spatial multiplexing (SM) transmission, dual layer transmission, or the like. In addition, the CQI/PMI/RI feedback type for the PUCCH reporting mode may be classified into Type 1, Type 2, Type 3 and Type 4. Type 1 is CQI feedback for the UE selected subband. Type 2 is a WB CQI feedback and a WB PMI feedback. Type 3 is RI feedback. Type 4 is WB CQI feedback.

On the other hand, the legacy 3GPP LTE Release-8 or Release-9 system has defined control information capable of being dropped in the case where various control information collides with each other in UL transmission (i.e., in the case where control information is transmitted in the same subframe).

In more detail, in case of feedback over a PUCCH, when RI transmission collides with a WB CQI/PMI (i.e., when the RI and the WB CQI/PMI are transmitted in the same subframe), the WB CQI/PMI may be dropped. Alternatively, if RI transmission collides with an SB CQI in case of such PUCCH feedback, the SB CQI may be dropped. In addition, if the positive SR and the RI/PMI/CQI collide with each other, the RI/PMI/CQI may be dropped. In addition, if an uplink shared channel (UL-SCH) to which the subframe bundling operation is applied collides with the periodic RI/PMI/CQI reporting, the periodic CQI/PMI/RI reporting may be dropped in the corresponding subframe. The periodic CQI/PMI and/or RI may not be multiplexed with PUSCH transmission of the corresponding subframe. In addition, assuming that HARQ-ACK and RI/PMI/CQI collide with each other in a subframe in which no PUSCH is transmitted, if a predetermined parameter (simultaneousAckNackAndCQI) provided from a higher layer is set to 1, CQI/PMI/RI is multiplexed with HARQ-ACK on a PUCCH, and otherwise the CQI/PMI/RI may be dropped.

As described above, assuming that multiple control information must be simultaneously transmitted during one subframe in 3GPP Release 8/9, limited control information must be reported. The transmission priority applied to control information collision may be arranged in the order of SR, HARQ-ACK, UL-SCH (in case of the subframe bundling operation)>RI>WB CQI/PMI, WB CQI, SB CQI. In a system supporting the extended antenna configuration, different indexes (i1 and i2) for the precoder may be fed back. Accordingly, it is necessary to determine transmission priority encountered in the collision between RI, I1, I2 and CQI. Prior to determining the transmission priority of such control information, it is necessary to define the reporting mode for defining the report timing of the control information.

Exemplary PUCCH Report Modes

First of all, during periodic CQI/PMI/RI transmission, CQI, CQI/PMI, preferred subband selection and CQI information may be calculated on the basis of the last reported periodic RI, and subband selection and a CQI value may be calculated on the basis of the last reported periodic WB PMI and RI. In addition, two precoder indexes (I1 and I2) may be reported at different time points or at the same time point. Considering the above-mentioned situation, for example, the report modes shown in Table 38 may be considered for feedback information transmission.

TABLE 38

|  |  | T1 | T2 | T3 |
|---|---|---|---|---|
| | Mode 1-1-1 | (RI + I1)_WB | (I2 + CQI)_WB | |
| | Mode 1-1-2 | (RI)_WB | (I1 + I2 + CQI)_WB | |
| Mode 2-1 | Mode 2-1 (1) (RI + PTI (0)) | (I1)_WB | (I2 + CQI)_WB | |
| | Mode 2-1 (2) (RI + PTI (1)) | (I2 + CQI)_WB | (I2 + CQI)_SB | |

In Table 38, I1 and I2 may indicate indexes of the codebook composed of precoder elements, and PTI may indicate a precoder type indication bit.

In Mode 1-1-1 shown in Table 38, the precoder index I1 may indicate a precoder index that is calculated/selected on the basis of RI transmitted in a current subframe. The precoder index I2 may indicate a precoder index that is calculated/selected on the basis of the last reported RI and the last reported I1. CQI may indicate a value that is calculated on the basis of the last reported RI, the last reported I1, and the currently reported I2.

In Mode 1-1-2 shown in Table 38, the precoder indexes I1 and I2 may indicate precoder indexes that are calculated/selected on the basis of the last reported RI. CQI may indicate a value that is calculated on the basis of the last reported RI and the currently reported I1 and I2.

In Mode 2-1(1) shown in Table 38, the precoder index I1 may indicate a precoder index that is calculated/selected on the basis of the last reported RI. The precoder index I2 may indicate a precoder index that is calculated/selected on the basis of the last reported RI and the last reported I1. CQI may indicate a value that is calculated on the basis of the last reported RI, the last reported I1 and the current reported I2. When (I1) and (I2+CQI) are reported between (RI+PTI) transmission cycles, (I1) may be reported only once and (I2+CQI) may be reported several times. Alternatively, when (I1) and (I2+CQI) are reported between (RI+PTI) transmission cycles, (I1) may be reported two times and (I2+CQI) may be reported several times. In another example, (I1) may be successively reported as necessary, or (I1) and (I2+CQI) may be alternately reported. Otherwise, (I1) may be reported just after the (RI+PTI) report time, or may be reported just before the next (RI+PTI) report time.

In Mode 2-1(2) shown in Table 38, the precoder index I2 may indicate a precoder index that is calculated/selected on the basis of the last reported RI. The precoder index I2 may indicate a precoder index that is calculated/selected on the basis of the last reported RI and the last reported I1. SB CQI and SB I2 may indicate a value and index calculated/selected on the basis of the last reported RI and the last reported I1.

Mode 2-1 shown in Table 38 will hereinafter be described in detail.

Mode 2-1 [Mode 2-1(1) and Mode 2-1(2)] shown in Table 38 may correspond to a report mode configured in an extended form of the PUCCH report mode 2-1 shown in Table 5. The PUCCH report mode 201 shown in Table 5 may be a PUCCH report mode defined in the 3GPP LTE Release-8/9 system, and is defined as a mode for reporting WB PMI/CQI and SB CQI. In this case, SB CQI may be a CQI of an SB selected from among a BP. The term "BP" may indicate the subset of the system bandwidth. BP defined in the system bandwidth is cyclically selected in the order of time such that a CQI of the BP can be reported and a plurality of SB CQIs can also be reported. In other words, RI/PMI/CQI can be reported in the same time order of (RI)→(WB PMI/CQI)→(SB CQI at first BP)→(SB CQI at second BP)→ . . . →(SB CQI at n-th BP). In this case, if the report cycle and offset of PMI/CQI are determined through RRC signaling, WB PMI/CQI and SB CQI may be reported in response to the set report cycle. RI may be established to have a cycle corresponding to an integer multiple on the basis of the report cycle of WB PMI/CQI. Compared to WB PMI/CQI transmission time, RI may be reported prior to a subframe corresponding to the set offset using the offset indicator.

For the PUCCH report mode for use in the system (e.g., 3GPP LTE Release-9 system) supporting the extended antenna structure, the extended report mode of the PUCCH report mode 2-1 shown in Table 5 may be defined.

As the CQI/PMI/RI feedback types of the PUCCH report mode for use in the 3GPP LTE Release-8/9 system, four feedback types (Type-1, Type-2, Type-3, Type-4) may be defined. Type-1 is CQI feedback for a UE-selected subband, Type-2 is WB CQI feedback and WB PMI feedback, Type-3 is RI feedback, and Type-4 is WB CQI feedback. Similar to the above-mentioned four types, four CQI/PMI/RI feedback types for use in the PUCCH report mode of the 3GPP LTE Release-10 system may be defined. For example, Report Type 1 is RI/PTI feedback, Report Type 2 is WB I1 feedback, Report Type 3 is WB I1/CQI feedback, and Report Type 4 is SB I2/CQI feedback. According to the Type-1 PTI setup, a report type may be decided. For example, if Type-1 PTI is set to zero (PTI=0), Type-1, Type-2 and Type-3 may be used for such reporting. If Type-1 PTI is set to 1 (PTI=1), Type-1, Type-3 and Type-4 may be used for such reporting. Accordingly, Mode 2-1(1) and Mode 2-1(2) shown in Table 38 may be defined.

If the precoder element is indicated using one precoder index in the same manner as in 2Tx antenna transmission or 4Tx antenna transmission, PTI is always set to 1, such that Type-1, Type-3, and Type-4 may be used for the reporting. Differently from the report scheme for use in the 3GPP LTE Release-8/9 system, SB PMI/CQI may be transmitted at Type-4. In order to enable Type-4 transmission for the 3GPP LTE Release-10 system to operate similarly to the 3GPP LTE Release-8/9 system, one or more BPs within the system bandwidth may be cyclically reported, and PMI/CQI for a preferred SB within BP(s) may be reported. In this case, the Type-3 or Type-4 report cycle may be determined in the same manner as in the PMI/CQI cycle setup of the 3GPP LTE Release-8/9 system. For example, Type-3 and Type-4 may be reported according to a cycle set for PMI/CQI. In addition, a cycle for Type-1 can also be determined in the same manner as in an RI cycle setup for the 3GPP LTE Release-8/9 system. For example, the Type-1 report cycle may be denoted by an integer multiple of the Type-3 report cycle. In addition, an offset value may be established in such a manner that Type-1 can be transmitted at a subframe located before a Type-3 report subframe by a predetermined distance corresponding to a predetermined number of subframes.

On the other hand, when the precoder element is indicated using two precoder indexes as in 8Tx antenna transmission, (Type 1-Type 2-Type 3) or (Type 1-Type 3-Type 4) may be reported according to the PTI value. When the set of two feedback types is selected according to the PTI value, the report cycle for individual feedback types must be decided. Detailed methods for indicating the reporting period to be applied to each feedback type will hereinafter be described in detail.

In a first method, if a period (or cycle) of Type 1 (RI+PTI) is established irrespective of PTI indication, the Type 1 (RI+PTI) period may be established on the basis of Type 3 (that is, Type 3 for use in the Type 1-Type 3-Type 4 reporting mode) in case of PTI=1.

In a second method, if a period of Type 1 (RI+PTI) is established irrespective of PTI indication, the Type (RI+PTI) period may be established on the basis of Type 3 (that is, Type 3 for use in the Type 1-Type 2-Type 3 reporting mode) in case of PTI=0.

In a third method, if a period of Type 1 (RI+PTI) is established irrespective of PTI indication, the Type 1 (RI+PTI) period may be established on the basis of Type 2 (that is, Type 2 for use in the Type 1-Type 2-Type 3 reporting mode) in case of PTI=0.

In a fourth method, a period of Type 1 (RI+PTI) may be differently established according to PTI indication. For example, in case of PTI=1, when one cycle for transmitting one Type 3 (WB I2/CQI) or at least one Type 4 (SB I2/CQI) is established, the period of Type 1 (RI+PTI (=1)) may be set to an integer multiple of the above-mentioned one cycle. On the other hand, in case of PTI=0, when one cycle for transmitting one Type 2 (WB I1) and one Type 3 (WB I2/CQI) is established, the Type 1 (RI+PTI (=0)) period may be set to an integer multiple of the above-mentioned one cycle. Minimum cycles requested for PTI=0 and PTI=1 may be differently established.

In a fifth method, if one duration needed for CQI/PMI transmission at PTI=1 is different from the other duration needed for CQI/PMI transmission at PTI=0, a longer duration from among the two durations may be used as a reference, and feedback information is repeatedly transmitted in the shorter duration. For example, in the case where transmission of one Type 2 (WB I1) and one Type 3 (WB I2/CQI) is needed for PTI=0 and transmission of one Type 3 (WB I2/CQI) and multiple transmission of Type 4 (SB I2/CQI) are requested for PTI=1, the case of PTI=0 may correspond to the shorter duration and the case of PTI=1 may correspond to the longer duration. In this case, the shorter duration may be repeated several times such that the repeated result may correspond to the long duration. That is, Type 2 and/or Type may be repeatedly transmitted in case of PTI=0. Upon execution of Type 2 reporting, Type 3 may be repeatedly reported. Alternatively, Type 2 and Type 3 may be repeatedly reported.

In a sixth method, if one duration needed for CQI/PMI transmission at PTI=1 is different from the other duration needed for CQI/PMI transmission at PTI=0, a shorter duration from among the two durations may be used as a reference. In the longer duration, some report contents needed for transmission may be dropped, or may be transmitted in the next Type 1 transmission duration. For example, in the case where transmission of one Type 2 (WB I1) and one Type 3 (WB I2/CQI) is needed for PTI=0 and transmission of one Type 3 (WB I2/CQI) and multiple transmission of Type 4 (SB I2/CQI) are requested for PTI=1, the case of PTI=0 may correspond to the shorter duration and the case of PTI=1 may correspond to the longer duration. In this case, in the longer duration having PTI=1, some information (for example, Type 4) may be dropped, and one Type 3 and one Type 4 may be reported. In addition, provided that Type 4 reports CQI/PMI using band cycling, CQI/PMI of another BP may also be transmitted according to the Type 1 transmission duration.

On the other hand, examples of the PUCCH reporting modes capable of being applied to the above-mentioned 3GPP LTE Release-10 system will hereinafter be described in detail.

Since a variety of DL transmission modes are defined in the 3GPP LTE Release-10 system, a variety of PUCCH feedback reporting modes may be defined to report a CSI for DL transmission over a PUCCH. In this case, a method for using two precoder indexes (I1 and I2) (in case of the present embodiment, I1 and I2 may also be referred to as PMI1 and PMI2 or W1 and W2) and a method for basically using the PUCCH report modes defined in the legacy 3GPP LTE Release 8/9 may be used. Since PUCCH transmission resources are restricted, it is necessary to design a PUCCH report mode in which the reporting bitwidth optimization using codebook subsampling or the like is considered.

Various examples for the PUCCH feedback reporting mode applicable to the 3GPP LTE Release-10 system according to the embodiments of the present invention will hereinafter be described in detail.

First, the size of the PUCCH report bits may not exceed 11 bits (as in 3GPP LTE Release-8). Considering this situation, the bit size of each PUCCH reporting mode must be properly established. In addition, PUCCH report modes applied to the 3GPP LTE Release-10 system can be defined as extensions of the PUCCH reporting modes (See PUCCH reporting modes 1-1 and 2-1 of Table 5) for PMI transmission in the 3GPP LTE Release-8 system. Therefore, three PUCCH report modes may be defined.

PUCCH Mode-A is defined as one extension of a PUCCH Report Mode 1-1 of Table 5, PUCCH Mode-B is defined as another extension of PUCCH Report Mode 1-1 of Table 5, and PUCCH Mode-C is defined as an extension of a PUCCH Report Mode 2-1. Mode A, Mode B and Mode C may correspond to Mode 1-1-1, Mode 1-1-2, and Mode 2-1 of Table 38, respectively. In the above-mentioned three PUCCH report modes, control information transmitted at one time point (i.e., at one subframe) may be expressed by a report type. Report types transmitted at individual PUCCH Report Modes A, B and C will hereinafter be described in detail.

In the PUCCH Report Mode-A, two reporting types (Type-5 and Type-2a) may be used. Type-5 reporting is a feedback of jointly coded RI and W1, and Type-2a reporting is a feedback of WB CQI and W2.

In the PUCCH Report Mode-B, two reporting types (Type-3 and Type-2b) may be used. Type-3 is an RI feedback and Type-2b is a feedback of WB CQI, W1, and W2.

In the PUCCH Report Mode-C, four reporting types (Type-6, Type-2a, Type-7 and Type-8) may be used. Type-6 is feedback of jointly coded RI and PTI, Type-2a is a feedback of a WB CQI and W2, Type-7 is a WB W1 feedback, and Type-8 is a feedback of SB CQI and W2 with an indicator of the selected band.

The above-mentioned reporting types are reported in different subframes, thus requiring multiple subframes (TTIs) to determine the entire precoding matrix W and its associated CQI in the case of PUCCH Mode-A and Mode-C.

Subsampling of PUCCH report modes will hereinafter be described in detail. PUCCH Report Mode-A and PUCCH Report Mode-B corresponding to the extended version of PUCCH Report Mode 1-1 will hereinafter be described.

In the case where no codebook sampling is applied to PUCCH Report Mode-A and PUCCH Report Mode-B, feedback overhead (i.e., the number of requested bits) for report types may be summarized according to Rank values as shown in Table 39.

TABLE 39

| | PUCCH Mode-A | | PUCCH Mode-B | |
| --- | --- | --- | --- | --- |
| | Type-5 | | | |
| | reporting | Type-2a | Type-3 | |
| | (Joint of | reporting | reporting | Type-2b reporting |
| Rank | RI and W1) | (W2 + CQI) | (RI) | (W1 + W2 + CQI) |
| 1 | 6 | 8 (4 + 4) | 3 | 12 (4 + 4 + 4) |
| 2 | | 11 (4 + [4 + 3]) | | 15 (4 + 4 + [4 + 3]) |
| 3 | | 11 (4 + [4 + 3]) | | 13 (2 + 4 + [4 + 3]) |
| 4 | | 10 (3 + [4 + 3]) | | 12 (2 + 3 + [4 + 3]) |
| 5 | | 7 (0 + [4 + 3]) | | 9 (2 + 0 + [4 + 3]) |
| 6 | | 7 (0 + [4 + 3]) | | 9 (2 + 0 + [4 + 3]) |
| 7 | | 7 (0 + [4 + 3]) | | 9 (2 + 0 + [4 + 3]) |
| 8 | | 7 (0 + [4 + 3]) | | 7 (0 + 0 + [4 + 3]) |

In Table 39, some Type-2 Reports for PUCCH Mode-B exceed 11 bits, such that they can also exceed the limitation of PUCCH transmission bits. Therefore, codebook subsampling may be applied to Type-2 Reporting at PUCCH Mode-B as shown in Table 40.

TABLE 40

| | PUCCH Mode-B | | | |
| --- | --- | --- | --- | --- |
| | Type-3 | Type-2b | | |
| | reporting | reporting | | |
| Rank | RI | (W1 + W2 + CQI) | | |
| 1 | 3 | 11 (4 + 3 + 4) | W1: All, W2: 0~7 | 32 PSK DFT vector (no overlapped) QPSK co-phasing |
| 2 | | 11 (3 + 1 + [4 + 3]) | W1: 2n (n: 0~7), W2: 0, 4 | 16 PSK DFT vector (no overlapped) BPSK co-phasing |
| 3 | | 11 (1 + 3 + [4 + 3]) | W1: 0, 2, W2: 2m (m: 0~7) | 16 PSK DFT vector (no overlapped) Two types of W (3) |
| 4 | | 11 (1 + 3 + [4 + 3]) | W1: 0, 2, W2: All | 16 PSK DFT vector (no overlapped) QPSK co-phasing |
| 5 | | 9 (2 + 0 + [4 + 3]) | W1: All | 16 PSK DFT vector (no overlapped) BPSK co-phasing |
| 6 | | 9 (2 + 0 + [4 + 3]) | W1: All | 16 PSK DFT vector (no overlapped) BPSK co-phasing |
| 7 | | 9 (2 + 0 + [4 + 3]) | W1: All | 16 PSK DFT vector (no overlapped) BPSK co-phasing |
| 8 | | 7 (0 + 0 + [4 + 3]) | | QPSK DFT vector (no overlapped) BPSK co-phasing |

As can be seen from Table 39, Type-2a Reporting does not exceed 11 bits such that subsampling need not be used, and Type-5 Reporting may require twice as many bits as Type-3 Reporting. Since Type-5 and Type-3 Reportings carry rank information, the Type-5 and Type-3 types should have robust reliability. In the case where rank information has high priority for PUCCH reporting and several types need to be reported in the same subframe, CQI and PMI may drop from the RI transmission subframe. Considering the above-mentioned problem, codebook subsampling may also be applied to Type-3 Reporting so as to increase the reliability of rank feedback.

Applying subsampling to Type-5 Report may be represented, for example, by Tables 41 to 44. Tables 41 and 42 show the exemplary cases of the maximum Rank-2. Table 43 shows the exemplary case of the maximum Rank-4. Table 44 shows the exemplary case of the maximum Rank-8.

TABLE 41

| | PUCCH Mode-A | | | |
|---|---|---|---|---|
| Rank | Type-5 reporting Joint of RI and W1 | Type-2a reporting (W2 + CQI) | | |
| 1 | 5 (1 + 4) | 8 (4 + 4) | W1: All, W2: All | non-overlapped 32 oversampled beam QPSK co-phasing |
| 2 | | 11 (4 + [4 + 3]) | | non-overlapped 32 oversampled beam QPSK co-phasing |

TABLE 42

| | PUCCH Mode-A | | |
|---|---|---|---|
| Rank | Type-5 reporting Joint of RI and W1 | Type-2a reporting (W2 + CQI) | |
| 1 | 4 | 8 (4 + 4) | W1: 2n (n: 0~7), W2: All |
| 2 | (log2 (8 + 8)) | 11 (4 + [4 + 3]) | |

TABLE 43

| | PUCCH Mode-A | | | |
|---|---|---|---|---|
| Rank | Type-5 reporting Joint of RI and W1 | Type-2a reporting (W2 + CQI) | | |
| 1 | 5 (2 + 3) | 8 (4 + 4) | W1: 2n (n: 0~7), W2: All | non-overlapped 32 oversampled beam QPSK co-phasing |
| 2 | | 11 (4 + [4 + 3]) | | non-overlapped 32 oversampled beam QPSK co-phasing |
| 3 | | 11 (4 + [4 + 3]) | W1: All, W2: All | non-overlapped 16 oversampled beam Two types of W (3) |
| 4 | | 10 (3 + [4 + 3]) | | non-overlapped 16 oversampled beam QPSK co-phasing |

TABLE 44

| | PUCCH Mode-A | | | |
|---|---|---|---|---|
| Rank | Type-5 reporting Joint of RI and W1 | Type-2a reporting (W2 + CQI) | | |
| 1 | 5 (3 + 2) | 8 (4 + 4) | W1: 4n (n: 0~3), W2: All | QPSK co-phasing |
| 2 | | 11 (4 + [4 + 3]) | | QPSK co-phasing |
| 3 | | 11 (4 + [4 + 3]) | W1: All, W2: All | 16 PSK DFT vector (overlapped) Two types of W(3) |

TABLE 44-continued

| | PUCCH Mode-A | | |
|---|---|---|---|
| Rank | Type-5 reporting Joint of RI and W1 | Type-2a reporting (W2 + CQI) | |
| 4 | 10 (3 + [4 + 3]) | | 16 PSK DFT vector (no overlapped) QPSK co-phasing |
| 5 | 7 (0 + [4 + 3]) | | 16 PSK DFT vector (no overlapped) BPSK co-phasing |
| 6 | 7 (0 + [4 + 3]) | | 16 PSK DFT vector (no overlapped) BPSK co-phasing |
| 7 | 7 (0 + [4 + 3]) | | 16 PSK DFT vector (no overlapped) BPSK co-phasing |
| 8 | 7 (0 + [4 + 3]) | | QPSK DFT vector (no overlapped) BPSK co-phasing |

In the example of Table 41, Type-5 bits for RI may be fixed to 5 bits, and W1 may be used as the full set, resulting in increased system performance or throughput.

In the example of Table 42, Type-5 bits for RI may be used as 4 bits, such that RI can be transmitted much more robustly than the example of Table 40. On the other hand, since the subsampled W1 instead of the full set of W1 is used, system performance or throughput of Table 42 is lower than that of Table 40. Meanwhile, as can be seen from Tables 42, and 44, W1 and W2 of Rank-1 are identical to those of Rank-2 irrespective of the maximum rank, resulting in the implementation of nested characteristics.

Compared to the above-mentioned PUCCH Mode-A and PUCCH Mode-B, co-phase properties can be maintained by the codebook subsampling for the PUCCH Mode-A, and at the same time beam granularity can be reduced. On the other hand, while more precise beam granularity than PUCCH Mode-A is provided by the codebook subsampling for PUCCH Mode-B, the co-phase property is unavoidably deteriorated.

PUCCH Report Mode-C corresponding to the extended version of the legacy PUCCH report mode 2-1 will hereinafter be described in detail.

Feedback overhead (the number of feedback bits) requested for PUCCH Mode-C can be represented by the following Table 45.

TABLE 45

| | PUCCH Mode-C (PTI = 0) | | | PUCCH Mode-C (PTI = 1) | | |
|---|---|---|---|---|---|---|
| | | | | | Type-2a | |
| Rank | Type-6 reporting (RI + PTI) | Type-7 reporting W1 | Type-2a reporting (wb-W2 + CQI) | Type-6 reporting (RI + PTI) | Type-2a reporting (wb-W2 + wb-CQI) | Type-8 reporting (sb-W2 + sb-CQI + L-bit) |
| 1 | 4 (3 + 1) | 4 | 8 (4 + 4) | 4 (3 + 1) | 8 (4 + 4) | 10 (4 + 4 + 2) |
| 2 | | 4 | 11 (4 + [4 + 3]) | | 11 (4 + [4 + 3]) | 13 (4 + [4 + 3] + 2) |
| 3 | | 2 | 11 (4 + [4 + 3]) | | 11 (4 + [4 + 3]) | 13 (4 + [4 + 3] + 2) |
| 4 | | 2 | 10 (3 + [4 + 3]) | | 10 (3 + [4 + 3]) | 12 (3 + [4 + 3] + 2) |
| 5 | | 2 | 7 (0 + [4 + 3]) | | 7 (0 + [4 + 3]) | 9 (0 + [4 + 3] + 2) |
| 6 | | 2 | 7 (0 + [4 + 3]) | | 7 (0 + [4 + 3]) | 9 (0 + [4 + 3] + 2) |
| 7 | | 2 | 7 (0 + [4 + 3]) | | 7 (0 + [4 + 3]) | 9 (0 + [4 + 3] + 2) |
| 8 | | 2 | 7 (0 + [4 + 3]) | | 7 (0 + [4 + 3]) | 9 (0 + [4 + 3] + 2) |

As can be seen from Table 45, if PTI is set to 1 (i.e., PTI=1) for Type-6 Reporting, bits required for Type-8 Reporting at Ranks 2 to 4 exceed 11 bits, such that the codebook subsampling may be applied to the excess bits. The principle similar to that of the codebook subsampling used for the above-mentioned PUCCH Mode-B may be applied to W2 of Type-8. In addition, as shown in Table 45, RI feedback reliability of PUCCH Mode-C may be lower than that of the above-mentioned PUCCH Mode-B because of the PTI indication of one bit. In addition, the duty cycle of the W1 report is longer than the duty cycle of RI. Considering this property, the report time points and priorities of the reported types may be determined.

Priority of Feedback Information

If report modes for feedback information transmission timing are defined as described above, control information to be dropped upon collision between control information in each mode will hereinafter be described in detail.

CQI/PMI/RI information for a DL channel may be reported over a UL channel. Transmission priority for each piece of control information may be determined according to attributes (i.e., a reporting period, a bandwidth to be applied, and a selection/calculation basis of other control information) of individual control information, and as such the attributes of individual control information will hereinafter be described in detail. RI bits may be determined according to a maximum number of layers capable of being reported. RI is generally reported at a longer term as compared to the CQI/PMI, and may be applied in units of a system bandwidth (WB) from the viewpoint of one carrier.

PMI may be transmitted as an indicator of the codebook acting as the set of precoding matrices to be applied to DL transmission. The codebook may be represented by a single index, or may be denoted by two different indexes (i.e., I1 and I2). For example, in case of the codebook defined for 2Tx or 4Tx antenna transmission in 3GPP LTE Release-8/9, the precoder element may be determined using a single index. In case of the codebook defined for 8Tx antenna transmission newly defined in 3GPP LTE Release-10 supporting the extended antenna configuration, the precoder element may be determined using two different indicators (I1 and I2). In case of using the indicators (I1 and I2), the reporting period of each index and the applied frequency bandwidth may be differently defined. For example, I1 may indicate a row index of the codebook. I1 may be reported at a relatively long or short term, and may be applied to a system bandwidth (WB) defined from the standpoint of one carrier. For example, I2 may also indicate a column index of the codebook. I2 may be reported at relatively short term, may be applied to a system bandwidth (WB) defined from the standpoint of one carrier, and may be applied on a subband (SB) basis.

If the I1 indicator is reported at a longer term as compared to the I2 indicator from the standpoint of a transmission cycle, the I1 indicator must be reported with higher priority than the I2 indicator. In other words, under the condition that the I1 and I2 reports are established in the same subframe, I1 may be transmitted and I2 may be dropped.

CQI may be calculated on the basis of the determined precoder, and may be reported along with the I2 indicator.

Transmission priorities of feedback information will hereinafter be described with reference to PUCCH report modes of Table 38.

In Mode 1-1-1 of Table 38, RI and I1 applied to a WB may be reported at a long term, and I2 and CQI applied to a WB may be reported at a short term. Accordingly, as can be seen from Mode 1-1-1 of Table 38, if the (R1+I1) transmission time point collides with the (I2+CQI) transmission time point, (I2+CQI) may be dropped. That is, the long-term reported RI and I1 may be reported at a higher priority as compared to the short-term reported I2 and CQI.

In Mode 1-1-2 of Table 38, RI applied to WB may be reported at a long term, and I1, I2 and CQI applied to WB may be reported at a short term. In Mode 1-1-2 of Table 38, if the RI reporting period collides with the (I1+I2+CQI) reporting period, the (I1+I2+CQI) may be dropped. That is, the long-term reported RI may be given higher priority than the short-term reported I1, I2 and CQI.

In Mode 2-1 of Table 38, RI may have higher priority than PMI/CQI. That is, in Mode 2-1(1) of Table 38, if the (RI+PTI) reporting period collides with the (I1) or (I2+CQI) reporting period, (I1) or (I2+CQI) may be dropped. In addition, in Mode 2-1(2) of Table 38, if (RI+PTI) collides with (I2+CQI)_WB or (I2+CQI)_SB, (I2+CQI)_WB or (I2+CQI)_SB may be dropped.

In addition, in Mode 2-1 of Table 38, attributes of the subsequently reported information may be determined according to PTI indication. If PTI=0 (i.e., Mode 2-1(1)) is indicated, I1 applied to a WE, and I2 and CQI applied to a WB may be reported. In this case, I1 may be reported at a longer term than I2 and CQI, or may be reported at the same term as the I2 and CQI. If PTI indicates the value of 1 (i.e., Mode 2-1(2)), I2 and CQI applied to a WB are reported and I2 and CQI applied to a subband (SB) are reported. In this case, I2 and CQI applied to WB are reported at a longer term as compared to I2 and CQI applied to SB. In Mode 2-1, PTI is reported along with RI and is reported at a long term.

In Mode 2-1, as to (RI, PTI), (I1)_WB, (I2, CQI)_WB and (I2, CQI)₁₃ SB transmission cycles, the (I1)_WB may be reported at a longer term than the (RI, PTI). Therefore, in Mode 2-1, (I1) WB may be reported at a longer term than the (RI, PTI)_WB. That is, if (I1)_WB collides with (RI, PTI)_WB, (RI, PTI)_WB may be dropped.

Embodiment 7

Embodiment 7 relates to a method for determining a transmission priority capable of being applied to multiple control information reporting on the condition that multi-carrier or carrier aggregation is applied. In the following description, multi-carrier or carrier aggregation means that one or more carriers (or one or more serving cells) are configured. That is, Embodiment 7 can be applied to the case in which multiple carriers (or multiple cells) are configured in a UE.

In case of multi-carrier transmission, when control information of multiple carriers configured in a downlink is reported from a UE to the eNB through an uplink carrier, control information can be reported through one carrier (for example, UL P-cell) configured for a specific purpose. In this case, a transmission cycle of control information for each DL carrier may be independently configured for each carrier. That is, positive SR, HARQ-ACK, and CQI/PMI/RI, and the like may have independent transmission cycles for individual carriers and may be reported through an uplink carrier. Provided that control information is transmitted through one UL carrier, different types of control information may collide with each other, such that it is necessary to determine which control information is assigned transmission priority. A variety of control information transmission schemes for effectively supporting DL multi-carrier transmission will hereinafter be described in detail.

In a first method, if one time point at which HARQ-ACK information for a positive SR or DL multi-carriers is reported is identical to the other time point at which CQI/PMI/RI is reported, CQI/PMI/RI may be dropped.

In a second method, CQI/PMI/RI information for each DL carrier may be reported at an independent transmission cycle, and the CQI/PMI/RI reporting priority may be determined according to DL carrier priority. For example, provided that Carrier-A has higher priority than Carrier-B, if CQI/PMI/RI of Carrier-A collides with CQI/PMI/RI of Carrier-B, the CQI/PMI/RI for Carrier-B may be dropped.

In a third method, in multi-carrier transmission, information as to which information is to be dropped when CQI, PMI and RI collide with one another at the CQI/PMI/RI reporting cycle for multiple DL carriers may be determined. Irrespective of DL carrier types, priority may be assigned according to feedback information attributes. CQI/PMI may be calculated and selected on the basis of the last reported RI. If multiple indexes (for example, I1 and I2) are reported for the precoder, each precoder may be calculated and selected on the basis of the last reported RI, and a CQI transmitted along with I2 may be calculated on the basis of the last reported RI, the last reported I1, and the currently transmitted I2. Alternatively, a CQI reported along with I1/I2 may be calculated on the basis of the last reported RI and the currently reported I1/I2. Considering the above-mentioned situation, higher priority may be assigned to control information reported at a longer term. For example, I1 has the highest priority, RI has priority less than that of I1, and I2 and CQI may have priority less than that of the RI. If low priority control information is transmitted at the same time point as that of the high priority control information, the low priority control information may be dropped and the high priority control information may be dropped.

The above-mentioned methods regarding priority of periodic CSI reporting using a PUCCH upon multiple carriers can be expressed as follows.

First, if one or more serving cells are configured in a UE, the UE may transmit channel status information (CSI) for only one serving cell in any given subframe.

If feedback information of a first serving cell has higher priority than that of a second serving cell according to feedback information attributes in an arbitrary subframe, feedback information of the serving cell may have lower priority and may be dropped. As to feedback information priority, for example, a CSI including an RI or a PMI (or WB PMI (W1 or I1)) having long reporting cycle may have higher priority as compared to other CSIs. From among other CSIs, the long reporting cycle (or WB attributes) PMI and/or CQI may have higher priority as compared to the short-term reporting cycle PMI and/or CQI.

Embodiment 8

Embodiment 8 relates to a method for reporting the case in which certain control information is dropped on the condition that multiple control information is reported, and relates to a detailed reporting method for use in the case in which RI or I1 (PMI or W1) is dropped.

Although Embodiment 8 illustrates the reporting method for use in the exemplary case in which RI or I1 is dropped from the viewpoint of one carrier, it should be noted that the scope or spirit of Embodiment 8 is not limited thereto and can also be applied to other examples. For example, it should be noted that Embodiment 8 can also be applied to examples in which predetermined feedback information is dropped on the basis of priority when there occurs feedback information (e.g., CSI) collision in a UE in which multiple carriers (or one or more serving cells) disclosed in the present embodiment are configured. For example, as detailed CSI reporting methods for the case in which information dropped in response to either priority of CSI information attributes or predefined priority for the serving cell is RI or I1 (i.e., PMI or W1 of the long-term WB attributes), the following examples may be used.

On the assumption that CQI/PMI/RI is periodically reported over a PUCCH according to Mode 2-1 (i.e., Mode 2-1(1) and Mode 2-1(2)), the reporting method for use in the case in which control information is dropped will hereinafter be described in detail.

Figure 27:
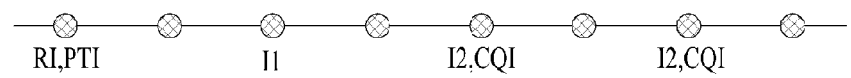
FIG. 27 illustrates a method for transmitting channel information according to a PUCCH report mode 2-1.

In FIG. 27, a method for transmitting control information in case of Mode 2-1 will hereinafter be described with reference to Table 46. FIG. 27 illustrates examples of RI/PMI/CQI report time points in case of Mode 2-1. Table 46 illustrates RI/PMI/CQI report time points and attributes in case of Mode 2-1.

TABLE 46

| Case | | Feedback information | | |
|---|---|---|---|---|
| Case 1 | RI(=N) + PTI(=0) | I1(for rank-N)_WB | I2, CQI (based on I1 for rank-N)_WB | I2, CQI_WB |
| | RI(=M) + PTI(=0) | I1(for rank-M)_WB | I2, CQI (based on I1 for rank-M)_WB | I2, CQI_WB |

TABLE 46-continued

| Case | | Feedback information | | |
|---|---|---|---|---|
| Case 2-1 | RI(=N) + PTI(=0) | I1(for rank-N)_WB | I2, CQI (based on I1 for rank-N)_WB | I2, CQI_WB |
| | ~~RI(=M)+PTI(=0)~~ | I1(for rank ~~M~~ N)_WB | I2, CQI (based on I1 for rank ~~M~~ N)_WB | I2, CQI_WB |
| Case 2-2 | RI(=N) + PTI(=0) | I1(for rank-N)_WB | I2, CQI (based on I1 for rank-N)_WB | I2, CQI_WB |
| | RI(=N) + PTI(=1) | I2, CQI(based on I1 for rank-N)_WB | I2, CQI_SB | I2, CQI_SB |
| | ~~RI(=M)+PTI(=0)~~ | I1(for rank ~~M~~ N)_WB | I2, CQI (based on I1 for rank ~~M~~ N)_WB | I2, CQI_WB |
| | RI(=N) + PTI(=1) | I2, CQI(based on I1 for rank-N)_WB | I2, CQI_SB | I2, CQI_SB |
| Case 3-1 | RI(=N) + PTI(=0) | I1(for rank-N)_WB | I2, CQI (based on I1 for rank-N)_WB | I2, CQI_WB |
| | RI(=M) + PTI(=0) | ~~I1 (for rank-M)~~ | I2, CQI (based on I1 for rank-M)_WB | I2, CQI_WB |
| Case 3-2 | RI(=N) + PTI(=0) | I1(for rank-N)_WB | I2, CQI (based on I1 for rank-N)_WB | I2, CQI_WB |
| | RI(=N) + PTI(=1) | I2, CQI(based on I1 for rank-N)_WB | I2, CQI_SB | I2, CQI_SB |
| | RI(=M) + PTI(=0) | ~~I1 (for rank-M)~~ | I2, CQI(based on I1 for rank-M)_WB | I2, CQI_WB |
| | RI(=M) + PTI(=1) | I2, CQI(based on I1 for rank-M)_WB | I2, CQI_SB | I2, CQI_SB |

I1, I2 and CQI may be determined according to indication of the reported RI. Referring to Case 1 of Table 46, if Rank-N information is reported, I1 is selected from among the codebook for Rank-N and then reported. Thereafter, is selected on the basis of the selected I1, and CQI is calculated and reported on the basis of the selected I1. After that, if a rank value is changed so that the RI value is reported as Rank-M, I1 and I2 are selected on the basis of Rank-M and CQI is then calculated.

On the other hand, Case 2-1 and Case 2-2 shown in Table 46 illustrate control feedback information attributes on the condition that RI is dropped.

Case 2-1 and Case 202 of Table 46 illustrate RI information referred by I1, I2 and CQI when RI is dropped. Provided that I1, I2 and CQI are selected and calculated on the basis of the latest reported RI, there is no problem in selecting/calculating I1, I2 and CQI although RI is dropped. In other words, in Case 2-1, if an RI indicating Rank-M is dropped, the UE may select/calculate I1, I2 and CQI on the basis of the last reported RI rank value (i.e., N). In addition, although PTI is set to 0 or 1 as in Case 2-2, I1, I2 and CQI may be selected and calculated according to the last reported rank value. In this case, it is preferable that RI in case of PTI=1 may report the same rank information as in RI reported rank information in case of PTI=0.

On the other hand, it should be noted that I1 may be unexpectedly dropped. I1 information may be used as information for I1 selection and CQI calculation. If I2 is dropped as soon as rank information is changed to another, there may occur some difficulty in I2 selection and CQI calculation.

For example, under the condition that rank information is changed from N rank to M rank as shown in Case 3-1 and Case 3-2 of Table 46, Rank-M based I1 is not contained in I2 and CQI to be selected/calculated later, resulting in the occurrence of an unexpected problem in selection/calculation. Therefore, special handling is needed to perform I1 selection and CQI calculation in the case in which I1 is dropped.

Examples of the present invention for selecting/calculating I2 and CQI when I2 is dropped will hereinafter be described in detail.

Embodiment 8-A

Provided that I2/CQI calculation must be carried out on the basis of Rank M, I2 and CQI can be calculated on the basis of the latest reported I1 (for Rank-M) from among I1 values of the pre-reported Rank-M. Alternatively, in the case where I2/CQI calculation must be carried out on the basis of Rank M, a Rank-M based I1 may be predefined and used. In other words, in the case where the latest reported I1 (i.e., the first PMI) has an RI different from the latest reported RI, or in the case where the latest reported I1 is absent (or dropped), I2 (i.e., the second PMI) or CQI may be selected and calculated on the basis of the predefined I1 (i.e., the first PMI). For example, the predefined I1 (the first PMI) may be defined as an I1 (first PMI) having the smallest index allowed in a codebook subset restriction (codebookSubsetRestriction) bitmap parameter based on the latest reported RI. Accordingly, I2 and CQI for Rank-M may be selected and calculated although there is no I1 for the pre-reported Rank-M, as represented by the following Table 47.

TABLE 47

| Case A | RI(=N) + PTI(=0) | I1(for rank-N)_WB | I2, CQI (based on I1 for rank-N)_WB | I2, CQI_WB |
|---|---|---|---|---|
| | RI(=N) + PTI(=1) | I2, CQI (based on I1 for rank-N)_WB | I2, CQI_SB | I2, CQI_SB |
| | RI(=M) + PTI(=0) | ~~I1 (for rank-M)~~ | I2, CQI (based on I1 for rank-M)_WB | I2, CQI_WB |
| | RI(=M) + PTI(=1) | I2, CQI (based on I1 for rank-M)_WB | I2, CQI_SB | I2, CQI_SB |

Embodiment 8-B

Provided that a rank is changed from a Rank N to a Rank M, if I2 for Rank-M is dropped, rank information of the latest reported I1 may be overridden.

For example, in the case where an RI for indicating a Rank-M is transmitted, I1 reporting for the Rank-M is dropped, and I2/CQI based on the Rank-M must be selected and calculated, the latest reported I1 may be an indicator selected on the basis of the Rank-N. In this case, the latest reported RI and associated rank information (i.e., Rank-M) is disregarded and I2 and CQI can be calculated on the basis of the latest reported I1 and a rank value (Rank-N) thereof. In addition, even when WB I2, CQI and SB I2/CQI must be reported according to PTI indication reported in the next RI (indicating Rank-M) transmission cycle, the selected I1 based on a Rank-M is dropped, such that I2 and CQI can be calculated on the basis of the latest reported I1 and a rank of the I1, as represented by the following Table 48.

TABLE 48

| Case B | RI(=N) + PTI(=0) | I1(for rank-N)_WB | I2, CQI (based on I1 for rank-N)_WB | I2, CQI_WB |
|---|---|---|---|---|
| | RI(=N) + PTI(=1) | I2, CQI (based on I1 for rank-N)_WB | I2, CQI_SB | I2, CQI_SB |
| | RI(=M) + PTI(=0) | ~~I1 (for rank-M)~~ | I2, CQI (based on I1 for rank-N)_WB | I2, CQI_WB |
| | RI(=N) + PTI(=1) | I2, CQI (based on I1 for rank-N)_WB | I2, CQI_SB | I2, CQI_SB |

Embodiment 8-C

Provided that I1 is dropped, PTI=0 is indicated at the next RI reporting cycle such that I1 can be reported, and associated description thereof is shown in the following Table 49.

TABLE 49

| Case C | RI(=N) + PTI(=0) | I1(for rank-N)_WB | I2, CQI (based on I1 for rank-N)_WB | I2, CQI_WB |
|---|---|---|---|---|
| | RI(=N) + PTI(=1) | I2, CQI (based on I1 for rank-N)_WB | I2, CQI_SB | I2, CQI_SB |
| | RI(=N) + PTI(=1) | I2, CQI (based on I1 for rank-N)_WB | I2, CQI_SB | I2, CQI_SB |
| | RI(=M) + PTI(=0) | ~~I1 (for rank-M)~~ | I2, CQI (based on I1 for rank-M)_WB | I2, CQI_WB |
| | RI(=M) + PTI(=0) | I1(for rank-M)_WB | I2, CQI (based on I1 for rank-M)_WB | I2, CQI_WB |
| | RI(=M) + PTI(=1) | I2, CQI (based on I1 for rank-M)_WB | I2, CQI_SB | I2, CQI_SB |

Embodiment 8-D

If I1 is dropped, I1 reporting is delayed, and the resultant I1 can be reported. For example, I1 may be reported at the N-th subframe subsequent to the I1 reporting time.

Figure 28:
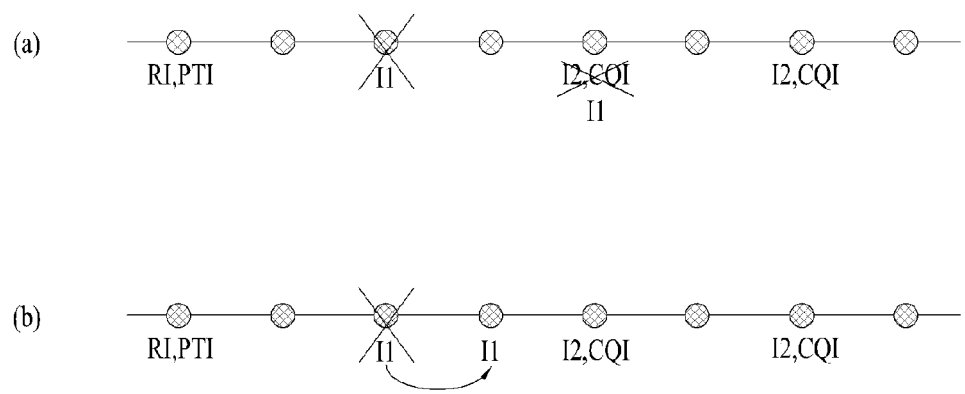
FIG. 28 illustrates a method for transmitting channel information according to a PUCCH report mode 2-1 on the condition that some channel information is omitted.

For example, the value of N may be established in such a manner that the N-th subframe is set to any one of CQI reporting time points after the original I1 reporting time. At an arbitrary time point from among a promised cycle for CQI reporting, the dropped I1 may be reported instead of control information that must be originally transmitted. For example, as shown in FIG. 28(a), provided that I2/CQI is scheduled to be reported upon execution of the I1 reporting, may be reported instead of reporting I2/CQI.

Alternatively, at an initial CQI report time after execution of I1 dropping, the dropped I1 may be reported. As shown in FIG. 28(b), an N value may be established in such a manner that the dropped I1 can also be reported at an initial subframe after the original I1 reporting time, as represented by the following Table 50.

TABLE 50

| Case D | RI(=N) + PTI(=0) | I1(for rank-N)_WB | I2, CQI(based on I1 for rank-N)_WB | I2, CQI_WB |
|---|---|---|---|---|
| | RI(=N) + PTI(=1) | I2, CQI (based on I1 for rank-N)_WB | I2, CQI_SB | I2, CQI_SB |
| | RI(=M) + PTI(=0) | ~~I1 (for rank-M)~~ | *I1(forrank-M)* | I2, CQI(based on I1 for rank-M)_WB |

TABLE 50-continued

| RI(=M) + PTI(=1) | I2, CQI (based on I1 for rank-M)_WB | I2, CQI_SB | I2, CQI_SB |
|---|---|---|---|

Embodiment 9

Embodiment 9 illustrates priority of control information transmission when multiple control information is reported, and also illustrates a detailed method for establishing control information transmission priority for use in multi-carrier transmission. In the following description, multi-carrier or carrier aggregation application means that one or more carriers (or one or more serving cells) are configured. That is, Embodiment 9 can be applied to the case in which multiple carriers (or multiple cells) are configured in a UE.

Figure 29:
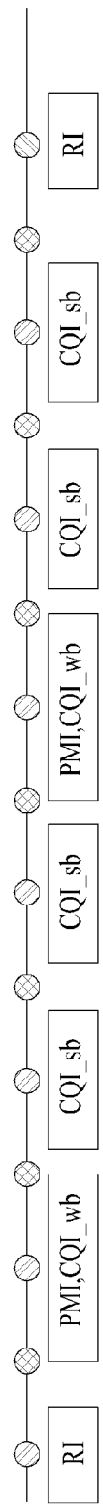
FIG. 29 illustrates an exemplary time point at which channel information is reported through uplink.

When the 3GPP LTE system measures a DL channel and reports it over a UL channel, RI, PMI, CQI, etc. may be reported as DL channel information. In this case, when DL channel information is reported over a PUCCH, a method for reporting channel information over a PUCCH can be largely classified into two modes according to frequency granularity based on CQI/PMI. A mode for reporting CQI/PMI applied to a WB may be referred to as PUCCH reporting mode 1-1, and a mode for reporting WB CQI/PMI and SB CQI may be referred to as a PUCCH reporting mode 2-1. PUCCH has limited channel capacity capable of being transmitted at a time, such that a rank, WB CQI/PMI, and SB CQI may be reported at different time points. FIG. 29 shows exemplary time points for reporting individual channel information pieces. In comparison between reporting cycles of individual channel information pieces, RI is reported at a relatively long term, and SB CQI/PMI and SB CQI may be reported at a relatively short term.

Considering multi-carrier (carrier aggregation) transmission, each DL carrier information must be measured and reported. DL channel information may be reported over one UL carrier (e.g., UL P-cell), and time points at which each DL carrier information is reported may be established to have an independent transmission cycle for each DL carrier. In this case, there may arise one case in which DL carrier information to be reported over one DL carrier must be reported at the same time (that is, information pieces of different DL carriers may be reported at the same time). In order to solve the above-mentioned problem, priority for each CSI (RI, PMI, CQI) is determined so that high priority information may be transmitted and low priority information may be dropped. As shown in FIG. 29, rank information may be reported at a relatively long term, CQI/PMI information may be reported at relatively short-term, such that transmission priority is assigned to relatively long-term reporting information and therefore the latest channel information may be reported.

In order to indicate precoding information for 8Tx antenna transmission in the 3GPP LTE-A system, a codebook for using two indexes (I1 and I2 (or PMI1(W1) and PMI2(W2)) is defined. Two indexes must be reported so that precoder element information becomes definite. I1 may be reported as WB information at a relatively long term, and I2 may be reported as SB information at a relatively short term. Compared to CSI reporting for use in the legacy 3GPP LTE Release 8/9 system, information as to which scheme is used to report two codebook indicators needs to be additionally defined. In order to report RI, I1, I2 and CQI, the following PUCCH report modes such as Mode 2-1(1) and Mode 2-1(2) of Table 38 can be applied.

Figure 30:
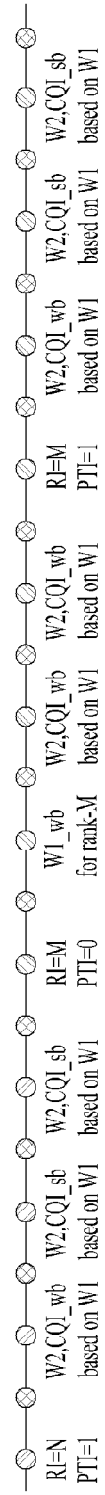
FIG. 30 illustrates an exemplary channel information report time point for PUCCH report mode 2-1 depending upon a PTI value.

As can be seen from Mode 2-1 of Table 38, attributes of the next reported information are determined according to a precoder type indicator (PTI). That is, if PTI transmitted along with RI is set to zero, W1 is transmitted, and WB W2 and CQI are then transmission. In this case, W2 and CQI are selected and calculated on the basis of the previously reported W1. If PTI is set to 1, WB W2/CQI is transmitted, and SB W2/CQI is then transmitted. FIG. 30 shows CSI report time points at PTI=0 and PTI=1 in Mode 2-1.

Considering the CSI reporting cycle, W1 is relatively slowly (less frequently) reported as shown in FIG. 30, and (RI+PTI) is relatively frequently reported as compared to W1. In addition, WB W2/CQI and SB W2/CQI are frequently reported. Therefore, as described above, when selecting CSI to be transmitted at a specific time in multi-carrier transmission, transmission priority of each CSI may be defined as W1>RI+PTI>W2=CQI.

On the other hand, PUCCH report modes such as Mode 1-1- and Mode 1-1-2 of Table 38 may also be used. Transmission priority of CSI information may be determined according to reporting cycles of such PUCCH report modes. That is, in Mode 1-1-1 of Table 38, priority of (RI+I1)_WB> (I2+CQI)_WB may be defined. In Mode 1-1-2 of Table 38, priority of (RI)_WB>(I1+I2+CQI)_WB may be defined.

In this case, (RI+I1) WB transmission of the first DL carrier and (RI) WB transmission of the second carrier may collide with each other upon multi-carrier transmission.

Because I1 may be reported at a relatively longer term than RI, influence of I1 dropping may be larger than influence of RI dropping, such that I1 may have higher priority than R1. That is, priority of (RI+I1)>(RI) may be achieved.

Considering three feedback modes (Mode 1-1-1, Mode 1-1-2, and Mode 2-1) of Table 38, (I1) WB may have the highest priority.

The above-mentioned scheme for CSI reporting priority using a PUCCH upon multiple carriers can be expressed as follows.

First, when one or more serving cells are configured in a UE, the UE may transmit CSI of only one serving cell in any given subframe.

Assuming that feedback information of a first serving cell has higher priority than a second serving cell according to feedback information attributes of an arbitrary subframe, feedback information of the second serving cell may have lower priority and be dropped. For example, as to feedback information priority, RI, (RI+I1)_WB, (RI+PTI) or I1_WB may have higher priority than other CSIs.

Embodiment 10

Embodiment 10 illustrates priority of control information transmission when multiple control information is reported, and Embodiments 10-A and 10-B illustrate feedback methods to be used when RI and PTI are dropped.

Embodiment 10-A

In case of a PUCCH report mode such as Mode 2-1 of Table 38, (RI+PTI) may be dropped due to various reasons. In this case, information to be reported at the next time may be determined according to the latest reported (RI+PTI) indication.

Figure 31:
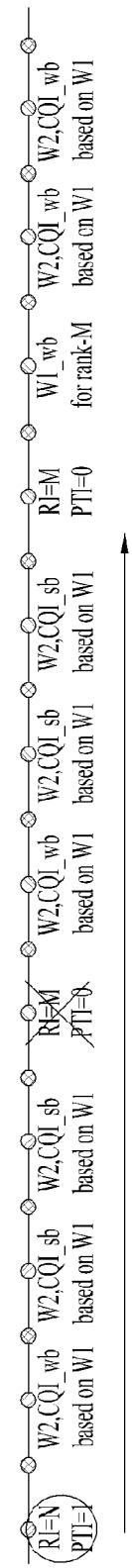
FIGS. 31 and 32 illustrate a method for transmitting channel information according to a PUCCH report mode 2-1 on the condition that some channel information is omitted.

For example, if RI+PTI (=0) is reported, (W1) WB is reported and (W2+CQI)_WB is then reported. In this case, if RI+PTI (=0) is dropped, information to be subsequently reported may be determined according to the last reported PTI value. As can be seen from FIG. 31, if RI+PTI (=0) is dropped, the last reported PTI is set to 1 such that (W2+CQI)_WB is reported and (W2+CQI) SB is then reported.

Embodiment 10-B

In case of a PUCCH report mode such as Mode 2-1 of Table 38, if (RI+PTI) is dropped, information to be subsequently reported may be calculated and selected according to a rank value indicated by the latest reported RI.

Figure 32:
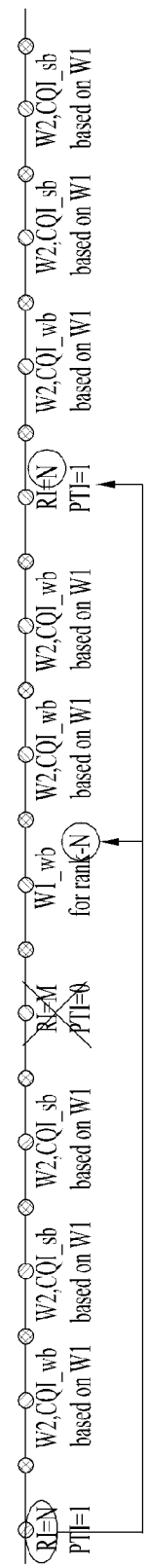

For example, if RI(=M)+PTI is reported, W1, W2, and CQI to be transmitted subsequent to the RI(=M)+PTI must be selected/calculated on the basis of Rank-M and then reported. In this case, if RI(=M)+PTI is dropped, information to be subsequently reported may be selected and calculated on the basis of the last reported RI rank value. In FIG. 32, if RI(=M)+PTI is dropped, W1_WB is selected and reported on the basis of Rank-N according to the last reported RI(=N) instead of Rank-M. In this case, the subsequent W1/CQI may be selected and calculated on the basis of Rank-N and W1 based on the Rank-N. If PTI indication time is determined, PTI indication may be reported according to the determined time.

Embodiment 11

Embodiment 11 shows the codebook subsampling method that is capable of being applied to PUCCH report modes and MU-MIMO case and definition of PUSCH reporting modes.

Embodiment 11-A

As the extended version of the legacy PUCCH report mode of the system (e.g., 3GPP LTE Release-10 system) supporting the extended antenna structure, three PUCCH report modes [(Mode 1-1-1, Mode 1-1-2, Mode 2-1) or (Mode-A, Mode-B, Mode-C)] shown in Table 39 may be applied.

Mode 1-1-1 reports the joint coded RI and I1, and reports the wideband CQI and the wideband I2. Mode 1-1-2 is a mode for transmitting (RI)_WB and (I1+I2+CQI)_WB. Mode 2-1 may transmit different feedback information. If PTI is set to zero (PTI=0), (RI+PTI(0)), (I1)_WB, and (I2+CQI)_WB may be transmitted. If PTI is set to 1 (PTI=1), (RI+PTI(1)), (I2+CQI)_WB, and (I2+CQI)_SB can be transmitted. On the other hand, in the present embodiments, two precoder indexes I1 and I2 may also be represented by W1 and W2, respectively.

A method for implementing report bandwidth optimization by applying codebook subsampling to each PUCCH report mode and at the same time maintaining PUCCH feedback coverage as in the legacy 3GPP LTE Release-8/9 will hereinafter be described in detail.

Signaling overhead requested for PUCCH Report Modes 1-1-1 and 1-1-2 are shown in Table 39. In Table 39, Mode-A corresponds to PUCCH Report Mode 1-1-1, and Mode-B corresponds to PUCCH Report Mode 1-1-2.

As can be seen from Table 39, 6 bits are needed for Type-5 (joint coded RI and WI) at PUCCH Report Mode 1-1-1. Since 6 bits are assigned to RI and WI because of the joint-coded RI and WI, coverage for RI transmission is greatly lower than that of the legacy 3GPP LTE Release-8 system. As a result, RI detection failure or performance deterioration may be encountered. Therefore, WI subsampling may be used to increase RI coverage. In Mode 1-1-1, Type-2a (W2 and CQI) Reporting may be more frequently updated than Type-5 Reporting, such that it can be recognized that Type-2a need not always be protected. Therefore, in so far as the reported bandwidth does not exceed one bit, W2 sampling need not be used.

In PUCCH Report Mode 1-1-2, RI is not joint-coded with other CSI information, such that RI coverage can be maintained in the same manner as in the legacy 3GPP LTE Release-8 system. However, as shown in Table 39, in case of Rank-1, Rank-2, Rank-3, and Rank-4, signaling overhead exceeding 11 bits is required for Type-2b (W1+W2+CQI) Reporting. Therefore, in order to reuse PUCCH format 2 of the 3GPP LTE Release-8 system, codebook sampling is needed.

First, a subsampling method capable of being applied to PUCCH Report Mode 1-1-1 will hereinafter be described in detail.

W1 candidates may be different in number according to transmission ranks. That is, as shown in Tables 11 to 18, the number of W1 candidates may be set to 16, 16, 4, 4, 4, 4, 4, and 1 for Ranks 1 to 8, respectively. If RI and W1 are joint-coded and reported, the requested signaling overhead is denoted by 6 bits (=ceiling(log 2(53))). In order to extend the RI coverage, signaling overhead may be reduced to 4 or 5 bits through W1 subsampling. Examples of the W1 subsampling are shown in the following Table 51.

TABLE 51

| | Alternative | W1 |
|---|---|---|
| Alt-1 | Rank-1 and 2 | 8 elements for each rank: (0, 2, 4, 6, 8, 10, 12, 14) |
| | Rank-3 and 4 | 4 elements for each rank: (0, 1, 2, 3) |
| | Rank-5, 6 and 7 | 2 elements for each rank: (0, 1) |
| | Rank-8 | 1 element: (0) |
| | Total number of element | 31 elements (5 bit) |
| Alt-2 | Rank-1 and 2 | 4 elements for each rank: (0, 4, 8, 12) |
| | Rank-3 and 4 | 2 elements for each rank: (0, 2) |
| | Rank-5, 6, 7 and 8 | 1 elements for each rank: (0) |
| | Total number of element | 16 elements (4 bit) |

In the dual-stage codebook structure, overlapped beams are present between beam groups. As can be seen from the Alt-1 scheme of Table 51, although subsampling is applied to W1 by excluding only the odd W1 values from the codebook, all the beams of the codebook can be maintained. However, W1 and W2 for constructing the entire codebook are transmitted from other subframes, such that performance deterioration may occur as compared to the use of the entire codebook to which no subsampling is applied. Meanwhile, as can be seen from the Alt-2 scheme of Table 51, if subsampling capable of excluding many more beams from the codebook is applied, it is impossible to use some beams of the codebook differently from the Alt-1 scheme in which all beams of the codebook can be maintained, resulting in the occurrence of performance deterioration.

Table 52 shows, in 8×2 SU-MIMO transmission, the system level performance of PUCCH Report Mode 1-1-1 based on the codebook subsampling application. Table 52 shows that, under the condition that (4+4) is used as W1 and W2 bits for Rank-1 and Rank-2 and the Alt-1 and Alt-2 schemes are applied thereto, an average spectral efficiency (SE) and a cell-edge SE for a cross-polarized antenna structure and a co-polarized antenna structure. While the Alt-1 scheme of Table 52 generates marginal performance deterioration in all of the average SE and the cell-edge SE, the Alt-2 scheme generates relatively high performance deterioration in the cell-edge SE.

TABLE 52

| Feedback information (W1 + W2 for rank-1, W1 + W2 for rank-2) | Cross-polarized (4 λ) Antenna | | Co-polarized (0.5 λ) Antenna | |
|---|---|---|---|---|
| | Average SE (bps/Hz) | Cell Edge SE (bps/Hz) | Average SE (bps/Hz) | Cell Edge SE (bps/Hz) |
| Reference (4 + 4, 4 + 4) | 1.63 (0.00%) | 0.0436 (0.00%) | 1.72 (0.00%) | 0.0730 (0.00%) |
| Alt-1 (3 + 4, 3 + 4) | 1.59 (−2.00%) | 0.0436 (0.00%) | 1.71 (−1.00%) | 0.0730 (0.00%) |
| Alt-2 (2 + 4, 2 + 4) | 1.59 (−2.00%) | 0.0404 (−7.00%) | 1.68 (−2.00%) | 0.0714 (−2.00%) |

As can be seen from Table 52, while the subsampled codebook of 5 bits maintains system performance, the other subsampled codebook of 4 bits reduces system performance by a predetermined amount corresponding to a maximum of 7%. Therefore, although RI coverage of the Alt-1 scheme is relatively lower than that of the Alt-2 scheme, the Alt-1 scheme is more preferable than the Alt-2 scheme from the viewpoint of system performance.

Hereinafter, a subsampling method capable of being applied to PUCCH Report Mode 1-1-2 will be described in detail.

In the (W1+W2+CQI) report of PUCCH Report Mode 1-1-2, W1 and W2 are reported in the same subframe. Therefore, subsampling may be used to maintain the report bandwidth of bits or less. As described above, in case of the subsampling for reducing the W1 value by 1 bit (for example, in the case where 8 index subsets are selected from among 16 indexes), all the beams of the codebook can be maintained, such that system performance deterioration can be minimized. However, if the W1 value is subsampled by bits of more than 1 bit, a specific-directional beam group is excluded from the codebook, such that system performance may be greatly deteriorated. Therefore, it may be preferable that, in association with Rank-2 to Rank-4, 1-bit subsampling is performed at W1 and more bits are excluded at W2.

The following Table 53 shows exemplary subsampling methods capable of being applied to PUCCH Report Mode 1-1-2.

TABLE 53

| Alt | | W1 | W2 |
|---|---|---|---|
| Alt-1 | Rank 1 | 3 bit: (0, 2, 4, 6, 8, 10, 12, 14) | 4 bit: (0, 1, 2, 3, 4, 5, 6, 7, 8, 9, 10, 11, 12, 13, 14, 15) |
| | Rank 2 | 3 bit: (0, 2, 4, 6, 8, 10, 12, 14) | 1 bit: (0, 1) |
| | Rank 3 | 1 bit: (0, 2) | 3 bit: (0, 2, 4, 6, 8, 10, 12, 14) |
| | Rank 4 | 1 bit: (0, 2) | 3 bit: (0, 1, 2, 3, 4, 5, 6, 7) |
| | Rank 5~7 | 2 bit | 0 bit |
| | Rank 8 | 0 bit | 0 bit |
| Alt-2 | Rank 1 | 3 bit: (0, 2, 4, 6, 8, 10, 12, 14) | 2 bit: (0, 1, 2, 3) |
| | Rank 2 | 3 bit: (0, 2, 4, 6, 8, 10, 12, 14) | 1 bit: (0, 1) |
| | Rank 3 | 1 bit: (0, 2) | 3 bit: (0, 2, 4, 6, 8, 10, 12, 14) |
| | Rank 4 | 1 bit: (0, 2) | 3 bit: (0, 1, 2, 3, 4, 5, 6, 7) |
| | Rank 5~7 | 2 bit | 0 bit |
| | Rank 8 | 0 bit | 0 bit |

Referring to Table 53, according to the Alt-1 scheme and the Alt-2 scheme, only one bit is reduced at W1 for Rank-1 to Rank-4 so as to prevent all the beam groups from being lost. Therefore, W2 is subsampled according to the requested bandwidth.

Table 54 shows, in 8×2 SU-MIMO transmission, the level of system performance of PUCCH Report Mode 1-1-1 based on the codebook subsampling application. Table 54 shows, under the condition that (4+4) is used as W1 and W2 bits for Rank-1 and Rank-2 and the Alt-1 and Alt-2 schemes are applied thereto, an average spectral efficiency (SE) and a cell-edge SE for a cross-polarized antenna structure and a co-polarized antenna structure.

TABLE 54

| Feedback information (W1 + W2 for rank-1, W1 + W2 for rank-2) | Cross-polarized (4 λ) Antenna | | Co-polarized (0.5 λ) Antenna | |
|---|---|---|---|---|
| | Average SE (bps/Hz) | Cell Edge SE (bps/Hz) | Average SE (bps/Hz) | Cell Edge SE (bps/Hz) |
| Reference (4 + 4, 4 + 4) | 1.63 (0.00%) | 0.0416 (0.00%) | 1.72 (0.00%) | 0.0736 (0.00%) |
| Alt-1 (3 + 4, 3 + 1) | 1.60 (−2.00%) | 0.0416 (0.00%) | 1.68 (−2.00%) | 0.0708 (−4.00%) |
| Alt-2 (3 + 2, 3 + 1) | 1.58 (−3.00%) | 0.0416 (0.00%) | 1.66 (−3.00%) | 0.0698 (−5.00%) |

As can be seen from Table 54, some steering vectors of 8 Tx antennas are excluded from W2 subsampling, such that performance deterioration of the co-polarized antenna structure is relatively larger than that of the cross-polarized antenna structure. On the other hand, there arises marginal performance deterioration in the cross-polarized antenna structure.

Therefore, it can be recognized that performance deterioration caused by the use of a subsampled codebook under the condition that W1 subsampled by 3 bits is used can be accommodated. Therefore, it is preferable that the Alt-1 scheme is applied to PUCCH Report Mode 1-1-2.

Hereinafter, the subsampling scheme capable of being applied to PUCCH Report Mode 2-1 will be described in detail.

In PUCCH Report Mode 2-1, four report types [(RI+PTI), (W1)_WB, (W2+CQI)_WB, (W2+CQI)_SB)] may be fed back. Each report type may be changed according to PTI selection. Table 45 shows signaling overhead required for each report type in case of PUCCH Mode 2-1 (denoted by Mode-C in Table 45). It is assumed that, in case of the (W2+CQI)_SB reporting at PTI=1, an L-bit indicator for a UE-selected subband is contained in Table 45.

In Table 45, in case of Rank-2, Rank-3, and Rank-4 on the condition that PTI=1 is indicated, overhead required for reporting the L-bit indicator for each of (W2+CQI)_SB and SB exceeds 11 bits. Associated signaling overhead must be reduced such that PUCCH Format 2 of 3GPP LTE Release-8 can be reused. In order to reduce signaling overhead, the following two methods (Option 1 and Option 2) can be used. Option 1 can newly define a predetermined SB cycling without using the selected band indicator of L bits. Option 2 performs W2 subsampling such that the L-bit selected band indicator can be reused.

In case of Option 1, SB CQI and SB W2 may be reported through PUCCH Format 2. However, according to Option 1, a CQI report cycle for each subband is increased, such that performance deterioration can be more sensitively generated at a time-selective channel using the predefined SB period. In addition, WB CQI and WB W2 should be reported between the periods of the BP (Bandwidth Part) report duration, such that the CQI report cycle at each subband can be considerably increased, resulting in increased performance deterioration.

In case of Option 2, SB CQI and SB W2 are reported along with the L-bit selected bandwidth indicator, such that the number of bits required for performing such reporting at Rank-2, Rank-3, and Rank-4 exceeds a specific value of 11. Therefore, W2 subsampling can be applied, and Table 55 shows the example of W2 subsampling.

TABLE 55

| Alternative | W2 |
| --- | --- |
| Rank-1 | 2 bit: (0, 1, 2, 3) |
| Rank-2 | 2 bit: (0, 1, 8, 9) |
| Rank-3 | 2 bit: (0, 2, 8, 10) |
| Rank-4 | 2 bit: (0, 1, 4, 5) |
| Rank-5~8 | 0 bit |

Table 56 shows, in 8×2 SU-MIMO transmission, the level of system performance of PUCCH Report Mode 2-1 for use in Option 1 and Option 2. Table 56 shows, in case of two methods (Option 1 and Option 2), an average spectral efficiency (SE) and a cell-edge SE for a cross-polarized antenna structure and a co-polarized antenna structure. It is assumed that, in order to measure system performance, SB CQI and SB W2 are reported at every report cycle of 5 ms, and WB W1 is updated at intervals of 45 ms. In addition, it is assumed that 2-bit subsampled W2 is applied to Option 2.

TABLE 56

| Feedback information (W1 + W2 for rank-1) | Cross-polarized (4 λ) Antenna | | Co-polarized (0.5 λ) Antenna | |
| --- | --- | --- | --- | --- |
| | Average SE (bps/Hz) | Cell Edge SE (bps/Hz) | Average SE (bps/Hz) | Cell Edge SE (bps/Hz) |
| Option-1: Predefined cycling (4 + 4) | 1.63 (0.00%) | 0.0472 (0.00%) | 2.24 (0.00%) | 0.0892 (0.00%) |
| Option-2: UE band selection with W2 subsampling (4 + 2) | 1.70 (4.00%) | 0.0480 (1.00%) | 2.30 (3.00%) | 0.0896 (0.00%) |

Figure 33:
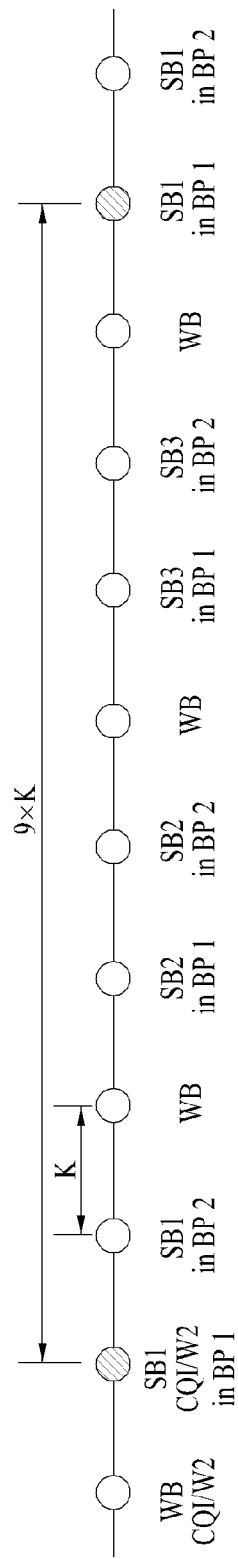
FIG. 33 illustrates WB CQI/WB W2 and SB CQI/SB W2 report cycles.

As can be seen from Table 56, the average SE of Option 1 is lower than that of Option 2 by a system performance deterioration of 3% to 4%, because the report operation period of WB CQI/WB W2 for Option 1 is longer than that of Option 2. For example, in the same manner as in FIG. 33 illustrating reporting periods in case that the predefined SB cycling at the system bandwidth of 5 MHz, Option 1 reports CSIs of all subbands, such that the report cycle of WB CQI/WB W2 is longer than that of Option 2.

As described above, Option 2 has higher performance than Option 1, such that an L-bit indicator for a UE-selected band is preferably included and W2 subsampling is applied to Option 2 in terms of system performance. In addition, the UE band selection function has already been used in the legacy system (3GPP LTE Release-8 system), such that complexity for Option 2 implementation is also reduced.

Therefore, according to the inventive codebook subsampling scheme applied to each PUCCH mode, the legacy PUCCH format 2 is reused and system performance deterioration can be minimized.

On the other hand, Table 57 shows parameters applied to simulation of system performances shown in Tables 52, 54, and 56. In addition, Tables 58, 59 and 60 show parameters applied to simulations of system performances of PUCCH Format 1-1-1, PUCCH Format 1-1-2, and PUCCH Format 2-1.

TABLE 57

| Parameter | Assumption |
| --- | --- |
| Number of cells | 57 |
| Deployment model | Hex grid, 3 sector sites |
| Inter site distance | 200 m |
| Average number of UEs per cell | 10 |
| Traffic model | Full buffer |
| UE speeds of interest | 3 km/h |
| Bandwidth | 5 MHz |
| Carrier frequency | 2.5 GHz |
| Control OFDM symbols per RB pair | 3 |
| Max number of HARQ retransmissions | 5 |
| Channel model | ITU Urban Micro |
| BS antenna configuration | Two closely spaced ±45° cross-poles with 0.5 λ separation ULA with 0.5 λ separation and vertical polarization |
| UE antenna configuration | 2 Rx: cross-polarized 0°/90°, 0.5 λ separation |
| Receiver | MMSE with no inter-cell interference suppression |
| Scheduler | Proportional fair in time and frequency |
| Channel estimation | Perfect channel estimation |
| Outer-loop link adaptation | Yes |
| Target BLER | 10% |
| Number of RBs per subband | 4 RBs |
| Number of Subband | 8 |
| Number of Bandwidth part | 2 |
| Frequency granularity for CQI reporting | 4 RBs |
| Feedback delay | 5 ms |
| Feedback codebook for 8Tx transmission | LTE-A 8Tx codebook |

TABLE 58

| | | |
| --- | --- | --- |
| RI reporting periodicity | | 20 ms |
| CQI reporting periodicity/ frequency granularity | | 5 ms/Wideband |
| PMI reporting periodicity/ frequency granularity | W1 | 20 ms/Wideband |
| PMI reporting periodicity/ frequency granularity | W2 | 5 ms/Wideband |
| Transmission mode | | SU-MIMO (Rank adaptation - up to Rank-2) |

TABLE 59

| | | |
| --- | --- | --- |
| RI reporting periodicity | | 20 ms |
| CQI reporting periodicity/ frequency granularity | | 5 ms/Wideband |
| PMI reporting periodicity/ frequency granularity | W1 | 5 ms/Wideband |
| PMI reporting periodicity/ frequency granularity | W2 | 5 ms/Wideband |
| Transmission mode | | SU-MIMO (Rank adaptation - up to Rank-2) |

TABLE 60

| | | |
|---|---|---|
| RI reporting periodicity | | 45 ms |
| CQI reporting periodicity/ frequency granularity | | 5 ms/Wideband |
| PMI reporting periodicity/ frequency granularity | W1 | 45 ms/Wideband |
| PMI reporting periodicity/ frequency granularity | W2 | 5 ms/Subband |
| Transmission mode | | MU-MIMO (Rank-1 per UE, Max 2-Layer pairing) ZF beamforming |
| Codebook subsampling | | For UE band selection, all codebook for W1 and subsampling for W2: 2 bit (0, 1, 2, 3) |

Embodiment 11-B

In MU-MIMO transmission, the number of transmission (Tx) layers of a transmitter is different from the number of reception (Rx) layers of a receiver. In addition, the receiver reports CSI on the assumption of SU-MIMO, such that channel information reported by the receiver may be different from actual channel information (That is, the channel information reported by the receiver may be mismatched with the actual channel information). For example, in the case of using the legacy PUSCH report mode 3-1, CSI of MU-MIMO is incorrectly fed back, such that there is needed a method for improving the CQI reporting.

As one solution for obviating the above-mentioned problem, a method for additionally reporting MU-MIMO CQI may be considered in the legacy PUSCH report mode 3-1. Therefore, flexible scheduling between SU-MIMO and MU-MIMO modes is allowed to optimize system performance. However, in order to support dynamic switching between SU-MIMO and MU-MIMO modes, MU-MIMO CQI must be attached to SU-MIMO CQI and the attached result must be fed back so that additional overhead for MU-MIMO CQI feedback is needed.

As another solution, a new PUSCH report mode may be used. For example, PUSCH report mode 3-2 may be used in which WB CQI for a first codeword (CW), and WB CQI, WB W1 and SB W2 for a second CW are transmitted. By PUSCH report mode 3-2, a PMI for more precise frequency granularity may be fed back so that accuracy of feedback information can be improved. Although additional MU-MIMO CQI feedback is not required for PUSCH report mode 3-2, feedback overhead is increased to improve more precise PMI feedback frequency granularity.

The following Table 61 illustrates, in 4Tx antenna transmission, feedback overhead required for PUSCH report mode 3-1, feedback overhead required for PUSCH report mode 3-1 and additional MU-MIMO CSI, and feedback overhead required for PUSCH report mode 3-2. In Table 61, N is the number of subbands (SBs), and L is the number of bits required for indicating the selected band.

TABLE 61

| Feedback information | Rank-1 | Rank-2~4 |
|---|---|---|
| PUSCH reporting mode 3-1 | CQI: 4 + 2 × N PMI: 4 22, 26, 34 (5, 10, 20 MHz) | CQI: (4 + 2 × N) × 2 PMI: 4 40, 48, 64 |
| PUSCH reporting mode 3-1 with additional MU-MIMO CQI | CQI: (4 + 2 × N) × 2 PMI: 4 40, 48, 64 | CQI: (4 + 2 × N) × 3 PMI: 4 × 2 62, 74, 98 |

TABLE 61-continued

| Feedback information | Rank-1 | Rank-2~4 |
|---|---|---|
| PUSCH reporting mode 3-2 | CQI: 4 + 2 × N PMI: 4 × N 46, 58, 82 | CQI: (4 + 2 × N) × 2 PMI: 4 × N 64, 80, 112 |

As can be seen from Table 61, feedback overhead for use in two CQI report improvement methods (both a MU-MIMO CQI transmission method and a method for using PUSCH report mode 3-2) is larger than that of the PUSCH report mode 3-1. feedback overhead. Therefore, in order to apply the above-mentioned CQI report improvement schemes, a sufficient performance gain is needed.

Tables 62 to 64 illustrate system level performances for individual CQI improvement methods in 4×2 MU-MIMO transmission. In Tables 62 to 64, it is assumed that only one layer is assigned to one UE. In Tables 62 and 63, a maximum number of MU-MIMO scheduled UEs is set to 2. In Table 64, a maximum number of MU-MIMO scheduled UEs is set to 4. For MU-MIMO CQI calculation, it is assumed that the UE searches for a preferred beam vector in a similar way to the SU-MIMO scheme and other interference beam vectors are predefined. Therefore, a precoder is formed by one preferred beam vector and other interference beam vectors in consideration of co-channel interference, and MU-MIMO CQI calculation can be performed on the basis of the formed precoder.

TABLE 62

| | Cross-polarized (4 λ) Antenna | | Co-polarized (0.5 λ) Antenna | |
|---|---|---|---|---|
| Feedback information | Average SE (bps/Hz) | Cell Edge SE (bps/Hz) | Average SE (bps/Hz) | Cell Edge SE (bps/Hz) |
| PUSCH mode 3-1 | 1.70 (0.00%) | 0.0560 (0.00%) | 2.22 (0.00%) | 0.0911 (0.00%) |
| PUSCH mode 3-1 with additional MU-MIMO CQI | 1.70 (0.00%) | 0.0559 (0.00%) | 2.23 (0.00%) | 0.0910 (0.00%) |
| PUSCH mode 3-2 | 1.74 (2.00%) | 0.0568 (1.00%) | 2.23 (0.00%) | 0.0930 (1.00%) |

TABLE 63

| | Cross-polarized (4 λ) Antenna | | Co-polarized (0.5 λ) Antenna | |
|---|---|---|---|---|
| Feedback information | Average SE (bps/Hz) | Cell Edge SE (bps/Hz) | Average SE (bps/Hz) | Cell Edge SE (bps/Hz) |
| PUSCH mode 3-1 | 1.73 (0.00%) | 0.0550 (0.00%) | 2.23 (0.00%) | 0.0882 (0.00%) |
| PUSCH mode 3-1 with additional MU-MIMO CQI | 1.71 (−1.10%) | 0.0540 (−1.70%) | 2.21 (−1.00%) | 0.0880 (−0.20%) |
| PUSCH mode 3-2 | 1.75 (1.10%) | 0.0544 (−1.00%) | 2.23 (0.00%) | 0.0904 (2.30%) |

TABLE 64

| Feedback information | Cross-polarized (4 λ) Antenna | | Co-polarized (0.5 λ) Antenna | |
|---|---|---|---|---|
| | Average SE (bps/Hz) | Cell Edge SE (bps/Hz) | Average SE (bps/Hz) | Cell Edge SE (bps/Hz) |
| PUSCH mode 3-1 | 1.73 (0.00%) | 0.0560 (0.00%) | 2.34 (0.00%) | 0.0922 (0.00%) |
| PUSCH mode 3-1 with additional MU-MIMO CQI | 1.82 (5.20%) | 0.0540 (−3.50%) | 2.32 (−0.85%) | 0.0918 (−0.69%) |
| PUSCH mode 3-2 | 1.79 (3.40%) | 0.0564 (1.00%) | 2.33 (−0.43%) | 0.0921 (−0.20%) |

As can be seen from In Tables 62 to 64, the above-mentioned CQI improvement methods can obtain higher performance gain than the conventional PUSCH report mode 3-1. If necessary, a performance gain capable of being obtained by the CQI improvement method is not high, a method for using the conventional PUSCH report mode 3-1 may also be used instead of using the CQI improvement method increasing signaling overhead.

Table 65 shows the number of bits required for indicating the number of subbands (SBs) and the number of bits required for subband indication.

TABLE 65

| | | 5 MHz (25 RBs) | 10 MHz (50 RBs) | 20 MHz (100 RBs) |
|---|---|---|---|---|
| Mode 3-1/ 3-2 | Subband size | 4 RBs | 6 RBs | 8 RBs |
| | The number of subbands (N) | 7 | 9 | 13 |

Table 66 illustrates parameters applied to simulation of system performances of Tables 62 to 64.

TABLE 66

| Parameter | Assumption |
|---|---|
| Number of cells | 57 |
| Deployment model | Hex grid, 3 sector sites |
| Average number of UEs per cell | 10 |
| Traffic model | Full buffer |
| Bandwidth | 10 MHz |
| Channel model | ITU Urban Micro |
| Antenna configuration | 4Tx-2Rx |
| BS antenna configuration | ULA with 0.5 λ separation and vertical polarization Two closely spaced ±45° cross-poles with 4 λ separation |
| UE antenna configuration | ULA with, 0.5 λ separation Cross-polarized 0°/90°, 0.5 λ separation |
| Receiver | MMSE with no inter-cell interference suppression |
| Scheduler | Proportional fair in time and frequency |
| Channel estimation | Perfect channel estimation |
| Outer-loop link adaptation | Yes |
| Target BLER | 10% |
| Max number of HARQ retransmissions | 5 |
| PUSCH Feedback Mode 3-1 | Number of RBs per subband | 6 RBs |
| | CQI reporting periodicity/frequency granularity | 5 ms/Subband |

TABLE 66-continued

| Parameter | Assumption |
|---|---|
| | PMI reporting periodicity/frequency granularity | 5 ms/Wideband |
| PUSCH Feedback Mode 3-2 | Number of RBs per subband | 6 RBs |
| | CQI reporting periodicity/frequency granularity | 5 ms/Subband |
| | PMI reporting periodicity/frequency granularity | 5 ms/Subband |
| Feedback delay | 5 ms |
| RI reporting periodicity | 20 ms |
| Feedback codebook | Release-8 HH |
| Transmission mode | MU-MIMO: ZF bcamforming, Rank-1 per UE, Max 2 Layer pairing |
| CQI reporting type | SU-MIMO based CQI MU-MIMO based CQI [4] |
| Overhead PDCCH | 3 OFDM symbols |
| CRS | 2-Tx pattern |
| DMRS | 12 REs per RB for rank-1 and 2 |

Embodiment 12

W1 and W1 subsampling methods capable of being applied to the case in which W1 and W2 are joint-coded will hereinafter be described in detail.

In PUCCH Report Mode 1-1-2 of Table 38, W1 and W2 are transmitted along with WB CQI. In Table 38, W1 and W2 are denoted by I1 and I2, respectively. In order to establish a feedback mode that can provide the same error generation probability as that of the legacy 3GPP LTE Release-8 PUCCH report scheme, the number of bits requisite for the precoder for each rank may be set to 4.

For example, the number of bits of W1 or W2 according to each rank may be determined as shown in Table 67. W1 and W2 indexes disclosed in Table 67 may respectively correspond to indexes (i1 and i2) of the codebook shown in Tables 11 to 14. Table 52 shows four examples of the W1 and W2 subsampling method.

TABLE 67

| | W1 | W2 |
|---|---|---|
| Rank-1 | 3 bit: {0, 2, 4, 6, 8, 10, 12, 14} | 1 bit: {0, 2} |
| Rank-2 | 3 bit: {0, 2, 4, 6, 8, 10, 12, 14} | 1 bit: {0, 1} |
| Rank-3 | 1 bit: {0, 2} | 3 bit: {0, 2, 4, 6, 8, 10, 12, 14} |
| | 1 bit: {0, 2} | 3 bit: {2, 3, 6, 7, 10, 11, 14, 15} |
| | 1 bit: {0, 2} | 3 bit: {0, 1, 2, 3, 8, 9, 10, 11} |
| | 1 bit: {0, 2} | 3 bit: {2, 3, 4, 5, 10, 11, 12, 13} |
| Rank-4 | 1 bit: {0, 2} | 3 bit: {0, 1, 2, 3, 4, 5, 6, 7} |

Embodiment 13

Embodiment 13 shows a W2 subsampling method capable of being applied to PUCCH Report Mode 2-1.

In PUCCH Report Mode 2-1 of Table 38, if PTI is set to 1 (PTI=1) and SB CQI is transmitted, the SB CQI can be selected in a bandwidth part (BP). That is, WB CQI and WB W2 are reported at a first report time, and the selected SB CQI and the selected band index and SB W2 are reported within a certain BP of the second report time. In Table 38, W1 and W2 are denoted by I1 and I2, respectively. At a third report time, SB CQI selected in a BP different from that of the second report time, the selected band index and SB W2 are reported.

In this case, SB CQI is represented by 4 bits or 7 bits. The selected band index is denoted by 2 bits, and SB W2 is denoted by 4 bits. As a result, a total sum of bits to be transmitted in one report time (i.e., one subframe) is set to 10 or 13 bits. However, considering that the number of bits of feedback information capable of being transmitted over PUCCH (e.g., in case of using PUCCH Format 2) is limited to 11, a total number of bits must be reduced by 2 bits at Rank-2 or higher.

In order to reduce 2 bits at W2, the W2 subband report of Table 68 may be used. Table 68 shows an example in which W2 subsampling is applied to Rank-2, Rank-3 and Rank-4 under 8Tx antenna transmission.

TABLE 68

| | W2 |
|---|---|
| Rank-2 | 2 bit: {0, 2, 4, 6} |
| Rank-3 | 2 bit: {0, 4, 8, 12} |
| | 2 bit: {2, 3, 10, 11} |
| Rank-4 | 2 bit: {0, 2, 4, 6} |

In case of W2 subsampling, the precoder is specified through W1 and W2, such that subsampling may not be applied to W1 so as to prevent the precoder element from being lost. Alternatively, in order to further reduce feedback overhead, W1 may be established to have a maximum of 3 bits. Table 69 illustrates examples of the number of bits of W1 in case of W2 subsampling.

TABLE 69

| | W1 (no sub-sampling) | W1 (max 3-bit) |
|---|---|---|
| Rank-1 | 4 bit | 3 bit |
| Rank-2 | 4 bit | 3 bit |
| Rank-3 | 2 bit | 2 bit |
| Rank-4 | 2 bit | 2 bit |

As a detailed method for subsampling W2 by 2 bits according to Embodiment 13, the methods disclosed in various embodiments of the present invention can be used.

Embodiment 14

Embodiment 14 illustrates a detailed method for reporting CSI for multi-carrier transmission, and configures transmission priority of feedback information for use in multi-carrier transmission, such that it can be recognized which feedback information is to be dropped when different feedback information pieces collide with each other. In the following description, multi-carrier or carrier aggregation means that one or more carriers (or one or more serving cells) are configured. That is, Embodiment 14 can be applied to the case in which multiple carriers (or multiple cells) are configured in a UE.

In periodic CQI/PMI/RI reporting for DL multi-carrier transmission, the periodic feedback scheme may be independently established for each DL carrier through a higher layer configuration parameter as defined in the legacy 3GPP LTE Release-8.

If PUCCH and PUSCH are not simultaneously established, the periodic CQI/PMI/RI for only one DL carrier may be reported in one subframe. Priority may be assigned to specific information as to which DL carrier is associated with periodic CQI/PMI/RI reporting. In association with priority setting, priorities of carriers may be established according to report modes or types. If the report modes/types are identical to each other, priorities of carriers may be established by higher layer (for example, RRC). Such feedback transmission priority configuration may be applied not only to one case in which feedback is transmitted without PUSCH but also to the other case in which feedback is transmitted along with PUSCH. Since CQI/PMI/RI for only one DL carrier is reported in one subframe, CQI/PMI/RI of another DL carrier may be dropped. In association with one DL carrier to be fed back, under the condition that RI, WB CQI/PMI, and SB CQI defined in the 3GPP LTE Release-8 collide with one another, feedback information can be transmitted according to priority configuration (i.e., RI>WB CQI/PMI, WB CQI, SB CQI).

If only periodic CQI/PMI/RI is transmitted without HARQ A/N information when PUCCH and PUSCH are not simultaneously configured, CQI/PMI/RI can be transmitted over a PUCCH on the condition that PUSCH is unavailable. In contrast, if PUSCH is available, CQI/PMI/RI can be transmitted over a PUSCH.

In the periodic CQI/PMI/RI reporting over a PUCCH, the above-mentioned various PUCCH report modes and PUCCH report types can be configured.

For 2Tx or 4Tx antenna transmission, Mode 1-0, Mode 1-1, Mode 2-0, or Mode 2-1 may be established as a PUCCH report mode. For 8Tx antenna transmission, Mode 1-1-1, Mode 1-1-2, and Mode 2-1 may be established.

In the entire contents of the present invention, a feedback mode for 8Tx antenna transmission may be referred to as a feedback mode for DL transmission mode 9 defined in the 3GPP LTE Release-10. DL transmission mode 9 is a DL transmission mode for supporting 8-layer transmission. In addition, a feedback mode for 2Tx or 4Tx antenna transmission may also be referred to as a feedback mode used for transmission modes excluding the DL transmission mode 9. For example, Report Mode 2-1 for 8Tx antenna transmission may be applied to Transmission Mode 9. in addition, as described above, Report Mode 1-1-1 may indicate a sub-mode 1 of the Report Mode 1-1 established for the transmission mode 9, and may indicate a sub-mode 2 of the Report Mode 1-1 established for the transmission mode 9.

The PUCCH report type may be established as shown in the following Table 70.

TABLE 70

| Reporting Type | Contents |
|---|---|
| Type 1 | CQI feedback for the UE selected sub-bands |
| Type 1a | Subband CQI and second PMI feedback |
| Type 2/2b/2c | Wideband CQI and PMI feedback |
| Type 2a | Wideband PMI feedback |
| Type 3 | RI feedback |
| Type 4 | Wideband CQI |
| Type 5 | RI and wideband PMI feedback |
| Type 6 | RI and PTI feedback |

Priorities applicable to the above-mentioned PUCCH report types will hereinafter be described in detail. In the periodic CSI reporting on a single carrier, PUCCH report type 3, 5, or 6 may have the longest reporting cycle. In addition, feedback information of PUCCH report types 1, 1a, 2, 2a, 2b and 4 is determined on the basis of the reported RI, wb $1^{st}$ PMI or PTI. Therefore, if PUCCH report type 3, 5, or 6 collides with PUCCH report type 1, 1a, 2, 2a, 2b, 2c or 4, PUCCH report types 1, 1a, 2, 2a, 2b and 2c may be dropped with low priority.

On the other hand, as described in Embodiment 6, transmission priority applied to collision of multiple control information may be arranged in the order of SR, HARQ- ACK, UL-SCH (in case of the subframe bundling operation) >RI>WB CQI/PMI, WB CQI, SB CQI. For example, if SR control information collides with CQI/PMI/RI in the same subframe, the CQI/PMI/RI is dropped and the SR can be transmitted.

Based on the above-mentioned description, the present embodiments for feedback priority configuration will hereinafter be described.

In Method 1, feedback priority may be determined on the basis of the report types.

In Method 2, if the same report types collide with each other during feedback of different DL carriers, feedback priority may be determined according to report types.

In Method 3, feedback types are grouped such that feedback priority can be determined according to a feedback type group.

In Method 4, if the same report types collide with each other during feedback of different DL carriers, feedback priority may be determined according to report types.

The above-mentioned PUCCH report modes may be comprised of a combination of report types, as shown in the following Table 71. In Table 71, wb is wideband (WB) feedback information, sb is subband (SB) feedback information, a $1^{st}$ PMI is a precoder index 1 (i.e., corresponding to i1 or W2 in the above-mentioned description), and a $2^{nd}$ PMI is a precoder index 2 (i.e., corresponding to i2 or W2 in the above-mentioned description).

In Table 71, Report Type Group A is a set or aggregate of feedback information including RI. Report Type Group B is a set or aggregate of feedback information including wb $1^{st}$ PMI. Report Type Group C is a set or aggregate of feedback information including wb CQI. Report Type Group D is a set or aggregate of feedback information including sb CQI.

Therefore, as proposed in the above-mentioned Method 3, feedback priority may be determined according to report type groups. Examples of the present invention for establishing priority on the basis of attributes of each feedback information will hereinafter be described in detail.

RI information is intermittently reported. If the RI information is not reported, RI has a considerably long report cycle such that long (or wrong) rank information can be applied before the next RI reporting, resulting in performance deterioration. Compared to other feedback information, RI may be established to have high priority. Group A (i.e., RI report group) including RI as shown in Report Types 3, 5 and 6 may have higher feedback priority than groups including CQI/PMI.

Subsequently, wb $1^{st}$ PMI indicates specific information based on selection/calculation of wb CQI/wb $2^{nd}$ PMI/sb CQI/sb $2^{nd}$ PMI, etc. If wb $1^{st}$ PMI is not reported, CQI/PMI information to be subsequently reported has difficulty in selection/calculation. Therefore, wb $1^{st}$ PMI may have higher feedback priority than wb CQI/wb $2^{nd}$ PMI/sb CQI/sb $2^{nd}$ PMI. The wb $1^{st}$ PMI reporting cycle may be determined

TABLE 71

| Tx | Reporting Mode | Reporting Type | | |
|---|---|---|---|---|
| For 2, 4Tx | Mode 1-0 | Type 3 (RI) | Type 4 (wbCQI) | — |
| | Mode 1-1 | Type 3 (RI) | Type 2 (wbCQI + wbPMI) | — |
| | Mode 2-0 | Type 3 (RI) | Type 4 (wbCQI) | Type 1 (sbCQI) |
| | Mode 2-1 | Type 3 (RI) | Type 2 (wbCQI + wbPMI) | Type 1 (sbCQI) |
| For 8Tx | Mode 1-1-1 (Sub-mode 1 of Mode 1-1) | Type 5 (RI + wb $1^{st}$ PMI) | Type 2b (wbCQI + wb $2^{nd}$ PMI) | — |
| | Mode 1-1-2 (Sub-mode 2 of Mode 1-1) | Type 3 (RI) | Type 2c (wbCQI + wb $1^{st}$ PMI + wb $2^{nd}$ PMI) | — |
| | Mode 2-1 for Transmission Mode 9 | Type 6 (RI + PTI) | Type 2a (wb $1^{st}$ PMI) | Type 2b (wbCQI + wb $2^{nd}$ PMI) |
| | | Type 6 (RI + PTI) | Type 2b (wbCQI + wb $2^{nd}$ PMI) | Type 1a (sbCQI + sb $2^{nd}$ PMI) |

Report types can be grouped as shown in the following Table 72 according to transmission cycles and feedback information attributes.

TABLE 72

| A | B | C | D |
|---|---|---|---|
| Type 3. RI | Type 2a. wb $1^{st}$ PMI | Type 4. wb CQI | Type 1. sb CQI |
| Type 5. RI + wb $1^{st}$ PMI | | Type 2. wb CQI + wb PMI | Type 1a. sb CQI + sb $2^{nd}$ PMI |
| Type 6. RI + PTI | | Type 2b. wbCQI + wb $2^{nd}$ PMI | |
| | | Type 2c. wbCQI + wb $1^{st}$ PMI + wb $2^{nd}$ PMI | | through RRC signaling in such a manner that RI information can be repeatedly reported in the RI information reporting cycle.

When determining priorities of wb CQI and sb CQI information, frequency and dependency of each reporting may be considered. In PUCCH feedback mode 2-1 for 2Tx and 2Tx antenna transmission, sb CQI may be calculated on the basis of the reported wb PMI after transmission of wb CQI+wb PMI information. Therefore, sb CQI may have dependency upon wb CQI+wb PMI. In addition, sb CQI may be recognized as auxiliary information for improving performance, and is transmitted more frequently than wb CQI. Therefore, wb CQI may be established to have higher priority than sb CQI. Group C (i.e., wb CQI report group) including wb CQI as in Report Types 4, 2, 2b, and 2c may have higher feedback priority than Group D (i.e., sb CQI report group) including sb CQI as in Report Types 1 and 1a.

Based on the above-mentioned description, when different report type groups A, B, C, and D collide with one another in the same subframe, priorities of individual report type groups A~D can be defined in various ways. The following Table 73 illustrates examples of priority configuration.

TABLE 73

| | |
|---|---|
| Ex1 | A > B > C > D |
| Ex2 | A = B > C > D |
| Ex3 | A > B = C > D |
| Ex4 | B > A > C > D |

Referring to Example 1 (Ex1) of Table 73, a group including RI has the highest priority, and the next priorities may be sequentially arranged in the order of a group including wb $1^{st}$ PMI, a group including wb CQI, and a group including sb CQI. In Example 2 (Ex2), a group including RI has the same priority as a group including wb $1^{st}$ PMI, and the next priorities may be sequentially arranged in the order of a group including wb CQI and a group including sb CQI. In Example 3 (Ex3), a group including RI has the highest priority, a group including wb $1^{st}$ PMI and a group including wb CQI have the same priority, and a group including sb CQI may have the lowest priority. In Example 4 (Ex4), a group including wb $1^{st}$ PMI has the highest priority, and the next priorities may be sequentially arranged in the order of a group including RI, a group including wb CQI, and a group including sb CQI.

On the other hand, as previously stated in Embodiment 4, feedback priorities for feedback information belonging to the same report type group may be established according to feedback modes.

For example, Report Mode 2-1 for 8Tx antenna transmission may have higher priority than Report Mode 1-0, 1-1, 2-0 or 2-1 for 2Tx or 4Tx antenna transmission or Report Mode 1-1-1 or 1-1-2 for 8Tx antenna transmission. Accordingly, priorities of individual report types may be determined in one report type group.

For example, Report Types 3, 5, and 6 are contained in Group A (i.e., Report Type Group including RI). Report Type 6 may be used to configure Feedback Mode 2-1 for 8Tx antenna transmission. Report Type 3 may be used to configure Report modes 1-0, 1-1, 2-0, and 2-1 for 2Tx or 4Tx antenna transmission. Report Type 5 may be used to configure Report Modes 1-1-1 and 1-1-2 for 8Tx antenna transmission. In Report Mode 2-1 for 8Tx antenna transmission, the next report precoding type is determined according to a PTI value transmitted along with RI. Accordingly, RI+PTI may have higher priority than RI transmission or RI+PMI transmission.

In addition, Report Types 4, 2, 2b, and 2c are contained in Group C (i.e., Report Type Group including wb CQI). Report Types 4, 2, and 2b are used for Report Mode 2-1 for 8Tx antenna transmission. In addition, Report Types 4, 2, and 2b may be used for wb CQI Report Modes 1-0 and 1-1 and Report Mode 1-1-1 for 8Tx antenna transmission. In this case, Report Types 4, 2, and 2b for use in sb CQI Report must always be used for feedback information to be subsequently reported, such that high priority may be assigned to each report type 4, 2, or 2b. Therefore, although the same type feedback information is used, priority for each feedback information may be determined according to which feedback mode is used for transmission. Therefore, examples of priorities of individual report types contained in the report type group are shown in the following Table 74.

TABLE 74

| Group | Priority |
|---|---|
| A | type 6 > type 5 > type 3 |
| A | type 6 > type 5, type 3 |
| C | type 2b for reporting mode 2-1 > type 2b for reporting mode 1-1-1 |
| C | type 2 for reporting mode 2-1 > type 2 for reporting mode 1-1 |
| C | type 4 for reporting mode 2-0 > type 4 for reporting mode 1-0 |

Additional embodiments proposed by the present invention in association with feedback priority configuration will hereinafter be described in detail.

In Method 5, unique priority is assigned to each report type or each report type group. In Report Types contained in the same report type group, priorities of individual report types may be established according to priorities given by RRC configuration for each DL carrier.

In Method 6, priority is assigned to each report type or each report type group, and priorities of Report Types contained in the same report type group may be established by RRC configuration.

Provided that Report Type Groups are established as shown in Table 72 and priorities of Report Type Groups are established as shown in Example 1 (Ex1) of Table 73 (i.e., A>B>C>D), priorities of individual Report Types for use in feedback report of each DL carrier may be established according to priorities of Report Type Groups.

For example, if Report Type 3, 5, or 6 collides with Report Type 1, 1a, 2, 2a, 2b, 2c, or 4, Report Type 1, 1a, 2, 2a, 2b, 2c or 4 may be dropped with low priority. If Report Type 2a collides with Report Type 1, 1a, 2, 2b, 2c or 4, Report Type 1, 1a, 2, 2b, 2c, or 4 may be dropped with low priority. If Report Type 2, 2b, 2c or 4 collides with Report Type 1 or 1a, the latter Report Type 1 or 1a may be dropped with low priority.

Next, if Report Type group is established as shown in Table 72 and priorities of Report Type Groups are established as shown in Example 2 (Ex2) of Table 73 (i.e., A=B>C>D), priorities of individual report types in feedback report of each DL carrier upon multi-carrier transmission may be established according to priorities of report type groups.

For example, if Report Type 3, 5, 6 or 2a collides with Report Type 4, 2, 2b, 2c, 1 or 1a, Report Type 4, 2, 2b, 2c, 1 or 1a may be dropped with low priority. In addition, if Report Type 4, 2, 2b or 2c collides with Report Type 1 or 1a, Report Type 1 or 1a may be dropped with low priority.

Next, if Report Type Group is established as shown in Table 72 and priorities of Report Type Groups are established as shown in Example 3 of Table 73 (i.e., A>B=C>D), priorities of individual report types in feedback report of each DL carrier upon multi-carrier transmission may be established according to priorities of report type groups.

For example, if Report Type 3, 5, or 6 collides with Type 2a, 4, 2, 2b, 2c, 1 or 1a, Report Type 2a, 4, 2, 2b, 2c, 1 or 1a may be dropped with low priority. In addition, if Report Type 2a, 4, 2, 2b or 2c collides with Report Type 1 or 1a, Report Type 1 or 1a may be dropped with low priority.

The above-mentioned description for specific information as to which carrier has priority for periodic CSI reporting in multi-carrier transmission will be described in detail. In the periodic CSI reporting for use in multi-carrier transmission, higher layer setting parameters for the periodic PUCCH reporting is independently determined for each DL carrier, such that the number of report type collisions is greatly increased as compared to single carrier transmission.

As can be seen from Table 71, it is assumed that PUCCH Report Modes and Report Types are established for DL transmission mode 9 and other transmission modes. For example, although PUCCH Report Type 1 does not collide with PUCCH Report Type 2 in the periodic CSI reporting for single carrier transmission, the PUCCH Report Type 1 may collide with the PUCCH Report Type 2 in multi-carrier transmission, such that there is needed the solution for obviating such collision.

In the periodic CSI reporting for multi-carrier transmission, DL carrier (or DL cell) may be selected according to priorities based on the above-mentioned report modes. However, on the assumption that priority of DL carrier selection for the periodic CQI/PMI/RI reporting is applied on the basis of report modes, essential report information pieces for the activated DL carrier may be frequently dropped. In addition, in the same manner as in report type collision, DL carrier selection priority may be applied according to RRC configuration rules for the periodic CQI/PMI/RI reporting. Therefore, provided that DL carrier selection priority is applied on the basis of report modes upon multi-carrier transmission, there occurs obscurity. On the other hand, determining report priority on the basis of only a report type may prevent important feedback information from being dropped, such that such report priority determination can be easily implemented.

Therefore, report types are grouped as in Table 72 and feedback priorities of report type groups may be determined to be A>B=C>D. For example, in case of carrier aggregation, Report Types (Report Types 3, 5, and 6) having the highest priority maintain their priorities, and DL carrier may be determined in the order of priorities based on individual report types.

Next, determining priority of PUCCH Report Type 2a including wb $1^{st}$ PMI will hereinafter be described in detail.

Figure 34:
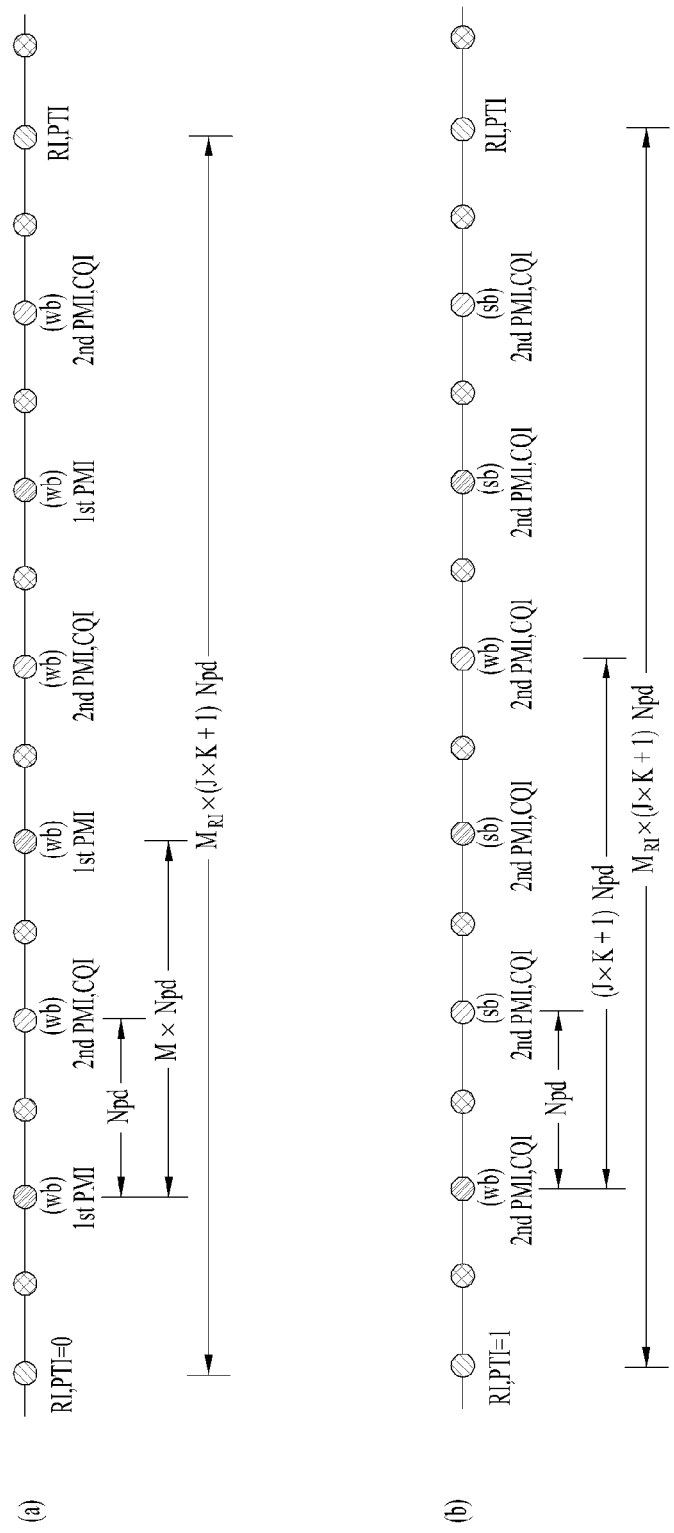
FIG. 34 illustrates a report cycle of a periodic PUCCH report mode 201 for a DL transmission mode 9.

FIG. 34 illustrates a reporting cycle of the periodic PUCCH Report Mode 2-1 for Transmission Mode 9 of Table 71. The reporting cycle of the periodic PUCCH Report Mode 2-1 of the Transmission Mode 9 may be determined according to report types and PTI configuration. Referring to FIG. 34, Report Type 6 (RI+PTI) may have the reporting cycle of $(J \cdot K+1) \cdot N_{pd} \cdot M_{RI}$. Referring to FIG. 34 (a) in case of PTI=0, Report Type 2a (wb $1^{st}$ PMI) may have the reporting cycle of $M \cdot N_{pd}$ where M={2,4}, and Report Type 2b (wb $2^{nd}$ PMI and wb CQI) may be reported at $N_{pd}$ time point after transmission of the Report Type 2a. In case of PTI=1, Report Type 2b may have the reporting cycle of $(J \cdot K+1) \cdot N_{pd}$, and Report Type 1a (sb $2^{nd}$ PMI and sb CQI) may be reported at $N_{pd}$ time point after transmission of the Report Type 2b. FIG. 34 illustrates an exemplary reporting cycle of PUCCH Report Mode 2-1 for DL Transmission Mode 9 through CSI-RS of the 8 antenna ports at M=2.

As shown in FIG. 34(a), in case of PTI=0, Report Type 2a may have the same cycle as Report Type 2b. As shown in FIG. 34(b), in case of PTI=1, the reporting cycle of Report Type 2a may be largely shorter than that of the Report Type 2b.

If the priority rule in which a Report Type having a longer reporting cycle has higher priority is easily applied, Report Type 2b may have higher priority than Report Type 2a. However, in the codebook structure for 8Tx antenna transmission, Report Type 2a (wb $1^{st}$ PMI) may include long-term spatial channel information, and Report Type 2b (wb $2^{nd}$ PMI and wb CQI) is more closely related to short-term spatial channel information. Preferably, Report Type 2a may have higher priority than other report types excluding Report Type (RI+PTI). Therefore, in case of PUCCH Report Mode 2-1 for Transmission Mode 9 upon multi-carrier transmission, Report Type 2a may have higher priority than Report Type 1, 1a, 2, 2b, 2c or 4.

As described above, the overall rules for priorities of DL carrier (or DL cell) selection for the periodic CQI/PMI/RI reporting upon multi-carrier transmission will hereinafter be described in detail.

As priority of information as to which DL carrier is to be used for CSI feedback, priorities of activated DL carriers can be determined on the basis of the CSI feedback report types. For this purpose, as shown in Table 72, Report Types are classified into Group A (Report Types 3, 5, and 6) including RI, Group B (Report Type 2a) including wb $1^{st}$ PMI without CQI, Group C (Report Types 2, 2b, 2c, and 4) including wb CQI, and Group D (Report Types 1 and 1a) including sb CQI, and priorities of individual report type groups may be determined to be A>B>C>D. If priorities of the report types are identical to each other, it can be determined which DL carrier is to be used for CSI feedback according to RRC configured priorities between activated DL carriers. In this way, CQI/PMI/RI for the determined DL carrier may be transmitted, and CQI/PMI/RI of a different DL carrier may be dropped.

If the same PUCCH report types collide with each other, PUCCH Report Type of a DL carrier having the highest priority between DL carriers (DL cells) activated by a higher layer is reported, and CQI/PMI/RI of other DL carriers may be dropped. For example, if PUCCH Report Type 6 is transmitted as a CSI of DL carrier (DL cell) #1 at a specific time point x, it may be assumed that the PUCCH Report Type 6 is transmitted as a CSI of a different DL carrier (DL cell) #2 at the same time point x. In this case, if RRC-configured priority for DL carrier #1 is higher than DL carrier #2, PUCCH Report Type 6 for DL carrier #1 may be transmitted, and PUCCH Report Type 6 for a different DL carrier #2 may be dropped.

In accordance with the above-mentioned proposals of the present invention, if priorities of report type groups are determined to be A>B>C>D, a method for establishing priority indicating which DL carrier is to be used for CSI transmission in one or more DL carriers (or on or more DL cells) can be expressed as follows.

If PUCCH Report Type 3, 5 or 6 collides with PUCCH Report Type 1, 1a, 2, 2a, 2b, 2c or 4, the latter PUCCH Report Type (1, 1a, 2, 2a, 2b, 2c or 4) may be dropped with low priority.

If PUCCH Report Type 2a collides with PUCCH Report Type 1, 1a, 2, 2b, 2c or 4, the latter PUCCH Report Type (1, 1a, 2, 2b, 2c or 4) may be dropped with low priority.

If PUCCH Report Type 2, 2b, 2c or 4 collides with PUCCH Report Type 1 or 1a, the latter PUCCH Report Type 1 or 1a may be dropped with low priority.

If the same PUCCH Report Types collide with each other, PUCCH Report Type having the highest priority established by a higher layer between the activated DL carriers (DL cells) is reported, and CQI/PMI/RI for other DL carriers may be dropped.

On the other hand, as can be seen from Table 72, report types are classified into Group A (Report Types 3, 5 and 6) including RI, Group B (Report Type 2a) including wb $1^{st}$ PMI without CQI, Group C I (Report Types 2, 2b, 2c, and 4) including wb CQ, and Group D (Report Types 1 and 1a) including sb CQI. When deciding priorities of activated DL carriers on the basis of report types, the present embodiments for other configurations of report type group priorities will hereinafter be described in detail.

In one embodiment, provided that priorities of Report Type Groups are determined to be A=B>C=D, if Report Type 3, 5, 6 or 2a collides with Report Type 4, 2, 2b, 2c, 1 or 1a, Report Type 4, 2, 2b, 2c, 1 or 1a may be dropped with low priority. If priorities of PUCCH report types are identical to each other, feedback priority may be determined according to RRC-configured priority between the activated DL carriers (DL cells). CQI/PMI/RI of other DL carriers may be dropped.

In another embodiment, provided that priorities of Report Type Groups are determined to be A>B>C=D, if PUCCH Report Type 3, 5, or 6 collides with PUCCH Report Type 2, 2a, 2b, 2c, 4, 1 or 1a, PUCCH Report Type 2, 2a, 2b, 2c, 4, or 1a may be dropped with low priority. In addition, if PUCCH Report Type 2a collides with PUCCH Report Type 2, 2b, 2c, 4, 1 or 1a, PUCCH Report Type 2, 2b, 2c, 4, 1 or 1a may be dropped with low priority. If priorities of PUCCH report types are identical to each other, feedback priority may be determined according to RRC-configured priority between the activated DL carriers (DL cells). CQI/PMI/RI of other DL carriers may be dropped.

In Embodiment 14, the above-mentioned methods for priorities of the periodic CSI reporting using a PUCCH upon multi-carrier configuration can be expressed as follows.

First, if one or more serving cells are assigned to a UE, the UE may transmit channel status information (CSI) for only one serving cell in any given subframe.

In an arbitrary subframe, if feedback information of a first serving cell has higher priority than a second serving cell according to feedback information attributes, feedback information of the second serving cell may be dropped with lower priority.

For example, priorities of CSI feedback information on the basis of Report Type (or PUCCH Report Type) of Table 70 will hereinafter be described with reference to Example 2 (Ex2) of Table 73.

In an arbitrary subframe, if PUCCH Report Type 3, 5, 6, or 2a of one serving cell collides with PUCCH Report Type 1, 1a, 2, 2b, 2, or 4 of another serving cell, the latter CSI (i.e., PUCCH Report Type 1, 1a, 2, 2b, 2, or 4) may be dropped with lower priority.

In an arbitrary subframe, if PUCCH Report Type 2, 2b, 2c or 4 of one serving cell collides with PUCCH Report Type 1 or 1a of another serving cell, the latter CSI (i.e., PUCCH Report Type 1 or 1a) may be dropped with lower priority.

If CSI reporting parts of different serving cells having the same priority PUCCH report type in an arbitrary subframe collide with one another, a CSI of a specific serving cell (i.e., serving cell having high priority according to RRC configuration, for example, a serving cell having the smallest serving cell index) is reported and CSIs of the remaining serving cells may be dropped.

Figure 35:
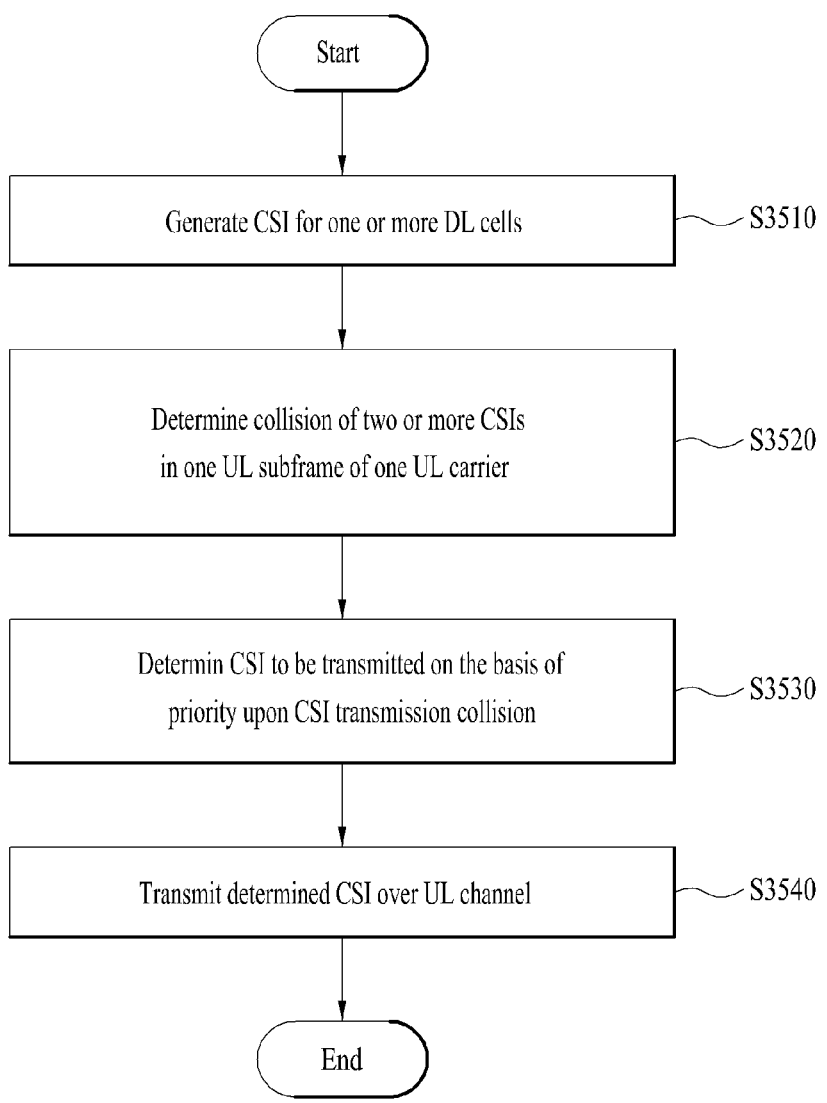
FIG. 35 is a flowchart illustrating a method for transmitting channel status information (CSI) according to an embodiment of the present invention.

FIG. 35 is a flowchart illustrating a method for transmitting channel status information. A method for reporting channel status information (CSI) according to an embodiment of the present invention will hereinafter be described with reference to FIG. 22.

In association with DL transmission from a BS (or eNB) to a UE, the UE measures a DL channel state and feeds back the measured result through uplink. For example, if 8 Tx antennas are applied to DL transmission of the BS, the BS can transmit CSI-RS (Channel status information—Reference Signal) through 8 antenna ports (Antenna port indexes 15 to 22). The UE may transmit the DL channel state measurement results (RI, PMI, CQI, etc.) through the CSI-RS. The above-mentioned various examples of the present invention can be applied to a detailed method for selecting/calculating RI/PMI/CQI. The BS may determine the number of DL transmission layers, the precoder, and MCS (Modulation Coding Scheme) level, etc. according to the received channel status information (RI/PMI/CQI), such that it can transmit a DL signal.

In step S3510 of FIG. 35, a UE may generate CSIs for one or more DL cells. Each CSI may include one or more CQIs calculated on the basis of precoding information that is determined by a combination of an RI, a first PMI, a second PMI, and a combination of first and second PMIs of one or more DL carriers.

In step S3520, the UE may determine whether two or more CSIs collide with one another in one UL subframe of one UL carrier.

In step S3530, if two or more CSIs collide with one another, a CSI to be transmitted can be determined according to priorities. In order to determine priorities, CSI may be classified into a first group including RI, a second group including a first WB PMI, a third group including a WB CQI, and a fourth group including an SB CQI. Therefore, if CSI of the first group or CSI of the second group collides with CSI of the third group or CSI of the fourth group, a CSI of the third or fourth group may be dropped with low priority. In addition, CSI of the first group and CSI of the second group may have the same priority. If the CSI of the third group collides with the CSI of the fourth group, the CSI of the fourth group may be dropped with low priority.

In addition, assuming that priorities assigned to respective groups are identical, if a CSI of a DL transmission mode through 8Tx antennas collides with a CSI of a different DL transmission mode, the CSI of the different DL transmission mode may be dropped with low priority. Additionally or separatedly, in association with one or more DL carriers, a CSI for a high-priority DL carrier configured by a higher layer may have higher priority. Alternatively, various priority configurations disclosed in the above-mentioned embodiments may also be applied as necessary.

In step S3540, the UE may transmit a CSI to be transmitted over an uplink (UL) channel. In this case, the UL channel may be set to a PUCCH. Alternatively, the UL channel is a PUSCH, and the above-mentioned priorities may be applied to the case in which there is collision between CSIs of different carriers.

In accordance with the CSI transmission method shown in FIG. 35, each item disclosed in various embodiments of the present invention may be independently applied or two or more embodiments may be simultaneously applied. The same parts may herein be omitted for convenience and clarity of description.

The same principles proposed by the present invention can be applied not only to CSI feedback for one MIMO transmission between a base station (BS) and a relay node (RN) (i.e., MIMO transmission between backhaul uplink and backhaul downlink) but also to CSI feedback for MIMO transmission between an RN and a UE (i.e., MIMO transmission between an access uplink and an access downlink).

Figure 36:
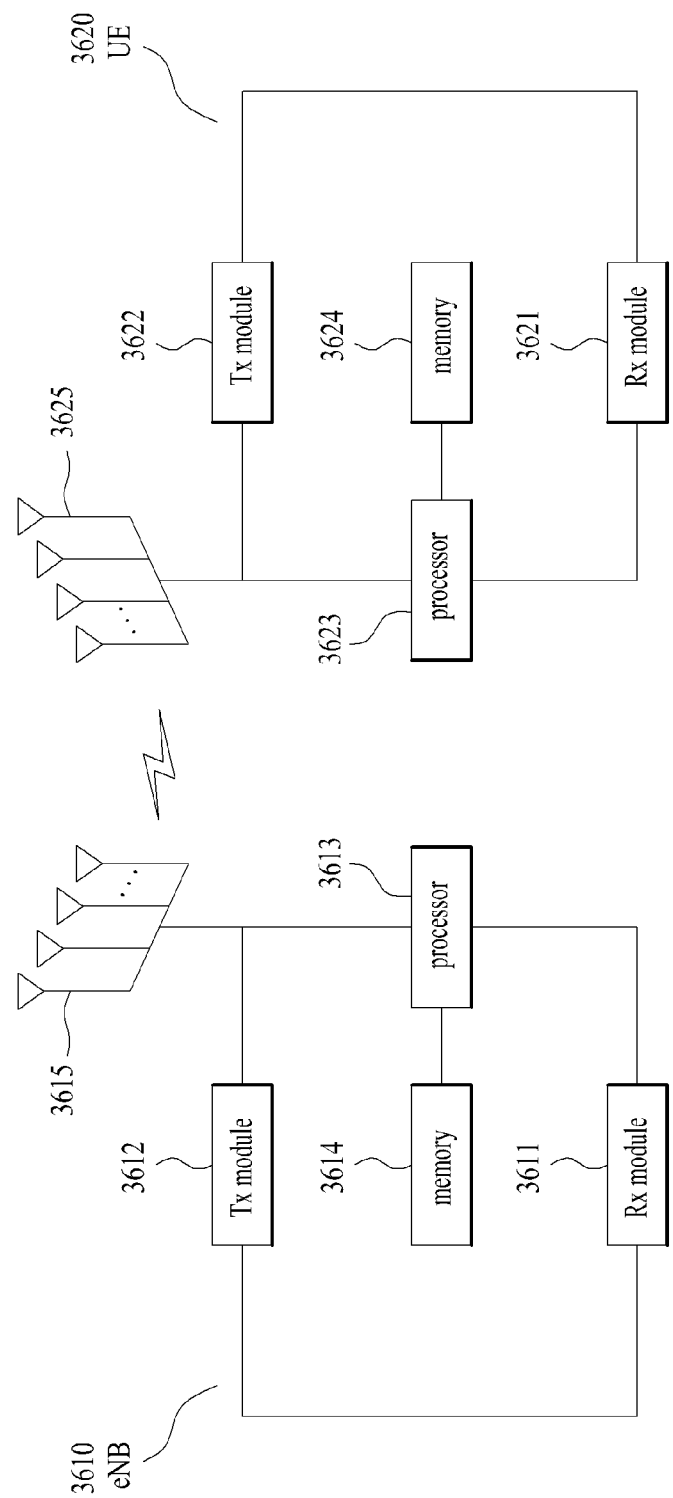
FIG. 36 is a block diagram illustrating an eNB apparatus and a user equipment (UE) apparatus according to an embodiment of the present invention.

FIG. 36 is a block diagram illustrating an eNB apparatus and a user equipment (UE) apparatus according to an embodiment of the present invention.

Referring to FIG. 36, an eNB apparatus 3610 may include a reception (Rx) module 3611, a transmission (Tx) module 3612, a processor 3613, a memory 3614, and a plurality of antennas 3615. The plurality of antennas 3615 may be contained in the eNB apparatus supporting MIMO transmission and reception. The reception (Rx) module 3611 may receive a variety of signals, data and information in uplink starting from the UE. The transmission (Tx) module 3612 may transmit a variety of signals, data and information in downlink for the UE. The processor 3613 may provide overall control to the eNB apparatus 3610.

The eNB apparatus 3610 according to one embodiment of the present invention may be configured to transmit DL transmission through a maximum of 8 Tx antennas as well as to receive CSI of the DL transmission from the UE apparatus 3620. If the eNB receives CSI of one or more DL carriers over a PUCCH of one UL carrier, the CSI received by the eNB may be a CSI that is determined by the UE according to priorities.

Besides, the processor 3613 of the eNB apparatus 3610 processes information received at the eNB apparatus 3610 and transmission information. The memory 3614 may store the processed information for a predetermined time. The memory 3614 may be replaced with a component such as a buffer (not shown).

Referring to FIG. 36, the UE apparatus 3620 may include a reception (Rx) module 3621, a transmission (Tx) module 3622, a processor 3623, a memory 3624, and a plurality of antennas 3625. The plurality of antennas 3625 may be contained in the UE apparatus supporting MIMO transmission and reception. The reception (Rx) module 3621 may receive a variety of signals, data and information on downlink starting from the eNB. The transmission (Tx) module 3622 may transmit a variety of signals, data and information on uplink for the eNB. The processor 3623 may provide overall control to the UE apparatus 3620.

The UE apparatus 3620 according to one embodiment of the present invention may be configured to receive DL transmission through a maximum of 8 Tx antennas as well as to feed back CSI of the DL transmission to the eNB apparatus 3610. The processor 3623 of the UE apparatus 3620 may be configured to generate a CSI that includes at least one of an RI, a first PMI, a second PMI, and a CQI calculated on the basis of precoding information determined by a combination of the first and second PMIs in association with one or more DL carriers. In addition, if two or more CSIs collide with one another in one UL subframe of one UL carrier, a CSI to be transmitted may be determined on the basis of priorities. In addition, the processor 3623 may be configured to transmit the determined CSI over a UL channel by the Tx module 3622. In this case, CSI may be classified into a first group including an RI, a second group including a first WB PMI, a third group including a WB CQI, and a fourth group including an SB CQI. In addition, the above-mentioned priority may be determined in a manner that a CQI of the third or fourth group is dropped with low priority when the CSI of the first group or the CSI of the second group collides with the CSI of the third group or the CSI of the fourth group.

Besides, the processor 3623 of the UE apparatus 3620 processes information received at the UE apparatus 3620 and transmission information. The memory 3624 may store the processed information for a predetermined time. The memory 3624 may be replaced with a component such as a buffer (not shown).

In association with the above-mentioned eNB and UE apparatuses, the contents described in the above-mentioned embodiments may be used independently of each other or two or more embodiments may be simultaneously applied, and the same parts may herein be omitted for convenience and clarity of description.

The eNB apparatus 3610 shown in FIG. 36 may also be applied to a relay node (RN) acting as a DL transmission entity or UL reception entity, and the UE apparatus 3620 shown in FIG. 36 may also be applied to a relay node (RN) acting as a DL reception entity or UL transmission entity.

The above-described embodiments of the present invention can be implemented by a variety of means, for example, hardware, firmware, software, or a combination of thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

As apparent from the above description, exemplary embodiments of the present invention have the following effects. The embodiments of the present invention provide a method and apparatus for effectively reporting feedback information in a MIMO system. The embodiments of the present invention are applicable to a variety of mobile communication systems (for example, OFDMA, SC-FDMA, CDMA, and TDMA communication systems based on multiple access technology).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting channel status information (CSI) of downlink (DL) multi-carrier transmission, the method comprising:
   generating two CSIs for two downlink component carriers, each of the two CSIs including at least one of a rank indicator (RI), a wideband (WB) first precoding matrix index (PMI), a WB second PMI, a subband (SB) second PMI, a WB channel quality indicator (CQI), an SB CQI, or a precoding type indicator (PTI);
   determining, when the two CSIs collide with one another in one uplink (UL) subframe of one UL carrier, a CSI of the two CSIs to be transmitted based on priority; and
   transmitting the determined CSI over a UL channel,
   wherein each of the two CSIs is classified into a first group including the RI, a second group only including the WB first PMI, a third group including the WB CQI, or a fourth group including the SB CQI,
   wherein the priority is defined such that, if a CSI of the first group or a CSI of the second group collides with a CSI of the third group or a CSI of the fourth group, the CSI of the third or fourth group has a low priority and is dropped, and
   wherein the WB CQI is calculated based on precoding information determined by a combination of the WB first PMI and the WB second PMI.

2. The method according to claim 1, wherein the CSI of the first group and the CSI of the second group have a same priority.

3. The method according to claim 1, wherein, if the priorities are identical to one another, and if a CSI of a DL transmission mode for eight transmission (Tx) antennas collides with a CSI of a different DL transmission mode, the CSI of the different DL transmission mode has a low priority and is dropped.

4. The method according to claim 1, wherein, if the priorities are identical to one another, a CSI of a high-priority DL carrier configured by a higher layer in each of the one or more DL carriers is transmitted over the UL channel.

5. The method according to claim 1, wherein, if the WB first PMI is dropped, channel status information (CSI) subsequent to the dropped WB first PMI is generated based on a predefined first PMI.

6. The method according to claim 1, wherein the UL channel is a physical uplink control channel (PUCCH).

7. The method according to claim 1, wherein:
   the UL channel is a physical uplink shared channel (PUSCH); and
   the priority is applied to collision of CSIs of different carriers.

8. A user equipment (UE) for transmitting channel status information (CSI) of downlink multi-carrier transmission, comprising:
   a receiver configured to receive a downlink signal from an eNode B;
   a transmitter configured to transmit an uplink signal to the eNode B; and
   a processor configured to:
      control the receiver and the transmitter;
      generate two CSIs for two downlink component carriers, each of the two CSIs including at least one of a rank indicator (RI), a wideband (WB) first precoding matrix index (PMI), a WB second PMI, a subband (SB) second PMI and a WB channel quality indicator (CQI), an SB CQI, or a precoding type indicator (PTI);
      determine, when two CSIs collide with one another in one uplink (UL) subframe of one UL carrier, a CSI of the two CSIs to be transmitted based on priority,
      transmit, through the transmitter, the determined CSI over a UL channel,
      wherein each of the two CSIs is classified into a first group including an RI, a second group only including the first PMI, a third group including a WB CQI, or a fourth group including the SB CQI,
      wherein the priority is defined such that, if a CSI of the first group or a CSI of the second group collides with a CSI of the third group or a CSI of the fourth group, the CSI of the third or fourth group has a low priority and is dropped, and
      wherein the WB CQI is calculated based on precoding information determined by a combination of the WB first PMI and the WB second PMI.

9. The UE according to claim 8, wherein the CSI of the first group and the CSI of the second group have a same priority.

10. The UE according to claim 8, wherein, if the priorities are identical to one another, and if a CSI of a DL transmission mode for 8 transmission (Tx) antennas collides with a CSI of a different DL transmission mode, the CSI of the different DL transmission mode is has a low priority and dropped.

11. The UE according to claim 8, wherein, if the priorities are identical to one another, a CSI of a high-priority DL carrier configured by a higher layer in each of the one or more DL carriers is transmitted over the UL channel.

12. The UE according to claim 8, wherein, if the first PMI is dropped, channel status information (CSI) subsequent to the dropped first PMI is generated based on a predefined first PMI.

13. The UE according to claim 8, wherein the UL channel is a physical uplink control channel (PUCCH).

14. The UE according to claim 8, wherein:
   the UL channel is a physical uplink shared channel (PUSCH); and
   the priority is applied to collision of CSIs of different carriers.

* * * * *